US011977845B2

(12) United States Patent
Lyske et al.

(10) Patent No.: US 11,977,845 B2
(45) Date of Patent: May 7, 2024

(54) SYSTEM AND METHOD FOR EVALUATING SEMANTIC CLOSENESS OF DATA FILES

(71) Applicant: EMOTIONAL PERCEPTION AI LIMITED, London (GB)

(72) Inventors: Joseph Michael William Lyske, London (GB); Nadine Kroher, Seville (ES); Angelos Pikrakis, Kessariani (GR)

(73) Assignee: EMOTIONAL PERCEPTION AI LIMITED, London (GB)

( * ) Notice: Subject to any disclaimer, the term of this patent is extended or adjusted under 35 U.S.C. 154(b) by 0 days.

(21) Appl. No.: 17/520,576

(22) Filed: Nov. 5, 2021

(65) Prior Publication Data

US 2022/0107800 A1 Apr. 7, 2022

Related U.S. Application Data

(63) Continuation of application No. 17/492,211, filed on Oct. 1, 2021.

(30) Foreign Application Priority Data

Oct. 2, 2020 (GB) ...................................... 2015695

(51) Int. Cl.
*G06F 11/36* (2006.01)
*G06F 8/75* (2018.01)
(Continued)

(52) U.S. Cl.
CPC ................ *G06F 40/30* (2020.01); *G06F 8/75* (2013.01); *G06F 16/3344* (2019.01);
(Continued)

(58) Field of Classification Search
CPC .......... G06F 16/686; G06F 8/75; G06F 40/30; G06F 16/639; G06F 40/45;
(Continued)

(56) References Cited

U.S. PATENT DOCUMENTS 8,484,022 B1   7/2013   Vanhoucke
8,938,089 B1 *  1/2015   Postelnicu ............. G06V 20/46
                                                    382/100
(Continued)

FOREIGN PATENT DOCUMENTS

CN   108334617 A    7/2018
CN   108648767 A   10/2018
(Continued)

OTHER PUBLICATIONS

Hebbar et al., "Robust speech activity detection in movie audio: data resources and Experimental evaluation," ICASSP, (2019), pp. 4105-4109, 10.1109/ICASSP.2019.8682532.
(Continued)

*Primary Examiner* — Tuan A Vu
(74) *Attorney, Agent, or Firm* — WORKMAN NYDEGGER

(57) ABSTRACT

The invention provides for the evaluation of semantic closeness of a source data file relative to candidate data files. The system includes an artificial neural network and processing intelligence that derives a property vector from extractable measurable properties of a data file. The property vector is mapped to related semantic properties for that same data file and such that, during ANN training, pairwise similarity/dissimilarity in property is mapped, during towards corresponding pairwise semantic similarity/dissimilarity in semantic space to preserve semantic relationships. Based on comparisons between generated property vectors in continuous multi-dimensional property space, the system and method assess, rank, and then recommend and/or filter semantically close or semantically disparate candidate files from a query from a user that includes the data file. Applications of the categorization and recommendation system apply to search tools, including identification of illicit mate-
(Continued)

rials or logically progressive associations between disparate files.

26 Claims, 18 Drawing Sheets
(1 of 18 Drawing Sheet(s) Filed in Color)

(51) Int. Cl.
| | |
|---|---|
| G06F 16/33 | (2019.01) |
| G06F 16/438 | (2019.01) |
| G06F 16/638 | (2019.01) |
| G06F 16/68 | (2019.01) |
| G06F 40/30 | (2020.01) |
| G06F 40/45 | (2020.01) |
| G06N 3/02 | (2006.01) |
| G06N 3/049 | (2023.01) |
| G06N 3/08 | (2023.01) |
| G06N 7/01 | (2023.01) |
| H04L 9/40 | (2022.01) |
| G06Q 99/00 | (2006.01) |
| G06V 20/40 | (2022.01) |

(52) U.S. Cl.
CPC ........ *G06F 16/4387* (2019.01); *G06F 16/639* (2019.01); *G06F 16/686* (2019.01); *G06F 40/45* (2020.01); *G06N 3/02* (2013.01); *G06N 3/049* (2013.01); *G06N 3/08* (2013.01); *G06N 7/01* (2023.01); *H04L 63/0227* (2013.01); *G06Q 99/00* (2013.01); *G06V 20/46* (2022.01); *G10H 2250/311* (2013.01)

(58) Field of Classification Search
CPC .... H04L 63/0227; G06V 20/46; G06Q 99/00; G06K 9/6264; G06N 3/08; G06N 3/049
See application file for complete search history.

(56) References Cited

U.S. PATENT DOCUMENTS

| | | | | |
|---|---|---|---|---|
| 9,576,050 | B1* | 2/2017 | Walters | G06F 16/639 |
| 10,637,826 | B1* | 4/2020 | Luo | H04L 63/0227 |
| 10,936,653 | B2 | 3/2021 | Levy et al. | |
| 11,062,413 | B1* | 7/2021 | Hamidi | H04L 63/0227 |
| 2002/0133499 | A1 | 9/2002 | Ward et al. | |
| 2005/0038819 | A1 | 2/2005 | Hicken et al. | |
| 2006/0112098 | A1 | 5/2006 | Renshaw et al. | |
| 2009/0083023 | A1* | 3/2009 | Foster | G06F 40/45 704/3 |
| 2010/0332404 | A1* | 12/2010 | Valin | G06Q 99/00 705/310 |
| 2012/0269441 | A1 | 10/2012 | Marchesotti et al. | |
| 2012/0290621 | A1 | 11/2012 | Heitz et al. | |
| 2012/0316660 | A1 | 12/2012 | Luo et al. | |
| 2017/0061250 | A1 | 3/2017 | Gao et al. | |
| 2018/0052928 | A1 | 2/2018 | Liu | |
| 2018/0165546 | A1 | 6/2018 | Skans et al. | |
| 2018/0276540 | A1 | 9/2018 | Zhou | |
| 2018/0341702 | A1* | 11/2018 | Sawruk | G06F 16/686 |
| 2018/0349492 | A1 | 12/2018 | Levy et al. | |
| 2020/0082019 | A1 | 3/2020 | Allen et al. | |
| 2020/0110981 | A1* | 4/2020 | Yan | G06N 3/049 |
| 2020/0125575 | A1 | 4/2020 | Ghoshal et al. | |
| 2020/0195983 | A1 | 6/2020 | Chao | |
| 2020/0320388 | A1 | 10/2020 | Lyske et al. | |
| 2020/0320398 | A1* | 10/2020 | Lyske | G06F 40/30 |
| 2021/0004421 | A1* | 1/2021 | Zadorojniy | G06K 9/6264 |
| 2021/0012200 | A1 | 1/2021 | Lyske et al. | |
| 2021/0326707 | A1 | 10/2021 | Lyske et al. | |
| 2021/0383230 | A1 | 12/2021 | Lyske et al. | |
| 2022/0107975 | A1 | 4/2022 | Lyske et al. | |
| 2022/0108175 | A1 | 4/2022 | Lyske et al. | |
| 2022/0292355 | A1 | 9/2022 | Lyske | |

FOREIGN PATENT DOCUMENTS

| | | |
|---|---|---|
| EP | 3336774 A1 | 6/2018 |
| WO | 2010/027509 A1 | 3/2010 |

OTHER PUBLICATIONS

HFC, https://essentia.upf.edu/reference/std_HFC.html, accessed Jan. 21, 2021.
HPCP, https://essentia.upf.edu/reference/std_HPCP.html, accessed Jan. 20, 2021.
Huang et al., "A Graph-Based Framework to Bridge Movies and Synopses," ICCV, (2019), pp. 4592-4601.
Huang et al., "Caption-Supervised Face Recognition: Training a State-of-the-Art Face Model without Manual Annotation," The Chinese University of Hong Kong, Aug. 2020, 17 pages.
Huang et al., "From Trailers to Storylines: An EfficientWay to Learn from Movies," arXiv:1806.05341v1 [cs.CV], (2018), 9 pages.
Huang et al., "MovieNet: A Holistic Dataset for Movie Understanding," arXiv:2007.10937v1 [cs.CV], (2020), 58 pages.
Huang et al., "Person Search in Videos with One Portrait Through Visual and Temporal Links," ECCV, (2018), 17 pages.
Huang et al., "Unifying Identification and Context Learning for Person Recognition," CVPR, (2018), pp. 2217-2225.
Hussain et al., "Automatic Understanding of Image and Video Advertisements," 2017 IEEE Conference on Computer Vision and Pattern Recognition (CVPR), 2017, pp. 1705-1715.
Jongpil Lee et al., "Multi-Level and Multi-Scale Feature Aggregation Using Pretrained Convolutional Neural Networks for Music Auto-Tagging," IEEE Signal Processing Letters, vol. 24, No. 8 Aug. 2017 (Year: 2017).
Joosten et al., "Visual Voice Activity Detection at different Speeds," Proceedings of the 12th international conference on auditory-visual speech processing (AVSP 2013), pp. 187-190.
Karkkainen et al., "FairFace: Face Attribute Dataset for Balanced Race, Gender, and Age," arXiv:1908.04913v1 [cs.CV], (2019), 11 pages.
KeyExtractor, https://essentia.upf.edu/reference/std_KeyExtractor.html, accessed Jan. 20, 2021.
Kim et al., "Trends in Advertising Research: A Longitudinal Analysis of Leading Advertising, Marketing, and Communication Journals, 1980 to 2010," Journal of Advertising, vol. 43, No. 3, 2014, pp. 296-316.
Kulshreshtha et al., "Dynamic character graph via online face clustering for movie analysis," Multimedia Tools and Applications, vol. 79, (2020), pp. 33103-33118.
Kumar et al., "Robust multichannel gender classification from speech in movie audio," Interspeech, (2016), pp. 2233-2237.
Kuo et al., "Using Deep Convolutional Neural Networks for Image Retrieval," IS&T International Symposium on Electronic Imaging 2016 (Year: 2016).
L. Barrington, A. Chan, D. Turnbull and G. Lanckriet, "Audio Information Retrieval using Semantic Similarity," 2007 IEEE International Conference on Acoustics, Speech and Signal Processing—ICASSP '07, Honolulu, HI, 2007, pp. II-725-II-728, doi: 10.1109/ICASSP.2007.366338.
Laptev et al., "Learning realistic human actions from movies," 2008 IEEE Conference on Computer Vision and Pattern Recognition, 2008, pp. 1-8.
Levi et al., "Age and Gender Classification using Convolutional Neural Networks," Department of Mathematics and Computer Science, (2015), pp. 34-42.
Li et al., "The "Celeb" Series: A Close Analysis of Audio-Visual Elements in 2008 U.S. Presidential Campaign Ads," Undergraduate Journal of Humanistic Studies, Winter, vol. 4, (2017), 16 pages.
Luong et al., "Effective Approaches to Attention-based Neural Machine Translation," arXiv:1508.04025v5 [cs.CL], (2015), 11 pages.
Maharaj et al., "A dataset and exploration of models for understanding video data through fill-in-the-blank question answering," CVPR, (2017), pp. 6884-6893.

(56) References Cited

OTHER PUBLICATIONS

Malandrakis et al., "Affect extraction using aural, visual and linguistic features from multimedia documents," A thesis submitted for the degree of Master of Science, 2012, 114 pages.
Martinez et al., "Violence Rating Prediction from Movie Scripts," The Thirty-Third AAAI Conference on Artificial Intelligence (AAAI-19), (2019), pp. 671-678.
McAuliffe et al., "Montreal Forced Aligner: trainable text-speech alignment using Kaldi," ISCA, (2017), pp. 498-502.
Mei et al., "VideoReach: an online video recommendation system," pp. 767-768, Jan. 2007.
Mettes et al., "Spot On: Action Localization from Pointly-Supervised Proposals," arXiv:1604.07602v2 [cs.CV], (2016), 19 pages.
Muller et al., "Enhancing Similarity Matrices for Music Audio Analysis," IEEE 2006 (Year: 2006).
Music extractor, https://essentia.upf.edu/streaming_extractor_music.html, accessed Jan. 14, 2021.
Nagrani et al., "Voxceleb: Large-scale speaker verification in the wild," Computer Speech & Language, vol. 60, (2020), pp. 101027, 15 pages.
Naphade et al., "Large-scale concept ontology for multimedia," In IEEE MultiMedia, vol. 13, No. 3, pp. 86-91, Jul.-Sep. 2006.
Non-Final Office Action received for U.S. Appl. No. 16/784,136, dated Nov. 20, 2020, 23 pages.
Non-Final Office Action received for U.S. Appl. No. 16/784,144, dated Jul. 24, 2020, 19 pages.
Non-Final Office Action received for U.S. Appl. No. 17/353,511, dated Nov. 15, 2021, 15 pages.
Non-Final Office Action received for U.S. Appl. No. 17/369,204, dated Nov. 30, 2021, 15 pages.
OnsetRate, https://essentia.upf.edu/reference/std_OnsetRate.html, accessed Jan. 20, 2021.
P. Manocha, R. Badlani, A. Kumar, A. Shah, B. Elizalde and B. Raj, "Content-Based Representations of Audio Using Siamese Neural Networks," 2018 IEEE International Conference on Acoustics, Speech and Signal Processing (ICASSP), Calgary, AB, 2018, pp. 3136-3140, doi: 10.1109/ICASSP.2018.8461524.
Pan et al., "Jointly Modeling Embedding and Translation to Bridge Video and Language," 10.1109/CVPR.2016.497, (2016), pp. 4594-4602.
PitchSalience, https://essentia.upf.edu/reference/std_PitchSalience.html, accessed Jan. 21, 2021.
Popaa et al., "Gender Representations and Digital Media," Procedia—Social and Behavioral Sciences, vol. 180, (2015), pp. 1199-1206.
Ramakrishna et al., "Linguistic analysis of differences in portrayal of movie characters," Proceedings of the 55th Annual Meeting of the Association for Computational Linguistics, (2017), pp. 1669-1678.
Rao et al., "A Local-to-Global Approach to Multi-modal Movie Scene Segmentation," 2020 IEEE/CVF Conference on Computer Vision and Pattern Recognition (CVPR), Jun. 2020, pp. 10146-10155.
Rao et al., "A Unified Framework for Shot Type Classification Based on Subject Centric Lens," arXiv:2008.03548v1 [cs.CV], Aug. 2020, 18 pages.
Rectifier (neural networks), https://en.wikipedia.org/wiki/Rectifier_(neural_networks), accessed Jan. 20, 2021.
Rohrbach et al., "A Dataset for Movie Description," 015 IEEE Conference on Computer Vision and Pattern Recognition (CVPR), Boston, 2015, pp. 3202-3212.
Rohrbach et al., "Generating Descriptions with Grounded and Co-Referenced People," CVPR, (2017), pp. 4979-4989.
Rohrbach et al., "Movie Description," Int. J. Comput. Vis., (2017), vol. 123, pp. 94-120.
Rohrbach et al., "The Long-Short Story of Movie Description," arXiv:1506.01698v1 [cs.CV], (2015), 16 pages.
Aafaq et al., "Video Description: A Survey of Methods, Datasets, and Evaluation Metrics," ACM Computing Surveys, vol. 52, No. 6, Article 115, (2019), pp. 37 pages.

Activation Functions in Neural Networks, https://towardsdatascience.com/activation-functions-neural-networks-1cbd9f8d91d6, Jan. 20, 2021.
Advisory Action received for U.S. Appl. No. 16/784,144, dated Jan. 21, 2021, 3 pages.
Aggarwal, "Evaluating Recommender Systems, Chapter 7," Springer International Publishing Switzerland, (2016), pp. 225-254.
Akleman et al., "A Theoretical Framework to Represent Narrative Structures for Visual Storytelling," 2015, pp. 129-136., 10.13140/RG.2.1.3887.3440.
Aljanaki et al., "A Data-Driven Approach to Mid-Level Perceptual Musical Feature Modeling," 19th International Society for Music Information Retrieval Conference, Paris, France, 2018. (Year: 2018).
B. S. Manjunath, J.-. Ohm, V. V. Vasudevan and A. Yamada, "Color and texture descriptors," in IEEE Transactions on Circuits and Systems for Video Technology, vol. 11, No. 6, pp. 703-715, Jun. 2001, doi: 10.1109/76.927424.
Bahdanau et al., "Neural Machine Translation by Jointly Learning to Align and Translate," Published as a conference paper at ICLR 2015, 15 pages.
Bain et al., "Condensed Movies: Story Based Retrieval with Contextual Embeddings," May 2020, 21 pages.
Baltrusaitis et al., "Multimodal Machine Learning: A Survey and Taxonomy," IEEE Transactions on Pattern Analysis and Machine Intelligence, vol. 41, No. 2, Feb. 2019, pp. 423-443.
Bark scale, https://en.wikipedia.org/wiki/Bark_scale#Bark_Scale_Critical_bands, accessed Jan. 21, 2021.
Barrington et al., "Audio Information Retrieval using Semantic Similarity", 2007 IEEE International Conference On Acoustics, Speech, And Signal Processing Apr. 15-20, 2007, pp. 11-725.
Baruah et al., "A knowledge transfer and boosting approach to the prediction of Affect in movies," 2017 IEEE International Conference on Acoustics, Speech and Signal Processing (ICASSP) (2017), pp. 2876-2880.
Baveye, "Automatic Prediction of Emotions Induced by Movies," Other. Ecole Centrale de Lyon, (2015), 163 pages.
BeatsLoudness, https://essentia.upf.edu/reference/std_BeatsLoudness.html, accessed Jan. 20, 2021.
BeatTrackerMultiFeature, https://essentia.upf.edu/reference/std_BeatTrackerMultiFeature.html, accessed Jan. 20, 2021.
Bojanowski et al., "Finding Actors and Actions in Movies," 2013 IEEE International Conference on Computer Vision, Sydney, NSW, 2013, pp. 2280-2287.
Borges et al., "Video-Based Human Behavior Understanding: A Survey," IEEE Transactions on Circuits and Systems for Video Technology, vol. 23, No. 11, (2013), pp. 1993-2008.
BpmHistogramDescriptors, https://essentia.upf.edu/reference/std_BpmHistogramDescriptors.html, accessed Jan. 20, 2021.
Bushman et al., "Short-term and Long-term Effects of Violent Media on Aggression in Children and Adults," Arch. Pediatr. Adolesc. Med., vol. 160, (2006), pp. 348-352.
C. Bhat and S. K. Kopparapu, "FEMH Voice Data Challenge: Voice disorder Detection and Classification using Acoustic Descriptors," 2018 IEEE International Conference on Big Data (Big Data), Seattle, WA, USA, 2018, pp. 5233-5237, doi: 10.1109/BigData.2018.8622543.
Cao et al., "VGGFace2: A dataset for recognising faces across pose and age," 13th IEEE International Conference on Automatic Face & Gesture Recognition, (2018), pp. 67-74.
Cascante-Bonilla et al., "Moviescope: Large-scale Analysis of Movies using Multiple Modalities," arXiv:1908.03180v1 [cs.CV], Aug. 2019, 10 pages.
Charbuillet, Christophe & Tardieu, Damien & Peeters, Geoffroy. (2011). GMM supervector for Content Based Music Similarity.
Chaudhuri et al., "AVA-Speech: A Densely Labeled Dataset of Speech Activity in Movies," arXiv:1808.00606v2 [cs.SD], (2018), 5 pages.
Chen et al., "Vggsound: A Large-Scale Audio-Visual Dataset," ICASSP, IEEE, (2020), 721-725.
ChordsDescriptors, https://essentia.upf.edu/reference/std_ChordsDescriptors.html, accessed Jan. 21, 2021.
Chung et al., "VoxCeleb2: Deep Speaker Recognition," eiarXiv: 1806.05622v2 [cs.SD], (2018), 6 pages.

(56) References Cited

OTHER PUBLICATIONS

Crest, https://essentia.upf.edu/reference/streaming_Crest.html, accessed Jan. 20, 2021.
Danceability, https://essentia.upf.edu/reference/std_Danceability.html, accessed Jan. 20, 2021.
Deldjoo et al., "Movie genome: alleviating new item cold start inmovie recommendation," User Modeling and User-Adapted Interaction, vol. 29, (2019), pp. 291-343.
Diba et al., "Large Scale Holistic Video Understanding," arXiv:1904.11451v2 [cs.CV], (2019), 10 pages.
Dissonance, https://essentia.upf.edu/reference/std_Dissonance.html, accessed Jan. 21, 2021.
DistributionShape, https://essentia.upf.edu/reference/std_DistributionShape.html, accessed Jan. 21, 2021.
DynamicComplexity, https://essentia.upf.edu/reference/std_DynamicComplexity.html, accessed Jan. 21, 2021.
Energyband, https://essentia.upf.edu/reference/std_EnergyBand.html, accessed Jan. 21, 2021.
Entropy, https://essentia.upf.edu/reference/std_Entropy.html, accessed Jan. 20, 2021.
Eyben et al., "Real-Life Voice Activity Detection With Lstm Recurrent Neural Networks And An Application To Hollywood Movies," 2013 IEEE International Conference on Acoustics, Speech and Signal Processing, 2013, pp. 483-487.
Final Office Action received for U.S. Appl. No. 16/784,144, dated Nov. 3, 2020, 23 pages.
FlatnessDB, https://essentia.upf.edu/reference/std_FlatnessDB.html, accessed Jan. 21, 2021.
Flux, Jan. 21, 2021, https://essentia.upf.edu/reference/std_Flux.html, accessed Jan. 21, 2021.
Gemmeke et al., "Audio Set: An ontology and human-labeled dataset for audio events," 2017, pp. 776-780, 10.1109/ICASSP.2017.7952261.
Ghaleb et al., "Accio: A Data Set for Face Track Retrieval in Movies Across Age," ICMR '15, (2015), pp. 455-458.
Glossary of Musical Terms, https://www.naxos.com/education/glossary.asp?char=P-R#, accessed Jan. 14, 2021.
Goyal et al., "A multimodal mixture-of-experts model for dynamic emotion prediction in movies," 2016, pp. 2822-2826, 10.1109/ICASSP.2016.7472192.
Gu et al., "AVA: A Video Dataset of Spatio-temporally Localized Atomic Visual Actions," CVPR, (2018), pp. 6047-6056.
Guha et al., "Computationally deconstructing movie narratives: An informatics approach," 2015 IEEE International Conference on Acoustics, Speech and Signal Processing (ICASSP), Brisbane, QLD, 2015, pp. 2264-2268.
Guha et al., "Gender Representation in Cinematic Content: A Multimodal Approach," pp. 31-34, (2015), 10.1145/2818346.2820778.
Guo et al., "MS-Celeb-1M: A Dataset and Benchmark for Large-Scale Face Recognition," 9907, Jul. 2016, pp. 87-102.
Hanjalic, "Extracting moods from pictures and sounds: towards truly personalized TV," in IEEE Signal Processing Magazine, vol. 23, No. 2, pp. 90-100, Mar. 2006.
Sap et al., "Connotation Frames of Power and Agency in Modern Films," Proceedings of the 2017 Conference on Empirical Methods in Natural Language Processing, (2017), pp. 2329-2334.
Schedl et al., "VSD2014: A Dataset for Violent Scenes Detection in Hollywood Movies and Web Videos," IEEE, (2015), 6 pages.
Search with an image on Google, https://support.google.com/websearch/answer/1325808?hl=en, accessed Jan. 14, 2021.
Sharma et al., "Crossmodal learning for audio-visual speech event localization," arXiv:2003.04358v1 [cs.CV], Mar. 2020, 16 pages.
Sharma et al., "Multichannel attention network for analyzing visual behavior in public speaking," IEEE Winter Conference on Applications of Computer Vision, (2018), pp. 476-484.
Sharma et al., "Toward Visual Voice Activity Detection For Unconstrained Videos," IEEE, (2019), pp. 2991-2995, 10.1109/ICIP.2019.8803248.
Simoes et al., "Movie Genre Classification with Convolutional Neural Networks," International Joint Conference on Neural Networks (IJCNN), (2016), pp. 259-266.
Somandepalli et al., "Multi-Face: Self-supervised Multiview Adaptation for Robust Face Clustering in Videos," arXiv:2008.11289v1 [cs.CV], (2020), 17 pages.
Somandepalli et al., "Multimodal Representation of Advertisements Using Segment-level Autoencoders," ICMI'18, (2018), pp. 418-422.
Somandepalli et al., "Reinforcing self-expressive representation with constraint Propagation for face clustering in movies," ICASSP, (2019), pp. 4065-4069, 10.1109/ICASSP.2019.8682314.
Somandepalli et al., "Unsupervised Discovery of Character Dictionaries in Animation Movies," IEEE Transactions on Multimedia, vol. 20, No. 3, (2018), pp. 539-551.
SpectralComplexity, https://essentia.upf.edu/reference/std_SpectralComplexity.html, accessed Jan. 21, 2021.
SpectralContrast, https://essentia.upf.edu/reference/std_SpectralContrast.html, accessed Jan. 21, 2021.
StrongPeak, https://essentia.upf.edu/reference/std_StrongPeak.html, accessed Jan. 21, 2021.
Sun et al., "VideoBERT: A Joint Model for Video and Language Representation Learning," ICCV, (2019), pp. 7464-7473, 10.1109/ICCV.2019.00756.
Suzuki et al., "A similarity-based neural network for facial expression analysis," Pattern Recognition Letters 28 (2007) 1104-1111 (Year: 2007).
Torabi et al., "Learning Language-Visual Embedding for Movie Understanding with Natural-Language," arXiv:1609.08124v1 [cs.CV], Sep. 2016, 13 pages.
TuningFrequency, https://essentia.upf.edu/reference/std_TuningFrequency.html, accessed Jan. 20, 2021.
Vicol et al., "MovieGraphs: Towards Understanding Human-Centric Situations from Videos," CVPR, (2018), pp. 8581-8590.
Wehrmann et al., "Movie genre classification: A multi-label approach based on convolutions through time," Applied Soft Computing, vol. 61, (2017), pp. 973-982.
Weng et al., "RoleNet: Movie Analysis from the Perspective of Social Networks," in IEEE Transactions on Multimedia, vol. 11, No. 2, pp. 256-271, Feb. 2009.
Wiggins, G. A. et al, On the non-existence of music: Why music theory is a figment of the imagination., Mar. 1, 2010, Musicae Scientiae, 231-235.
Xu et al., "MSR-VTT: A Large Video Description Dataset for Bridging Video and Language," CVPR, (2016), 9 pages, 10.1109/CVPR.2016.571.
Xu et al., "Show, Attend and Tell: Neural Image Caption Generation with Visual Attention," Proceedings of the 32nd International Conference on Machine Learning, (2015), vol. 37, (2015), 10 pages.
ZeroCrossingRate, https://essentia.upf.edu/reference/std_ZeroCrossingRate.html, accessed Jan. 21, 2021.
Zhou et al., "Learning Deep Features for Discriminative Localization,"2016 IEEE Conference on Computer Vision and Pattern Recognition (CVPR), Las Vegas, NV, 2016, pp. 2921-2929.
Zhou et al., "Movie Genre Classification via Scene Categorization," pp. 747-750, 10.1145/1873951.1874068.
Zhou et al., "Places: A 10 Million Image Database for Scene Recognition," IEEE Trans. On Pattern Analysis and Machine Intelligence, vol. 40, No. 6, (2018), pp. 1452-1464.
Chang JW. et al., "Music recommender using deep embedding-based features and behavior-based reinforcement learning," Multimedia Tools and Applications, Kluwer Academic Publishers, Boston, US, vol. 80. Issue 26-27, 2019, pp. 34037, 34064.
International Search Report and Written Opinion received for PCT Patent Application No. PCT/GB21/052551, dated Feb. 8, 2022, 29 pages.
Non-Final Rejection received for U.S. Appl. No. 17/520,585, dated Mar. 28, 2022, 4 pages.
Notice of Allowance and Fees Due (PTOL-85) dated Apr. 4, 2022 for U.S. Appl. No. 17/353,511.
Notice of Allowance and Fees Due (PTOL-85) dated Apr. 25, 2022 for U.S. Appl. No. 17/353,511.

(56) References Cited

OTHER PUBLICATIONS

Notice of Allowance and Fees Due (PTOL-85) dated Mar. 9, 2022 for U.S. Appl. No. 17/353,511.
Notice of Allowance and Fees Due (PTOL-85) dated Mar. 12, 2021 for U.S. Appl. No. 16/784,144.
Notice of Allowance and Fees Due (PTOL-85) dated May 18, 2022 for U.S. Appl. No. 17/353,511.
Outgoing—ISA/210—International Search Report dated Jun. 19, 2020 for WO Application No. PCT/GB20/050865.
Sylvester C , "How I taught a neural network to understand similarities in music audio," Nov. 24, 2019, pp. 1-8.
Non-Final Office Action received for U.S. Appl. No. 17/752,950, dated Jul. 29, 2022, 27 pages.
Bogdanov, et al. Unifying Low-Level and High-Level Music Similarity Measures. IEEE Transactions on Multimedia, vol. 13, No. 4, Aug. 2011. (Year: 2011).

\* cited by examiner

FIG. 5B

SYSTEM AND METHOD FOR EVALUATING SEMANTIC CLOSENESS OF DATA FILES

CROSS-REFERENCE TO RELATED APPLICATIONS

This application is a continuation of U.S. patent application Ser. No. 17/492,211 filed Oct. 1, 2021, entitled "SYSTEM AND METHOD FOR RECOMMENDING SEMANTICALLY RELEVANT CONTENT", which claims priority to United Kingdom Application No. 2015695.6, filed Oct. 2, 2020, the entirety of each of which are incorporated herein by reference.

BACKGROUND TO THE INVENTION

This invention relates, in general, to artificial intelligence and neural networks that generate a property-based file vector derived from extracted properties from a data file and where the property-based file vector both preserves and is representative of semantic properties of the data file. More particularly, the present invention relates to a system and method for assessing, ranking and then recommending and/or filtering semantically close or semantically disparate candidate files in a database in response to a query from a user, especially but not exclusively to a query in an internet-based platform such as a social media platform or search engine. More especially, applications of the categorization and recommendation system and method apply to media in the form of music, video and/or images data files, although the application widely appliable and finds application in evaluation of speech and text data files, including personal reports.

SUMMARY OF THE PRIOR ART

One of the most challenging long-term objectives for artificial intelligence "AI", typically based on an artificial neural network architecture, is to replicate human intellectual behaviour. This is a complex proposition not least because human opinion is based on subjective responses to stimuli and existing approaches in AI do not correlate well with emotional perspective responses. Rather, the rationale for the computing architecture in AI is implication of a most likely response based on assimilation of large quantities of data that have objectively discernible properties.

Refinement, i.e. training, of a deep neural network "DNN" is frequently based on the concept of "backpropagation", i.e. the backward propagation of errors, to calculate a gradient that is needed in the DNN's calculation of the weights to be used in the network, as will be understood. The DNN therefore moves through its layers, as will be understood, calculate the probability of each output in an attempt to find the correct mathematical manipulation that turns the input into the output irrespective of whether it be a linear relationship or a non-linear relationship.

As a practical example of the current limited approach in AI to music interpretation, identification of perceived similarity between different pieces of music is constrained to absolute similarities rather than being related to semantically-perceived similarities. This may, at first inspection, not appear problematic, but on an intellectual and real footing a fundamental problem remains because "there is no such thing as music, except as created, perceived, and experienced in the human mind. In other words, "Music, in its own right, does not exist . . . because neither music nor language can be studied as pure surface forms because the cognition of both produces information which is not contained in the surface form". This proposition is established in the paper "On the non-existence of music: why music theory is a figment of the imagination" by Geraint A. Wiggins et al in ESCOM European Society for the Cognitive Sciences of Music, Musicae; Scientiae, Discussion Form 5, 2010, pages 231-255.

Hence, existing AI modelling that, from its outset, is based on a degree of absoluteness (based on the interpretation of measured parameters) is fatally flawed with the consequence that it will generate, in the exemplary context of a musical search tool, inconsistent and/or spurious results.

The same problems exist with the identification and categorization of other forms of expression, such as paintings or photographs or indeed interpretations of imagery, such as medical CT scans, or other purely descriptive expressions (such as a description of a smell, a medical report or an outline of a plot in a work of fiction) to locate and assess, relative to a defined start point (e.g. a particular description of a fragrance or the tonality, rhythm and timbre of a musical composition), the relevance of searchable electronic images and/or data that are either entirely unrelated or otherwise are potentially relevant to one another from the perspective of having an acceptably close set of subjective attributes, qualities or characteristics.

In fact, existing AI systems cannot resolve semantically-relevant attributes and therefore can both overlook semantic similarities whilst accepting or suggesting that perceptually-distinct dissimilarities are closely related.

The music, film and gaming industry—and particularly aspects relating to the provision of content—is evolving. In this respect, the sale or distribution of (for example) music or soundtracks as either streamed or downloaded digital files is becoming dominant in those markets. This contrasts with the sale of compact disc and DVD technologies (or, historically, vinyl disks) through established, but now waning, custom retail outlets.

Whilst music sales are commercial and content perceptual and aesthetic in nature, there is no existing, straightforward and reliable mechanisms to locate tracks that share common musical characteristics honed to an individual's specific tastes. To qualify this statement, music is broadly categorised in terms of its genre, e.g. jazz, rock, classical and blues to name but a few, but within each of these genres there usually exist vast numbers of sub-categories or sub-species. For example, there are apparently at least thirty different forms of jazz, including free-funk, crossover, hard bop and swing. These sub-species may share some overarching similarities in user-discernible compositional architectures that define the genus, but frequently there are also significant dissimilarities that are sufficiently audibly or musically pronounced. To provide further context, two different species of jazz may perceptually be so profoundly audibly different for a particular listener to conclude that one is likeable whereas the other is not. By the same (but reverse) token, a listener may prematurely disregard (or simply just not be aware that) a piece of classical music based on a flawed perception that its listening characteristics [in musical space and in a musical sense] should be disparate to those orchestrated a piece of hard rock when, in fact, these two different audio tracks are substantially identical in terms of their closeness in musical space.

With typically online music libraries each containing millions of songs—the iTunes® and Tidal® music libraries allegedly each contain around fifty million tracks—the problem exists about how these databases can be effectively searched to identify user-perceived common musical themes, traits or features between myriad tracks potentially spanning entirely different genres. Consequently, a search for similar music could—and, to date, indeed frequently does—discount entire genres [or at least sub-species of a genre] from consideration and/or fails to associate together extremely relevant musical content in different tracks from different genres. Commercial libraries can make use of "collaborative filtering" in which recommendations are made based on the playlists of other users who have listened to the same song, but this approach depends heavily on stored user data and statistical usage. Collaborative filtering can reflect the personal preferences of a listener/user of the library, but it is limited by the amount of user data available and so is not in itself a complete solution.

There is also the issue of "cold start" which arises when a new (in the sense of an unknown or little known) artist [i.e. a novice, newcomer or "newbie" potentially signed by a recording studio or label] releases their first audio track or first album. The problem is that the artist is unknown and therefore has no effective following either on-line or elsewhere, such as acquired listeners from promotion over the radio aether or television. Expressing this differently, the lack of a listening history provides a roadblock both to making recommendations, such as through collaborative filtering, or establishing a reputation and following for the newbie. The problems for the distributor, e.g. a record label, are how do they raise awareness of the new artist, how do they categorize the nature [which arguably is variable since it is user-perceivable] of the new artist's music and, in fact, how do they link/insert the music into an existing music library so that it is listened to, downloaded or streamed to ensure maximum exposure for commercialization reasons? The problem for the listening and/or streaming public or radio stations is that, in the context of these newbies, 'they don't know what they don't know' so the probability of randomly finding the newbie's initial foray into the world of music is slim and based more on luck than judgement.

For the distributor, effective exposure of and access to the artist's musical tracks equates to an increased likelihood of sales. Indeed, from a commercial perspective, it is also desirable to avoid a "slow burn" and therefore rapidly to grow the reputation of a new artist.

In short, the new artist must break into the market with an unproven and new product. In contrast, fans of existing artists will invariably follow, i.e. both monitor and generally be inclined to purchase, newly-released music from those existing artists irrespective of whether such newly-released music is good or bad. Indeed, even with poor critical acclaim, newly-released music from a popular artist will be streamed, listened to and/or purchased so the "cold start" problem does not exist for existing artists with an established following and listener base. The cold-start problem therefore stifles dissemination of music and also the potential evolution of new form of music.

In addition, the nature of user perception and musical appreciation is a rapidly employed personal trait. Particularly, a listener will make an assessment about whether a track is palatable and preferably to their individual taste within a few seconds of the track (or a section thereof) being played/heard. Consequently, any track finding recommendation scheme, realised for example as a downloadable app, must be intrinsically quick (in terms of identifying a recommendation) and also reliable in that any recommendation it makes needs to satisfy user-perceived musical values, i.e. personal musical tastes. Any track finding recommendation tool that throws up seemingly random tracks, such as those of existing systems that make use of statistical analysis of demographic data by other users with identified common interests or circumstances (e.g. age range 30-40, married with two children, working as an accountant and living in a mortgaged property in Staten Island, N.Y.), is ultimately poor and its use disregarded or discounted. Perceptual categorization of musicologically-similar audio tracks, irrespective of genre, is therefore an important consideration for effective audio track finding technologies.

The problems identified above are not addressed by existing apps such as Shazam® and SoundHound® since these apps focus on identification of an audio track that is sampled in real-time or otherwise these apps list tracks that others in the community are discovering.

With SoundHound®, a song can be sung or hummed to try to identify it. These apps therefore identify the track being played/sampled or, based on reported hard numbers, they may make a recommendation for potential further listening that, frequently, is not overly relevant. These existing apps provide no perception of musicological similarities into myriad tracks in a music library.

Another of the issues faced by the music industry is how best to augment the listener/user experience, especially on a personal/individual level. Indeed, it has long been recognized that the contextual relevance of or relationship between a piece of music and an event brings about recognition or induces a complementary emotional response, e.g. a feeling of dread or suspense during a film or a product association arising in TV advertising.

Identification of common musical traits is desirable because it has been recognized that appropriate use of musical content supports emotional, physiological and/or psychological engagement of the listener and therefore promotes the listener's sensory experience. This is, for example, relevant to game developers and/or advert or film trailer producers/editors who are tasked with rapidly compiling a suitable multimedia product that aligns relevant music themes, such as increasing musical intensity (in the context of an increasing sense of developing drama and urgency and not necessarily in the context of an absolute audio power output level) with video output. In providing at least one resultant "proof" for review, the developer or editor has already expended considerable time in identifying potentially suitable music and then fitting/aligning the selected music to the video. To delay having to identify a commercially-usable audio track, content developers presently may make use of so-called "temp tracks" that are often well-known tracks having rights that cannot be easily obtained, but this is just a stop-gap measure because a search is then required to identify a suitable commercially-viable track for which use rights can be obtained. Further time delays then arise from the instructing client having to assessing whether the edit fits with their original brief. Therefore, an effective track searching tool would facilitate identification of a selection of alternative musical tracks for alignment with, for example, a visual sequence or the building of a musical program (such as occurs within "spin" classes that choreograph cycling exercise to music to promote work rates).

Technology does exist on the web to search for images having identical or similar visual characteristics, including identifying websites that present such identical or related images. For example, Google® supports a computer program application [sometimes foreshortened to the term "app"] called "Reverse Image Search" (see https://support.google.com/websearch/answer/1325808?hl=en) in which an uploaded image is apparently broken down into groups of constituent bits, at a server, and those groups of bits searched to identify related images according to some form of logical distance measure within a defined parameter space. Identified related images are then provided to the user who made use of the app and who uploaded the original image.

Whilst image comparison requires complex computations (typically based on a neural network), it is observed that the fundamental source document can be broken down into shapes, colour(s) and/or dimensions, such as angles or lengths. Contrasting of one or more of these factors allows for association to be established, e.g. through relative scaling. In contrast, a critique of musical characteristics, although again making use of a neural network, has to date been generally hampered by the difficulties in resolving perceptually more subtle differences in musical structures.

SUMMARY OF THE INVENTION

According to a first aspect of the invention there is provided a method of evaluating semantic closeness of a source data file relative to at least some of a plurality of candidate data files in a database and, in response to the evaluation, generating a list identifying at least one semantically close candidate data file from the database, the method comprising: processing the source file to extract properties therefrom; calculating a file vector in property space from said extracted properties, wherein the file vector both preserves and is representative of semantic properties of content of the source data file; comparing the file vector to a plurality of property vectors, wherein each of said at least some of the plurality of candidate data files has an associated property vector of said plurality of property vectors; determining a measured separation in continuous multi-dimensional property space between the file vector of the source file relative to respective property vectors of the at least some of the plurality of candidate data files; generating said list based on said measured separation and semantic closeness of content of the source data file; and providing the list as a recommendation.

The source data file may be compared against all of the candidate data files in the database.

The file vector and each property vector is an output from a trained artificial neural network "ANN" that, following pairwise training of the ANN using pairs of training files, maps pairwise similarity/dissimilarity in property space towards corresponding pairwise semantic similarity/dissimilarity in semantic space to preserve semantic evaluation by valuing, on a pairwise basis, semantic perception reflected in quantified semantic dissimilarity distance measures over property assessment reflected by distance measures in property space.

The database may include property vectors for candidate files cross-referenced to a descriptor or code identifying the content of each candidate file.

In an embodiment, the method includes preventing upload of the source data file when the descriptor or code indicates content in the source data file is inappropriate for circulation or publication.

The method may subsequently generate a report identifying a point of origin or user identify for the source file.

In other embodiments, the method includes: supplying candidates files on the list to a predictor arranged to refine the recommendation; inputting at least one of user data and media information relating to content into the predictor; and generating a revised list of candidate data files having regard to the list and the user data and/or media information.

In another embodiment, the method further comprises: computing a file vector as an embedding for the source data file; detecting a number of close neighbour candidate files for which determined distance measures relative to the file vector do not exceed a predefined threshold; assembling one or more textual descriptions for the candidate files reflective of respective property vectors therefor; generating a representative composite textual description from descriptions associated with candidate files within the threshold distance; and making the representative composite textual description available.

The data files may contain content in the form of at least one of music, video, images data, speech, and text files.

In another aspect of the invention there is provided a method of generating a playlist, the method comprising: processing the source file to extract properties therefrom; calculating a file vector in property space from said extracted properties, wherein the file vector both preserves and is representative of semantic properties of content of the source data file; comparing the file vector to a plurality of property vectors, wherein each property vector is associated with a candidate data file of a plurality of candidate data files in a database; determining a measured separation in continuous multi-dimensional property space between the file vector of the source data file relative to respective property vectors of the at least some of the plurality of candidate data files; and plotting a progressive transition through the playlist by selecting candidate data files between the source data file and an end data file in which transitions between consecutive data files in the playlist ensures that transitions and semantic distances between adjacent data files are within a threshold distance and that the direction of travel through the playlist is semantically towards the end data file.

Transitions between adjacent files may be the shortest measured separation in continuous multi-dimensional property space.

Each transition between adjacent files may assess measured separation in a subset of candidate data files in the database.

In the method of generating a playlist, the file vector and each property vector is an output from a trained artificial neural network "ANN" that, following pairwise training of the ANN using pairs of training files, maps pairwise similarity/dissimilarity in property space towards corresponding pairwise semantic similarity/dissimilarity in semantic space to preserve semantic evaluation by valuing, on a pairwise basis, semantic perception reflected in quantified semantic dissimilarity distance measures over property assessment reflected by distance measures in property space.

In yet another aspect of the invention there is provided a method of providing a file recommendation based on sematic qualities, the method comprising: identifying a recently consumed reference data file that has been consumed by a user; processing the reference data file to extract properties therefrom; calculating a first file vector in property space from said extracted properties, wherein the first file vector both preserves and is representative of semantic properties of content of the reference data file; evaluating a new data file in terms of semantic closeness to the reference data file, said evaluation based on a relative comparison between the first file vector and a different second file vector derived from properties of the new data file and where the second file vector also preserves and is representative of semantic properties of content of the new data file; determining availability and extent of at least one of (a) user data obtained for the user, and (b) property vectors in candidate file data, said property vectors reflective of semantic qualities therein; providing the file recommendation based on a probabilistic weighting between: a content-based approach of semantic closeness evaluated between the reference data file and the new data file; and a predictive approach based on one of a predictive model, a reinforcement learning "RL" algorithm or heuristic processing function, wherein the predictive approach is based on sufficiency in availability of user data and property vectors in candidate file data.

The probabilistic weighting between the content-based approach and the predictive approach may vary with time.

Initially, the content-based approach may be absolute.

In a further aspect of the invention there is provided a system of evaluating semantic closeness of a source data file relative to at least some of a plurality of candidate data files stored in a database, the system comprising processing intelligence arranged to: process the source file to extract properties therefrom; calculate a file vector in property space from said extracted properties, wherein the file vector both preserves and is representative of semantic properties of content of the source data file; compare the file vector to a plurality of property vectors, wherein each property vector of the plurality of property vectors is associated with a particular candidate data file of the plurality of stored candidate data files; determine a measured separation in continuous multi-dimensional property space between the file vector of the source file relative to respective property vectors of at least some of the plurality of candidate data files; generate a list based on said measured separation and semantic closeness of content of the source data file, wherein the list identifies, relative to the source data file, at least one semantically close candidate data file from the database; and provide the list as a recommendation.

The system intelligence may compare the source data file against all of the candidate data files in the database The file vector and each property vector is an output from a trained artificial neural network "ANN" that, following pairwise training of the ANN using pairs of training files, maps pairwise similarity/dissimilarity in property space towards corresponding pairwise semantic similarity/dissimilarity in semantic space to preserve semantic evaluation by valuing, on a pairwise basis, semantic perception reflected in quantified semantic dissimilarity distance measures over property assessment reflected by distance measures in property space.

The database may include property vectors for candidate files cross-referenced to a descriptor or code identifying the content of each candidate file.

The system intelligence may be arranged to prevent upload of the source data file when the descriptor or code indicates content in the source file is inappropriate for circulation or publication.

The system intelligence may be further arranged to generate a report the identification of a point of origin or user identify for the source file. This information may be obtained from user credentials, including registration and log-in details, or a MAC address.

The database may remote to a user device that is arranged to upload the source data file.

The system may include a predictor arranged to refine the recommendation, wherein the predictor has: a first input responsive to candidate data files on the list; and at least a second input responsive to at least one of user data and media information relating to content; and wherein the predictor is arranged to generate a revised list of candidate data files having regard to the list and the user data and/or media information.

In a particular embodiment, the system intelligence is arranged to: compute a file vector as an embedding for the source data file; detect a number of close neighbour candidate files for which determined distance measures relative to the file vector do not exceed a predefined threshold; assemble one or more textual descriptions for the candidate files reflective of respective property vectors therefor; generate a representative composite textual description from descriptions associated with candidate files within the threshold distance; and make the representative composite textual description available.

The data files can contain content in the form of at least one of: music, video, images data, speech, and text files.

The system intelligence may be a server-side component remotely and selectively connected to a user device over a network. The system intelligence may be distributed, but it can also be realised in software or a combination of software and hardware.

In yet another aspect of the invention there is provided a processor for generating a playlist from candidate files stored in a database, the processor arranged to: process a source data file to extract properties from content thereof; calculate a file vector in property space from said extracted properties, wherein the file vector both preserves and is representative of semantic properties of the content of the source data file; compare the file vector to a plurality of property vectors, wherein each property vector is associated with a candidate data file of a plurality of candidate data files; determine a measured separation in continuous multi-dimensional property space between the file vector of the source data file relative to respective property vectors of the at least some of the plurality of candidate data files; and plot a progressive transition through the playlist by selecting candidate data files between the source data file and an end data file in which transitions between consecutive data files in the playlist ensures that transitions and semantic distances between adjacent data files are within a threshold distance and that the direction of travel through the playlist is semantically towards the end data file.

Transitions between adjacent files may be assessed by the processor to be the shortest measured separation in continuous multi-dimensional property space.

Each transition between adjacent files may be assessed on the basis of measured separation to a subset of candidate data files in the database.

In still yet another aspect of the invention there is provided a system containing processing intelligence arranged to provide a file recommendation based on sematic qualities, the system intelligence arranged to: process a reference data file to extract properties therefrom; calculate a first file vector in property space from said extracted properties, wherein the first file vector both preserves and is representative of semantic properties of content of the reference data file; evaluate a new data file in terms of semantic closeness to the reference data file, said evaluation based on a relative comparison between the first file vector and a different second file vector derived from properties of the new data file and where the second file vector also preserves and is representative of semantic properties of content of the new data file; determine availability and extent of at least one of (a) user data obtained for the user, and (b) property vectors in candidate file data, said property vectors reflective of semantic qualities therein; provide the file recommendation based on a probabilistic weighting between: a content-based approach of semantic closeness evaluated between the reference data file and the new data file; and a predictive approach based on one of a predictive model, a reinforcement learning "RL" algorithm or heuristic processing function, wherein the predictive approach is based on sufficiency in availability of user data and property vectors in candidate file data.

The system intelligence may be arranged to vary with time the probabilistic weighting between the content based approach and the predictive approach.

The system intelligence may initially make the content-based approach absolute.

The system intelligence may be a server-side component remotely and selectively connected to a user device over a network. Alternatively, the system intelligence is located, at least in part, in a user device.

According to the various embodiments and aspects described, the property vector is derived from extractable measurable properties of a data file is mapped to semantic properties for that data file. The property vector is an output from a trained artificial neural network that, following pairwise training of the ANN using pairs of files that map pairwise similarity/dissimilarity in property space towards corresponding pairwise semantic similarity/dissimilarity in semantic space, both preserves and is representative of semantic properties of the data file. The system and method assesses, based on comparisons between generated property vectors, ranks and then recommends and/or filters semantically close or semantically disparate candidate files in a database from a query from a user that includes the data file. Applications of the categorization and recommendation system and method apply to media or search tools and social media platforms, including media in the form of music, video, images data and/or text files.

The processing intelligence functions to associates quantified semantic dissimilarity measures for said content in semantic space with related property separation distances in property space for measurable properties extracted for that content.

Fundamentally, the approach differs from current data science approaches that have their approaches rooted back to hard and/or absolute data values. Rather, the system makes use of weighted output results from a neural network tasked with evaluating, in a vector space, dissimilarity of extracted measurable properties of pairwise-contrasted source files back towards human perception of similarity/dissimilarity as expressed in semantic space between the same pairwise-contrasted source files. This semantic space is a different vector space in which subjective descriptive context is mapped into measurable vectors representative of the context but now expressed in manipulative mathematical form. In other words, the embedding process is designed such that subjective descriptions which are semantically similar are viewed in the resulting vectoral (semantic) space as correspondingly similar. The resulting use of the embedding permits for improved and more reliable recommendations and responses to user queries presented as an uncoded/raw data file to the system intelligence.

Advantageously, the present invention provides an innovative methodology for data categorization and, more particularly, a system and method that permits rapid assimilation of user-perceivable qualities between original data and possible relevant search data, e.g. detection of audio or sections of an audio file that are likely to warrant a listener's interest. The approach applies equally to image, video, text and speech data files or a combination of two or more of these file types.

A preferred embodiment, amongst other things, provides a track finder or track recommendation tool that is able to consistently characterize a file by distilling out identifiable properties in a section thereof, and then to identify other files that commonly share those characteristics and/or subjective qualities.

Given the number of accessible files, including variations that can subtly or significantly change the original file, within data libraries (whether personal ones containing hundreds or a few thousand files or commercial libraries having millions of files for commercial streaming, download or reference) the present invention provides a useful and effective recommendation tool that hones search results for files based on ranking of perceived similarities in qualities and is thus able to disregard arbitrary categorization and rather to focus on perceptive qualities/similarities.

The search and recommendation tools of the various embodiments therefore beneficially reduces the need for extensive review of files to identify new content (in new data files) that is consistent with the user's particular and subjective tastes, i.e. the search and recommendation tool reduces the search space by identifying user-orientated perceptually relevant data from candidate data files. Moreover, through objective and technically qualified assessment, the embodiments of the invention provide increased and more rapid access to a greater range of content that is stored or accessible through libraries, especially subscriber-accessible on-line libraries or server stores, thereby lending itself to improving both end-user selection and end-user access to content through qualified recommendation.

The embodiments of the invention can therefore mitigate the issues of cold start by promoting new files, artists, creators or avenues for research to a more selective and likely more receptive user base based on perceptually similar properties in file content.

The principles apply to the identification of other contextually describable subjective works that act as a source for computer-implemented data analysis, including music, images, text and/or video.

Various aspects and embodiments of the invention as outlined in the appended claims and the following description can be implemented as a hardware solution and/or as software, including downloadable code or a web-based app.

BRIEF DESCRIPTION OF THE DRAWINGS

The application file contains at least one drawing executed in color. Copies of this patent application publication with color drawings will be provided by the Office upon request and payment of the necessary fee.

Exemplary embodiments of the present invention will now be described with reference to the accompanying drawings in which:

Figure 5B:
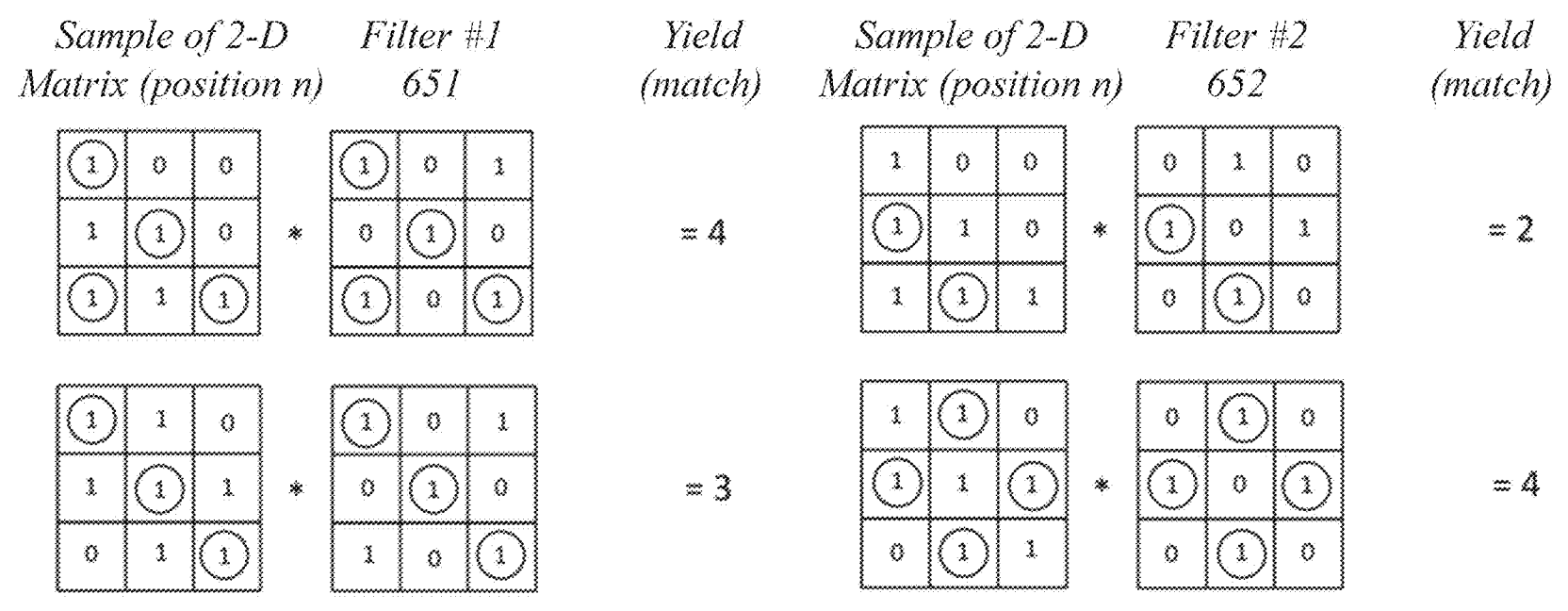

FIG. 5B is illustrative of various examples in which filters are being applied.

DETAILED DESCRIPTION OF A PREFERRED EMBODIMENT

Figure 1:
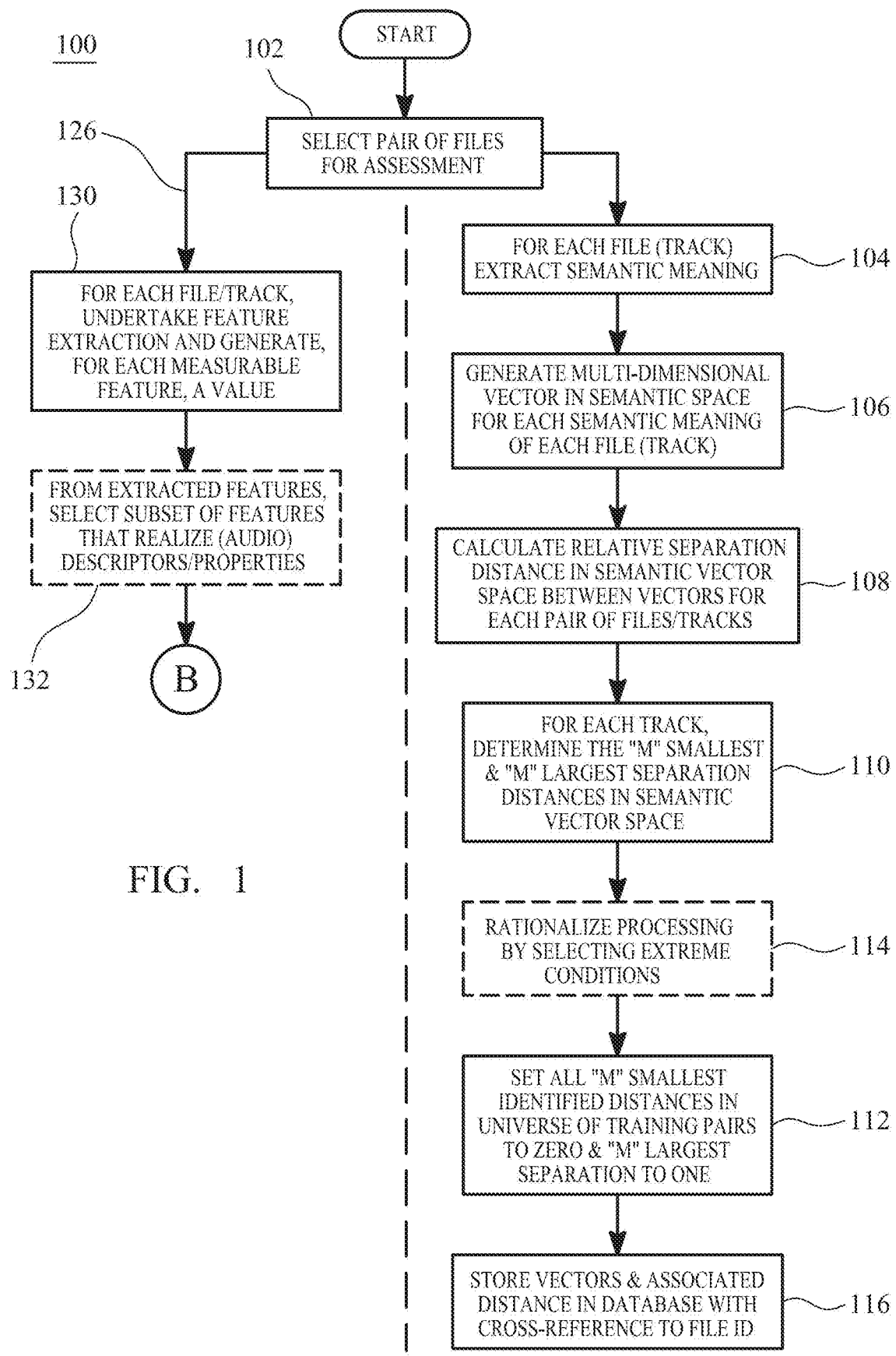
FIG. 1 represents a flow diagram of a preferred process to assess dissimilarity of files and, particularly, audio files, and a process by which an artificial neural network may be trained according to the present invention.

In order to provide a tool, such as accessed through a web-browser or local app, that evaluates semantic similarities or dissimilarities between (for example) audio tracks, it has been recognised that it is necessary to make use of deep-learning and artificial intelligence to identify similarities between semantic meaning, processed to provide a first metric in semantic space, and extracted measurable properties for content of the same data source in a different measurable space, such as Euclidean space (although other dimensional spaces may be used). This process effectively provides a translational mapping between the similarities in semantic meaning in one space and similarities in extracted measurable properties in another space.

More particularly, it has been recognized that a measure of emotionally-perceptive similarity or dissimilarity (especially in the exemplary sense of a digital audio file, image file or other perceptive aesthetic creation in digital form) cannot be derived from hard data fields alone, e.g. quantized representations of signal quality, since such hard data does not provide for any interpretation that is experienced by a human-reviewer, e.g. a listener. In other words, feature extraction in isolation does not give a sufficiently accurate objective assessment of emotionally-perceived similarity or dissimilarity because quantised representations (whether in isolation or grouped) of signal qualities do not provide any relationship into the emotive real-world.

The present invention therefore functions, initially, in the context of one or more trained artificial neural networks ANNs that [relative to deficient earlier entirely de-coupled and objectively assessed approaches] are functionally arranged to map, i.e. associate or couple, subjectively-derived content descriptions expressed in semantic space to measurable properties extracted for the same pair of contrasted files as expressed in Euclidean space, thereby correcting for the de-coupling that currently exists between feature extraction and human intuition and/or human emotive perception of similarity or dissimilarity in, particularly, subjectively-evaluated/perceived data, e.g. music.

The effect of the neural network functions is to create two independent vectors that both purport to represent emotionally-perceivable or documented dissimilarities in digital audio and/or image data and/or literally work, but in different vector spaces. The first vector in semantic space is based on the human descriptions of source files and thus carries significantly higher contextual weight. The first vector is therefore used to assess and correct the second vector in, for example, Euclidean space, thereby allowing convergence—through changing of weights in the ANN—of the output of a different neural network to the semantic result of the first neural network. The Euclidean vector is also derived from selected subjective properties extracted from the original source data, e.g. pairwise comparison of songs, during deep-learning in artificial neural networks.

Following training, the convergence process provides, ultimately, a transformative function in the ANN that permits any data file to be assessed relative to other pre-assessed data files to assess similarity in semantic and emotionally-perceivable content.

As such, at least during a training phase for an artificial neural network, two independent vectors are generated for a common source. The first vector is semantically based and derived from (typically) associated metadata for the source data/file and the second vector is extracted from the main content (e.g. payload) of the source/data file. Whilst these two vectors—the first based on human judgment and the second extracted from hard, identifiable and absolute measurable properties—should be identical, they may not be. Consequently, to produce a truly representative predictive tool that assesses emotional/perceptive dissimilarity or closeness, it is necessary that processing of the absolute measurable properties eventually leads to an identical result to processing of the human judgment, i.e. semantic, qualities. In order to reflect true emotive perception, the assessment relating to human judgment is of higher importance and trumps the absolute evaluation of identifiable and measurable tangible properties that are both obtained from the common source. Forcing a change in applied weights and bias values in an artificial neural network that processes the identifiable and measurable tangible properties obtains closer alignment with reality, as reflected by human intelligence, judgment and perceptive reasoning.

1. Similarity/Dissimilarity Assessment of Contextual Explanation in Semantic Space An initial semantic description of the nature of the file, e.g. a contextual written description including context in a sentence and the use of particular words, is firstly converted or "embedded" into a multi-dimensional semantic vector using, for example, natural language processing "NLP" techniques and the like. The contextual written description amounts to a metric of human judgement which is subjective, perceptive and/or emotionally-based.

NLP, as supported by (for example) the Universal Sentence Encoder from Google® and particularly the Tensorflow™-hub, encodes text into high dimensional vectors that can be used for text classification, semantic similarity, clustering and other natural language processing tasks. In practical terms, NLP processing of two semantically similar descriptions will yield vector representations that are similar.

Whilst there may be some diversity in textual descriptions from different annotators, these are not considered statistically significant given the nature of the processing that is undertaken.

The choice of the commuting process between text and a vectorial representation is a design option, e.g. processing using Tensorflow™ may be based on training with a Transformer encoder or alternatively a Deep Averaging Network (DAN). The associated vector, in semantic space, is technically important from the perspective of overall training.

The semantic vectorization process is applicable to other forms of media data, such as image data in the form of a painting or film, that has semantic properties and corresponding aesthetic descriptors that can be converted in the numerical representation.

During the training sequence, an NLP-derived multi-dimensional vector is compared, on a pairwise basis, with other NLP-derived vectors to identify, in semantic vector space, a separation distance representation of pairwise semantic closeness. This firstly establishes a user-centric perception of pairwise closeness. In this sense, it will be appreciated that use of the terms "semantic" and "semantic space", etc., reflect that the origin of any corresponding vector or value stems from a subjectively-prepared description of human perceptual or emotive (i.e. semantic) qualities of the content of a file, e.g. audio track.

The preferred use of NPL provides an initial mapping between textual descriptors and a vector value in semantic space. The same principle could be applied to categorization of other media, e.g. video, films, paintings, fashion in the exemplary sense of clothing and decoration (with properties being in terms of colours and patterns and texture for coverings and the like) as well as medical records that may include images.

To provide a context in terms of musicology, taking Rimsky-Korsakov's "Flight Of The Bumblebee" as a first audio training track, this audio track may be described in two word dimensions as "frenetic" and "light" with NLP ascribing a vector representation of 1004512112 for tracks containing only these two NLP-resolved terms. Of course, the number of linguistic dimensions can be more than two and so the audio track's description could be expanded to include other semantic associations arising, for example, with (i) temporal events, such as dusk, Easter, cloudy, etc., and/or (ii) feelings, and/or (iii) themes, e.g. fairy-tale or fact and/or (iv) environments.

The vector "1004512112" is merely provided as an arbitrary example and, in fact, the generated multi-dimensional vector may take an entirely different form, especially since the number of word/sentence dimensions is only limited by the semantic associations that can be derived from the descriptive sentence for the audio track.

The process is repeated for a high number of independent samples, e.g. typically many thousands and preferably at least about ten thousand or more, to assemble a multi-dimensional matrix for the audio track-finding application which is used to provide a contextual example. Therefore, semantic similarity/dissimilarity is established between all training tracks, such as the aforementioned *Flight Of The Bumblebee* and, say, the electronic song "*White Flag*" by Delta Heavy or "*Boulevard of Broken Dreams*" as performed by Green Day. The size of the training set is, however, a design option driven by processing capacity, time and a desired level of achievable confidence/accuracy. Rather than to assess all pairs, an option is to select extreme variations in pairwise distance measures to train the ANN.

A resultant semantic first vector will be assembled from, in a preferred embodiment, at least a multiple of 64 individual dimensional components (although the precise number is reflective of implementation choice and desired accuracy). When using the Tensorflow™ universal sentence encoder, the processing of the semantic description yields a vector (in semantic space) of five hundred and twelve dimensions. Consequently, the precise semantic vector length is a design option and may vary.

It does not matter whether the semantic vector and the property vector (described in more detail below) are of the same size since the system considers dissimilarity as assessed on a pairwise basis.

2. Distance Assessment based on Extracted Properties

In generating the second independent vector in a second training process based on derived "properties" (as contrasted with semantic descriptions of the file used for pairwise semantic closeness outlined immediately above and described in detail in section 3 below), the weighting factors applied to nodes in layers of the neural network are changed by backpropagation to converge the results in (typically Euclidean) property distance space towards those of the semantic (typically Euclidean) separation distances (in semantic space) and therefore intrinsically back to the original semantic description(s).

As indicated earlier, the vector space for the first and second vectors is different in the sense that, although from a common source and one file, the input qualities of the input data that is to be processed are different. Processing of subjective description material by NLP can therefore be considered to yield the first vector in semantic space (or semantic distance space), whereas processing of absolute values relating to identified properties (even is these properties can be expressed in different selectable numeric terms for signal properties) yields, as an output of the ANN, a second vector in "property space".

In a preferred embodiment, Euclidean space is used as opposed to readily appreciated alternatives, i.e. non-Euclidean geometries.

An artificial neural network functions to convert measurable properties of a source file into a manipulable vectorial representation thereof. This conversion produces a second independently-generated vector, i.e. the second vector. This conversion can be considered as "feature extraction". In a preferred embodiment (in the exemplary case of audio processing), feature extraction is achieved using Essentia™ app developed by the Music Technology Group at Pomepu Fabra University (see https://essentia.upf.edu/documentation/streaming extractor music.html).

Essentia™ (or its functional equivalent) is an existing library providing a foundation for the analysis of a source audio file to identify a multiplicity of audio descriptors, such as band energies, band histograms and other measurable music qualities of the source track. In Essentia™, these audio descriptors number up to one hundred and twenty-seven. The audio descriptors can each be considered to be a quantized representation of a measurable parameter of the audio signal.

Returning to the exemplary context of an audio file, the processing intelligence behind Essentia™—in a like manner to equivalent categorization mechanisms—provides for feature extraction from the source file. Selection of appropriate ones of the audio descriptors in a subset define broader musical aspect or quality of each audio track, e.g. a first subset of measured quantized representations [nominally]

from audio descriptor bins 1, 15, 32, 33 and 108 (from the possible total universal set of 127 audio descriptors in Essentia) might be combined by the programmer to define "rhythm", whereas a subset of measured quantized representations from audio descriptors 5-21, 43, 45, 50, 71-77 and 123-127 could define "timbre" and a third different subset tonality, i.e. tonal quality of the performance. The subsets therefore provide further semantic properties in the musicology of the sampled source audio track.

For other forms of source file, such as video or image files, alternative measurable parameters are parsed from the source file to define alternative usable qualities.

As indicated, in the context of audio and particularly audio properties, a piece of music can be described using timbre, rhythm, tonality and texture. The properties of timbre, rhythm and tonality are particularly important.

3. Measurable Musical Properties

In this respect, it will be appreciated that:

"TEXTURE" is generally reflected by two-dimensional patterns in the time-frequency space which relate to the temporal evolution of the spectral content. Texture is therefore seen in a mel-spectrograph or mel-spectrum that plots the frequency domain against the time domain. Within such a mel-spectrum, evolving texture can be learnt by a neural network (as described subsequently) by identifying patterns that evolve with time, such as for example (i) interrupted horizontal spectral lines in high/mid-range frequencies, (ii) parallel vertical spectral lines stretching the mid and high-frequency range, and (iii) ascending or descending steps in the low-mid frequency range. Texture therefore provides a further complementary semantic property that is useable, in the context of the present invention, to assess track similarity/dissimilarity through provision of a further measurable metric in property space.

"RHYTHM" can be considered as the arrangement of notes according to their relative duration and relative accentuation (see https://www.naxos.com/education/glossary.asp?char=P-R #). As will be appreciated, rhythm can be expressed in terms such as (but not limited to):
  i) beats loudness as computed from beats and musical spectrogram with aggregations reflecting mean and variance (see https://essentia.upf.edu/documentation/reference/stdBeatsLoudness.html and https://essentia.upf.edu/documentation/reference/std_BeatTracker-MultiFe ature.html);
  ii) beats per minute "BPM" (see https://see essentia.upf.edu/documentation/reference/std_BpmHistogramDescriptors. html and https://essentia.upf.edu/documentation/reference/stdBeatTrackerMultiFe ature.html);
  iii) BPM histogram as computed from the signal with aggregations reflecting first and second peak heights and spread (see https://essentia.upf.edu/documentation/reference/std_BpmHistogramDesc riptors.html, and https://essentia.upf.edu/documentation/reference/std_BeatTrackerMultiFe ature.html);
  iv) danceability (see https://essentia.upf.edu/documentation/reference/std_Danceability.html);
  v) onset rate (see https://essentia.upf.edu/documentation/reference/std_OnsetRate.html); and
  vi) band-wise beats loudness as computed from beats and musical spectrogram as reflected by mean values and variance over six bands (see https://essentia.upf.edu/documentation/reference/std_BeatsLoudness.html and https://essentia.upf.edu/documentation/reference/std_BeatTrackerMultiFe ature.html).

Whilst the property of rhythm is, in Essentia terms, suggested as a collection of six measurable attributes, it will be appreciated that, in fact, more than six measurable attributes can contribute to this property, as reflected (for example) by the references to mean and variance values of specific musicological attributes. It will be understood by the skilled addressee that the multi-dimensional vector that is compiled for the property rhythm may therefore vary from the suggested Essentia parameters and be formed from other measurable attributes that provide a musicologically workable definition of rhythm. In a preferred embodiment, nominally nineteen (19) measurable attributes are assigned to the concept of rhythm, although other numbers of attributes can be used.

"TONALITY" is the arrangement of pitches and/or chords of a musical work in a hierarchy of perceived relations, stabilities, attractions and directionality. In this hierarchy, the single pitch or triadic chord with the greatest stability is called the tonic. Tonality is therefore an organized system of tones (e.g., the tones of a major or minor scale) in which one tone (the tonic) becomes the central point for the remaining tones and where the remaining tones can be defined in terms of their relationship to the tonic. Harmony is a perceptual tonal quality.

As will be appreciated, tonality can be expressed in terms such as (but not limited to):
  i) chords change rates as computed from Harmonic Pitch Class Profiles (HPCP) of the spectrum (see https://essentia.upf.edu/documentation/reference/std_Chords-Descriptors.h tml;
  ii) chords number rate as computed from HPCP (see https://essentia.upf.edu/documentation/reference/std_ChordsDescriptors.h tml);
  iii) chords strength as computed from HPCP with aggregations reflecting mean and variance (see https://essentia.upf.edu/documentation/reference/std_ChordsDe-scriptors.h tml);
  iv) HCPC entropy as computed from HPCP with aggregations reflecting mean and variance (see https://essentia.upf.edu/documentation/reference/std_HPCP.html, and https://essentia.upfiedu/documentation/reference/std_Entropy.html;
  v) key strength as computed from HPCP (see https://essentia.upf.edu/documentation/reference/std_KeyExtractor.html);
  vi) tuning diatonic strength as computed from HPCP (see https://essentia.upfiedu/documentation/reference/std_TuningFrequency.ht ml);
  vii) tuning equal tempered deviation as computed from HPCP (see https://essentia.upf.edu/documentation/reference/std_TuningFrequency.ht ml);
  viii) tuning non-tempered energy ratio as computed from HPCP (see https://essentia.upf.edu/documentation/reference/std_TuningFrequency.ht ml); and
  ix) chords histogram as computed from HPCP (see https://essentia.upf.edu/documentation/reference/std_Chords-Descriptors.h tml).

Whilst the property of tonality is, in Essentia's term, suggested as a collection of ten measurable attributes, it will be appreciated that, in fact, more than ten measurable attributes can contribute to this property, as reflected by the references to mean and variance values of specific musicological attributes. It will be understood by the skilled addressee that the multi-dimensional vector that is compiled for the property tonality may therefore vary from the suggested Essentia parameters and be formed from other measurable attributes that provide a musicologically workable definition of tonality. In a preferred embodiment, nominally thirty-three (33) measurable attributes are assigned to the concept of tonality, although other numbers of attributes can be used, with these obtained from an application of greater or lesser granularity of quantized measurement. For example, the "chords histogram" is implemented as a twenty-three-dimensional vector.

In terms of Essentia's treatment of another measurable attribute "chords strength", this is computed through parsing the audio file with a moving window (frame) and, from each window (frame), extracting a value to yield a sequence of numbers (on a one number per frame basis). The sequence is, in turn, used to compute its mean and variance. Therefore, in a preferred embodiment, the measurement "chords strength" is rationalized to just two numbers, i.e., the mean and variance of the aforementioned sequence. This example shows how measurement values that are used in assessment of an identified property can depart from the recommendations made in Essentia, albeit that the multi-dimensional vector that is produced to reflect the property, e.g. rhythm or tonality, contains sufficient spectral information to provide a user-acceptable definition of the property.

"TIMBRE" is a relatively esoteric measure and manifests itself in the complexity of the sound which can in turn be measured via the spectrogram of the sound. Timbre is the perceived sound quality of a musical note, sound or tone. Timbre distinguishes different types of sound production, such as choir voices and musical instruments, such as string instruments, wind instruments, and percussion instruments. It also enables listeners to distinguish different instruments in the same category (e.g. an oboe and a clarinet, both woodwind instruments). Physical characteristics of sound that represent the perception of timbre include the sound spectrum and the signal envelope, with timbre permitting an ability to resolve sounds even in stances when the sounds have the same pitch and loudness.

As will be appreciated, timbre can be expressed in terms such as (but not limited to):

i) barkbands_crest as computed from the barkband-filtered spectrogram with aggregations over mean and variance for identified Bark frequency ranges (see https://essentia.upf.edu/documentation/reference/streaming_Crest.html and https://en.wikipedia.org/wiki/Bark_scale #Bark_scale_critical_bands);

ii) barkbands_flatness_db as computed from the barkband-filtered spectrogram with aggregations over mean and variance for identified Bark frequency ranges (see https://essentia.upf.edu/documentation/reference/std_FlatnessDB.html);

iii) barkband_kurtosis as computed from the barkband-filtered spectrogram with aggregations over the mean for identified Bark frequency ranges (see https://essentia.upf.edu/documentation/reference/std_DistributionShape.html);

iv) barkband_skewness as computed from the barkband-filtered spectrogram with aggregations over mean and variance for identified Bark frequency ranges (see https://essentia.upf.edu/documentation/reference/std_DistributionShape.html);

v) barkband_spread as computed from the barkband-filtered spectrogram with aggregations over the mean for identified Bark frequency ranges (see spectral complexity as computed from the audio signal's spectrogram with aggregations reflecting mean and variance (see https://essentia.upf.edu/documentation/reference/std_DistributionShape.html);

vi) spectral dissonance as computed from the audio signal's spectrogram with aggregations reflecting mean and variance (see https://essentia.upf.edu/documentation/reference/std_Dissonance.html);

vii) dynamic_complexity as computed from the audio signal's RMS envelope (see https://essentia.upf.edu/documentation/reference/std_DynamicComplexity.html);

viii) high frequency content as computed from the audio signal's spectrogram with aggregation over the mean (see https://essentia.upf.edu/documentation/reference/std_HFC.html);

ix) pitch salience as computed from the audio signal's spectrogram with aggregations reflecting mean and variance (see https://essentia.upf.edu/documentation/reference/std_Pitch Salience.html);

x) spectral complexity as computed from the audio signal's spectrogram with aggregations reflecting mean and variance (see https://essentia.upf.edu/documentation/reference/std_SpectralComplexity.html);

xi) spectral energy high frequencies as computed from the audio signal's spectrogram with aggregations reflecting mean and variance (see https://essentia.upf.edu/documentation/reference/std_EnergyBand.html);

xii) spectral energy low frequencies as computed from the audio signal's spectrogram with aggregations reflecting mean and variance (see https://essentia.upf.edu/documentation/reference/std_EnergyBand.html);

xiii) spectral energy mid-high frequencies as computed from the audio signal's spectrogram with aggregations reflecting mean and variance (see https://essentia.upf.edu/documentation/reference/std_EnergyBand.html);

xiv) spectral energy mid-low frequencies as computed from the audio signal's spectrogram with aggregations reflecting mean and variance (see https://essentia.upf.edu/documentation/reference/stdEnergyBand.html);

xv) spectral entropy as computed from the audio signal's spectrogram with aggregations reflecting mean and variance (see https://essentia.upf.edu/documentation/reference/std_Entropy.html);

xvi) spectral flux as computed from the audio signal's spectrogram with aggregations reflecting mean and variance (see https://essentia.upf.edu/documentation/reference/streaming_Flux.html);

xvii) spectral kurtosis as computed from the audio signal's spectrogram with aggregation over the mean value (see https://essentia.upf.edu/documentation/reference/std_DistributionShape.html);

xviii) spectral strong peak as computed from the audio signal's spectrogram with aggregations reflecting mean and variance (see https://essentia.upf.edu/documentation/reference/std_StrongPeak.html);

xix) zero crossing rate as computed from the audio signal and with aggregations over mean and variance (see https://essentia.upf.edu/documentation/reference/stdZeroCrossingRate.html);

xx) MFCCs as computed from the audio signal's spectrogram with aggregation over the mean (see https://essentia.upf.edu/documentation/reference/std_MFCC.html); and xxi) spectral contrast as computed from the audio signal and with aggregations over mean and variance of both peaks and valleys (see https://essentia.upf.edu/documentation/reference/std_SpectralContrast.html).

Whilst the property of timbre is, in Essentia's term, suggested as a collection of twenty-one (21) measurable attributes, it will be appreciated that, in fact, more than twenty-one measurable attributes can contribute to this property, as reflected by the references to mean and variance values of specific musicological attributes. It will be understood by the skilled addressee that the multi-dimensional vector that is compiled for the property timbre may therefore vary from the suggested Essentia parameters and be formed from other measurable attributes that provide a musicologically workable definition of timbre. In a preferred embodiment, nominally seventy-five (75) measurable attributes are assigned to the concept of timbre, although other numbers of attributes can be used, with these obtained from an application of greater granularity in measurement, as indicated above and as will be understood by a musicologist.

In the context of audio track assessment and track-finding, the properties of tonality, rhythm and timbre importantly provide a basis by which measurement of subjective qualities of a source file can be assessed objectively. These properties may be derived from Essentia™ attributes, as identified above, or a subset of those Essentia™ signal attributes or from an equivalent library identifying suitable audio descriptors. Indeed, as will be appreciated, the present invention selects nineteen, thirty-three and seventy-five quantised representations for the properties of rhythm, tonality and timbre, with some of these overlapping with the Esssentia™ tool-box whereas other are variants or different signal measures. Consequently, the number of quantized representations is not fixed, but rather variable according to the musicologist belief concerning what signal attributes are required to define the particular properties that are being assessed.

Given the above, it is a design option as to how a skilled person selects—or indeed which—measurable attributes to define a suitable property for use in an assimilation process. The property of rhythm, for example, may be reviewed to include or exclude certain of the Essentia measurements, so in some respects it is understood that whilst the assessed properties are technical in nature and are measurable by existing technical processes, the lack of a consistent definition of what amounts to a "property" is unsurprising but not technically relevant. Rather, properties of the content of the file are to a degree both esoteric and subjective. However, it is the mapping of definitive yet subjectively assembled measurables in property space into an independent yet entirely relevant and corresponding semantic assessment in semantic space which is important.

4. Artificial Neural Network (ANN)

In accordance with concepts of the various aspects and embodiments of the present invention, pairwise similarity/dissimilarity in property space is mapped back to initial semantic similarity/dissimilarity (e.g. expressive and subjective linguistic descriptors) in semantic space. This is a multi-stage process that may involve multiple neural networks running in parallel. The use of multiple parallel ANNs permits control of musical modality, whereas use of a single ANN is possible. Aspects of the invention are concerned with training of the neural network that processes the extracted properties and evaluates dissimilarity in the property space.

FIG. 1 represents a flow diagram of a preferred process 100 to assess dissimilarity of files (and particularly audio files) and a process by which an artificial neural network may be trained according to the present invention. FIG. 1 therefore corresponds to and expands upon the process described above in relation to section "1: Similarity/Dissimilarity Assessment of Contextual Explanation in Semantic Space".

Audio files are used as an example of the underlying process since audio files, especially music files, can be subjectively interpreted from applied individual human perception.

As a training set of many hundreds (and preferably many thousands) of source files, pairs of files are selected 102 and semantically contrasted through ANN assessment. In a first path, using NLP, an artificial neural network extracts 104, i.e. processes to generate/embed, a representative vector for the semantic meaning conveyed in associated textual metadata (or as an accompanying description) for each file, e.g. each audio track of the pair. This results in, typically, the production 106 of a five hundred and twelve (512) dimensional vector from Tensorflow™ (or the like) that expresses the derived semantic meaning as a manipulatable value that can be evaluated.

The ANN can therefore effectively tabulate vectorial separation distances between all N files in the training set, where N is typically more than five hundred files and generally considerably more than several thousand. The more samples in the training sequence, the greater the granularity and associated confidence, albeit that higher numbers of samples increases processing complexity. In short, the more samples the better. However, as an option to train the ANN, the process may make a sub-selection of pairs where distance separations indicate that they are either very similar or very dissimilar, i.e. training may be based on extreme conditions.

At this point, tabulation of relative distance separation is abstract in that, whilst absolute distances exist in terms of separation distance values (e.g. five measurement units, fifty-seven measurement units or 1013 units), they do not reflect a scaled value of similarity/semantic closeness in multi-dimensional space. Assuming that N is sufficiently large, it has been recognised that for each file (track) there exists at least a reasonably certain number m of those N files (where is a positive integer and m<<N) will be similar or dissimilar.

In a preferred embodiment, for each source file in the training set, e.g. song "A", an arbitrary number, say ten, closest vectors in semantic distance vector space are selected; this forms a group or cluster of closely semantically-related songs. Statistically, in a training set of several thousand or perhaps a few tens of thousands of source files, clustering together [as equivalent] 0.1% of the universe is statistically acceptable in terms of likely semantic closeness. Indeed, relative to the universe of songs in a reasonable training sequence, closeness may be viewed to be in the range of between about 0.05% and about 1%, although with increasing percentage values the likely user-perception of audio dissimilarity will increase.

For a song "A", the system intelligence is arranged to consider the "m" (e.g. the ten and where m≥1) nearest songs as semantically similar in the sense of being user-perceptually close. This is reflected by setting—and then recording in a data record—a distance between these m songs around the vector for song "A" to be zero. For all songs outside the m closest, the system intelligence is arranged to consider these songs as dissimilar, i.e. that these other (not m) songs as semantically dissimilar in the sense of being user-perceptually far apart. Consequently, dissimilar songs are identified, relative to song "A", as having a distance of one. Therefore, for each assessed audio track, 2*m pairs of records are created and stored by the system as a retrievable and accessible record. Selection of an equal value of m ensures that training of the neural network is not biased by one extreme of the other (in terms of similarity or dissimilarity).

The processing burden on the ANN can, in most cases, be rationalised 114 at some point in the training process, as will be understood. Specifically, optimized training of an ANN is achieved through training with extreme cases, rather than with a bulk of similar values. Consequently, for any pairwise association, taking farthest apart and closest separation distances reduces time to hone the applied weights applied to neurons in the ANN.

A first semantic reference in the form of a "first vector", as outlined above in section 1: Similarity/Dissimilarity Assessment of Contextual Explanation in Semantic Space is thereby established as a reference for ANN training.

Returning to the original source files (e.g. audio tracks), a second path 126 for evaluation and assessment again looks, on a pairwise basis, for indicative patterns across the entire training space of N files (e.g. N audio tracks). Particularly, as indicated above in section 2: Distance Assessment based on Extracted Properties, the process undertakes feature extraction 130 of signal attributes by parsing the source (audio) file pairs to produces bins of quantized representations of signal qualities, such as explained above in section 3: Semantic Properties [in the specific exemplary context of audio/music]. Individual bins of quantized representations of signal qualities are then appropriately identified and selectively group together 132 to define semantic/subjective musicological properties, i.e. rhythm, tonality, timbre and texture, that can be evaluated and manipulated in more absolute terms in property space.

Figure 2:
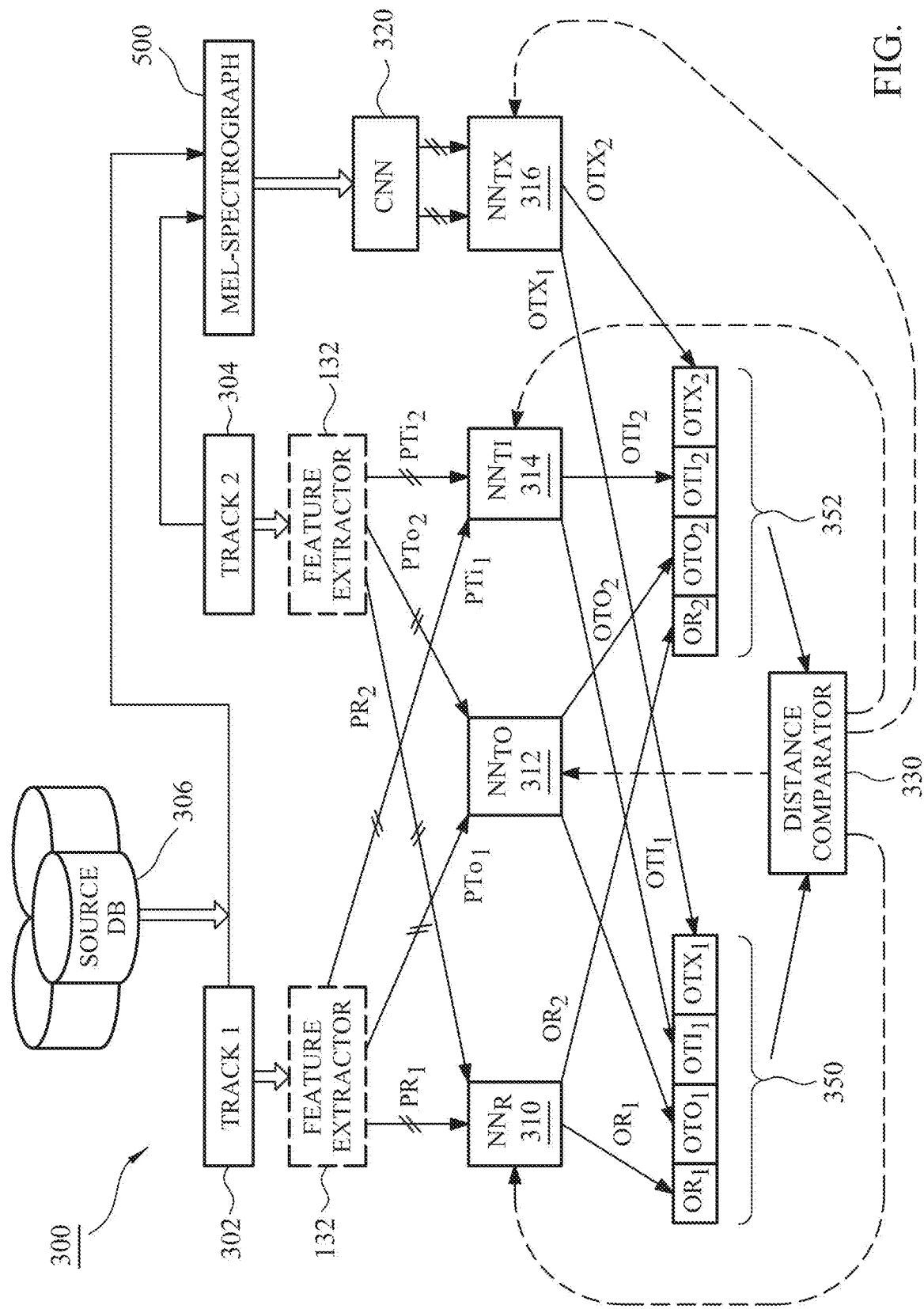
FIG. 2 is a schematic representation of a system architecture for training an artificial neural network according to a preferred embodiment.
Figure 3:
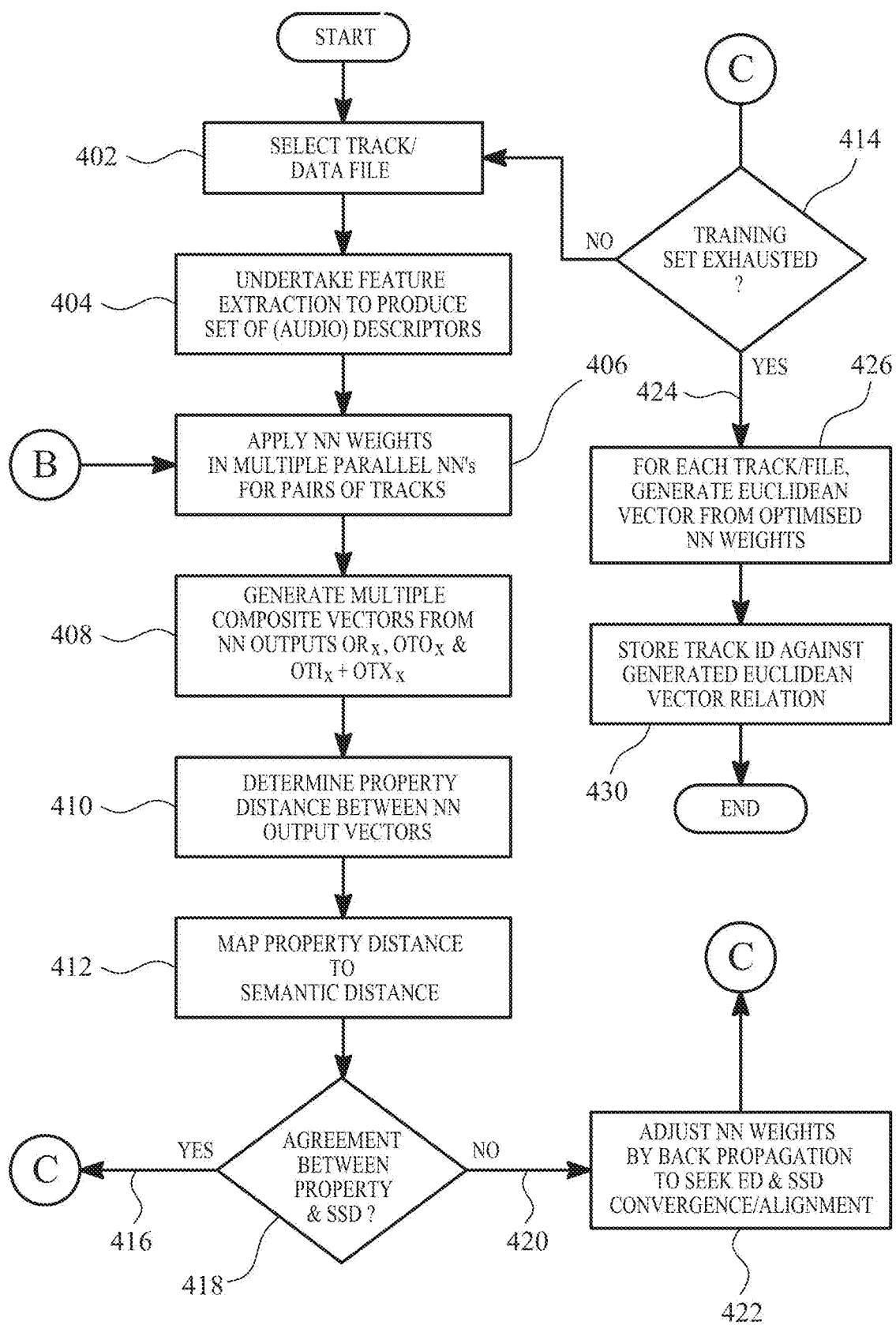
FIG. 3 is a flow diagram relating to a preferred process of training the neural network of FIG. 2 to assimilate semantic vector space with property vector space to identify property similarities and property dissimilarities between source files.

Reference is made to FIG. 2 and the process of FIG. 3.

FIG. 2 is a schematic representation of a system architecture for training a system including artificial neural networks according to a preferred embodiment. FIG. 3 is a flow diagram relating to a preferred process of training the neural network of FIGS. 2 to assimilate semantic vector space with property vector space to identify property similarities and property dissimilarities between source files.

On a pairwise basis, two files (e.g. digital audio files 302, 304) of the N files are selected from a training database 306 of files and are subjective to assessment and interpretation by the system 300. The system 300 may be embodied within a more general system intelligence, such as supported by a server or a distributed system of interactive processors and includes a plurality of artificial neural networks.

As indicated above, initial processing of each selected audio file in a feature extractor 301 (such as Essentia or its functional equivalent whether this be in the context of the exemplary case of audio file processing or for a different format of source file, such as a picture) produces bins of quantized representations of signal qualities, with these bins selectably grouped to define a plurality respective outputs representing different semantic properties P, e.g. timbre "PTi", tonality "PTo" and rhythm PR, in numeric terms. Value representations for each of these subjective properties for each audio track (e.g. $PTo_2$ for the property of tonality extracted from track 2) are applied commonly as inputs to dedicated parallel neural networks for weight optimization in the evaluation process for each property.

In the exemplary context of an audio file and track finding system, there are independent ANNs for rhythm "$NN_R$" 310, tonality $NN_{TO}$ 312, timbre $NN_{TT}$ 314 and musical texture $NN_{TX}$ 318.

Musical texture is a special case and requires a different process flow. Musical texture is discussed below in more detail.

For processing and evaluation of other training data, such as images, there may be more or fewer parallel ANN chains. The ANN chains, shown to number four in FIG. 2, can be considered as independent processing paths, branches or pathways and thus sub-networks of the network). The number relates only to the number of semantically discernible properties. The system may, in fact, operate with just a single chain that processes data in multiple passes to arrive at a composite result suitable for evaluation.

The ANN for rhythm "$NN_R$" 310 thus receives an input representation only of the property rhythm, with this being assembled (in a preferred embodiment) from a vector of nineteen components, i.e. nineteen extracted signal attributes. The ANN for tonality "$NN_{TO}$" 312 thus receives an input representation only of the property tonality, with this being assembled (in a preferred embodiment) from a vector of thirty-three components, i.e. thirty-three extracted signal attributes. The ANN for timbre "$NN_{TT}$" 314 thus receives an input representation only of the property tonality, with this being assembled (in a preferred embodiment) from a vector of seventy-five components, i.e. seventy-five extracted signal attributes.

As indicated above, the definition of each property can vary in terms of the number and/or attribute nature of the extracted signal representation for each bin. Therefore, in the express context of audio files and the use of Essentia, all of the available attribute signal bins (including, for example, barkbands_flatness_db and dynamic_complexity for timbre) may be used, some may be used or others not mentioned above may be used in place of or otherwise extent the number. The definition of a "property" is therefore subjective (to some extent), although this subjectivity is irrelevant if a consistent approach to a property's definition is adopted. In other words, the programmer is able to determine how to define a subjective property by identifying and selecting desired measurements for signal attributes.

The ANNs for rhythm "$NN_R$" 310, tonality $NN_{TO}$ 312, timbre $NN_{TT}$ 314 and musical texture $NN_{TX}$ 318 therefore determine and refine weight values that account for differences in these properties, with weights and biases refined by an iterative process involving the entirely of the training set and a backpropagation algorithm tasked to find the appropriate adjustments for each trainable parameter. The process of backpropagation is understood by the skilled addressee so it is relevant to point to the intent of what is to be aligned and the objectives and benefits achieved by the architecture and process as described herein.

It has been recognized that the issue of musical texture also has a part to play in the assimilation of content property metrics (derived from vectorial representations of measurable properties of each track in pairwise comparison) to semantic metrics (derived from vectorial representations of sematic descriptions of each track in pairwise comparison).

The approach adopted by the embodiments of the present invention therefore emphasises the importance of human emotional perception over strict machine-learning, thereby weighting operation of an ANN towards human-perception rather than statistical mapping based on interpretation of absolute numeric data.

Figure 4:
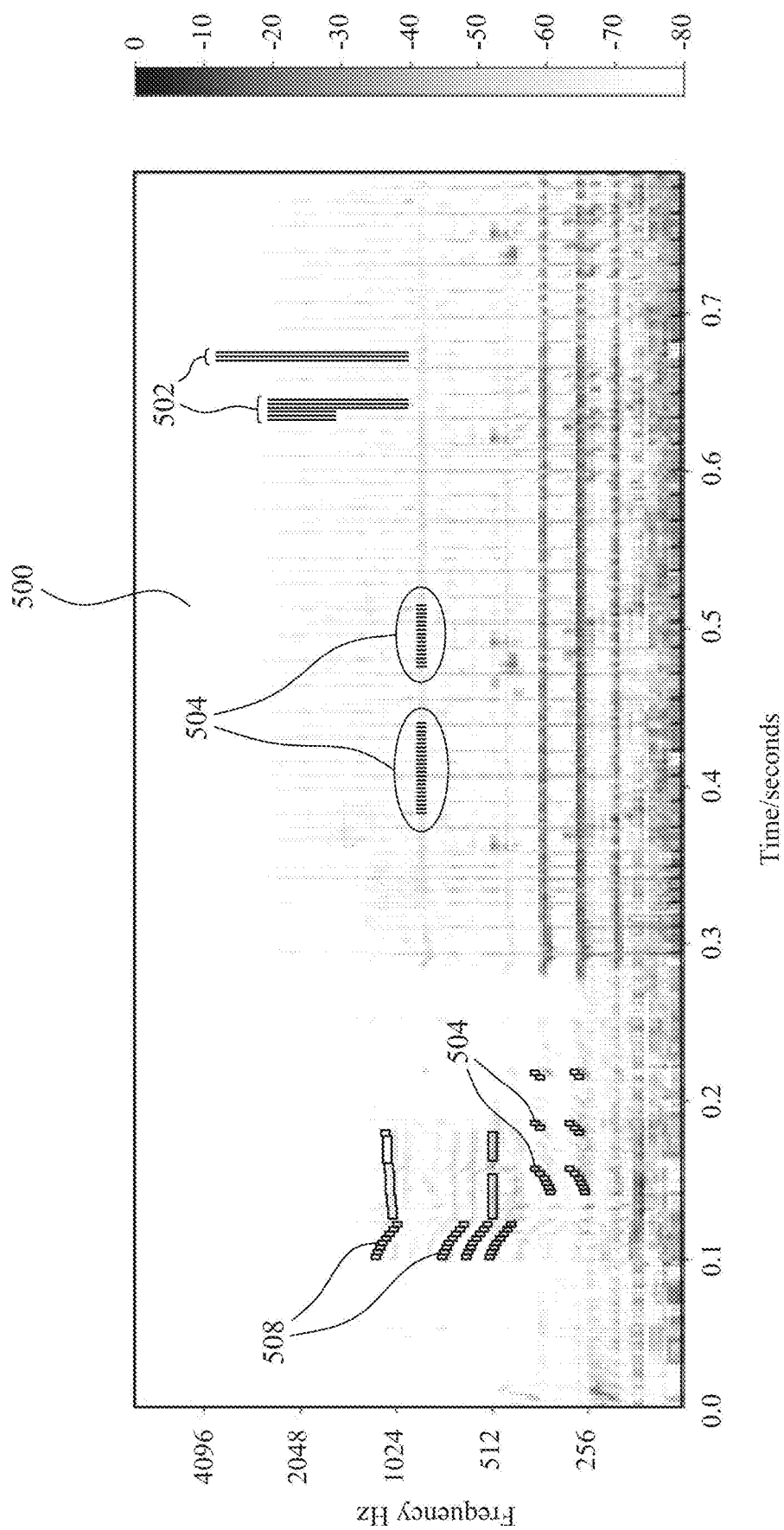
FIG. 4 is a presentation of a typical mel-spectrum for an audio track.

Turning briefly to FIG. 4, a typical mel-spectrum 500 is shown for an audio track. As will be understood, a mel-spectrograph (interchangeably known as or referred to as a mel-spectrum) is a quasi-logarithmic spacing roughly resembling the resolution of the human auditory system and thus a more "biologically inspired" perceptual measure of music. The mel-spectrum is a representation of the short-term power spectrum of a sound across a frequency spectrum, based on a linear cosine transform of a log power spectrum on a nonlinear mel scale of frequency. In the mel-spectrum, consideration of a power spectrum in a frequency bin between (nominally) 50 Hz to 100 Hz would equate to consideration of a power spectrum across a larger frequency range at higher frequency, e.g. 400 Hz to 800 Hz but also 10 kHz to 20 kHz. The process of how a mel-spectrum is generated is well-known, because these frequency bins are perceptually of equal importance in musical interpretational terms.

Moreover, whilst noting that audio tracks can have musical themes that change on a section-by-section basis and which could thus affect the mel-spectrum, for the sake of explanation of a preferred embodiment it is assumed that the theme in the audio—and therefore the excerpted window—is relatively constant. Of course, the alternative is to partition an audio track, such as Queen's "Bohemian Rhapsody", into sections that are each subject to a discrete evaluation process in semantic space.

Not only is the mel-spectrum just a partial sample, but it is also complex in nature in that it has dimensions in both the time domain and the frequency domain. Within the resulting 2-dimensional matrix of time domain and frequency domain components, a theme can be identified by isolation of patterns of interest. Such patterns of interest can be observed within the spectral components of a plot of frequency (ordinate) against time (as abscissa): i) parallel vertical lines 502 stretching across the mid and high frequency range; ii) interrupted horizontal lines 504 in the high-mid frequency range; iii) ascending 506 or descending 508 steps in the low-mid frequency range. Other patterns, as will be understood, also exist with the mel spectrum with these discoverable The property texture can therefore be derived from analysis of the mel-spectrum and, particularly, identification of patterns and trends by an ANN that provides additional vectorial components in property space that are used in the training of the system 300 of FIG. 2.

An output from each ANN, including a contribution for texture, for each track used in the training sequence/training data set is then assembled as an output, in property space, into a multi-dimensional output vector concatenated or otherwise assembled from multiple outputs $OR_x$, $OTO_x$, $OTI_x$ and $OTX_x$ (where x represents the related track number, i.e. track 1 or track 2) for each property for each track. The precise length of each output vector is open to a degree of design freedom, noting that its length is selected to be sufficient to allow for objective evaluation and differentiation in property space. In a preferred embodiment, each essentially parallel-processed output from each ANN chain contributes a sixty-four-dimensional output vector $OR_x$, $OTO_x$, $OTI_x$ and $OTX_x$ for each of the properties of rhythm, tonality, timbre and texture (the latter of which requires a different processing as will be explained below).

Referring again to FIG. 2, a mel-spectrum 500 is generated for each one of the selected pairs of files (in this exemplary case digital audio tracks) 302, 304. This process is well understood by the skilled addressee. Both tracks are firstly subjected to processing within a convolutional neural network "CNN" 320, with individual vector outputs for each track then subjected to processing and interpretation with an assigned ANN ($NN_{Tx}$ 316) for texture evaluation. $NN_{Tx}$ 316 is therefore in a parallel with the other neural networks responsible for evaluation and embedding of vectors for rhythm, tonality and timbre. Respective vector outputs $OTX_1$, $OTX_2$ for tracks 1 and 2 from $NN_{Tx}$ 316 are, in a preferred form, also sixty-four dimensional vectors, with each of these outputs then concatenated or otherwise assembled with the three other vectors for each track (labelled $OR_x$, $OTO_x$, $OTI_x$) to produce a two-hundred and fifty-six dimensional vector for each of tracks 1 and 2. This two-hundred and fifty-six dimensional vector—again the precise length is a design option as indicated above—is the aforementioned "second vector in Euclidean space".

System intelligence includes a comparator 330 that functions to evaluate distance measures in property space (arising between the assembled composite second vectors for each of the paired tracks as assembled from the four outputs $OR_x$, $OTO_x$, $OTI_x$ and $OTX_x$) with corresponding distance measures in semantic space. The system intelligence thus establishes an association between the two spaces. As an example of how the system operates to compare distances between vectors, the system intelligence may utilise a squared-absolute distance calculation.

The system intelligence then functions to contrast the first vector and second vectors with an operative view to have the second vector aligned with the closeness assessment of the first vector. In other words, the system intelligence contrasts the semantic distance (based on textual evaluation) with a property distance. Putting this differently, the first vector in semantic space (based on the human descriptions of source files) is used to assess and correct the second vector (associated with extracted measurable properties of the content) in property space, thereby allowing convergence—through changing of weights in the ANN—of the output of the secondary neural network to the semantic result of the first neural network. The objective is that the re-combined concatenated output [and, particularly, the evaluated Euclidean property vector relating to differences 330 between training tracks] is also represented on a scale of zero to one, and neural network weights in each of the ANNs for rhythm "$NN_R$" 310, tonality $NN_{TO}$ 312, timbre $NN_{TT}$ 314 and musical texture $NN_{TX}$ 318) are adjusted so that the Euclidean property distance measure tends to, i.e. preferably replicates, the semantic quantized distance. Other scaling may be applied rather than hard levels in a quantization approach.

Particularly, the weight factors applied in each of the ANNs for rhythm "$NN_R$" 310, tonality $NN_{TO}$ 312, timbre $NN_{TT}$ 314 and musical texture $NN_{TX}$ 318 are adjusted by an understood process of backpropagation so that the result of the Euclidean property distance measure 330 between comparative pairwise tracks/files tends towards—and ideally eventually correlates with a high degree of accuracy to—the distance measures in semantic space. As will be understood, the process of backpropagation therefore trains each neural network by adjusting applied weights based on contrasting objectively measurable signal attributes used to define identifiable file properties.

The effect of evaluating two independent paths—the first processed entirely in semantic space and the second pushed into measured property space based on measurable qualities of subjectively-assessed properties—produces an emotionally-perceptive system that more closely aligns with human perception of either closeness or dissimilarity. The effect, in the exemplary context of finding tracks between different genres of music, is that quantitatively more as well as qualitatively better associations are made between different tracks even when those tracks may, upon initial inspection, objectively appear to be in radically distinct and unrelated music genres. This represent a step-forward in addressing problems such as cold start in a providing an improved and reliable recommendation tool that can push relevant content to new or existing users. In fact, the process and system's architecture are emotionally perceptive to the extent that it permits language independent embedding of semantic meaning. This means that, for example, Chinese and English may be overlaid without affecting semantic interpretation or the results.

As a further component to the assessment of semantic properties of an audio work in objective Euclidean space, a mel-spectrograph is processed through a convolutional neural network "CNN" to produce a vector component representative of a subjective but complementary concept of musical "texture".

Figure 5A:
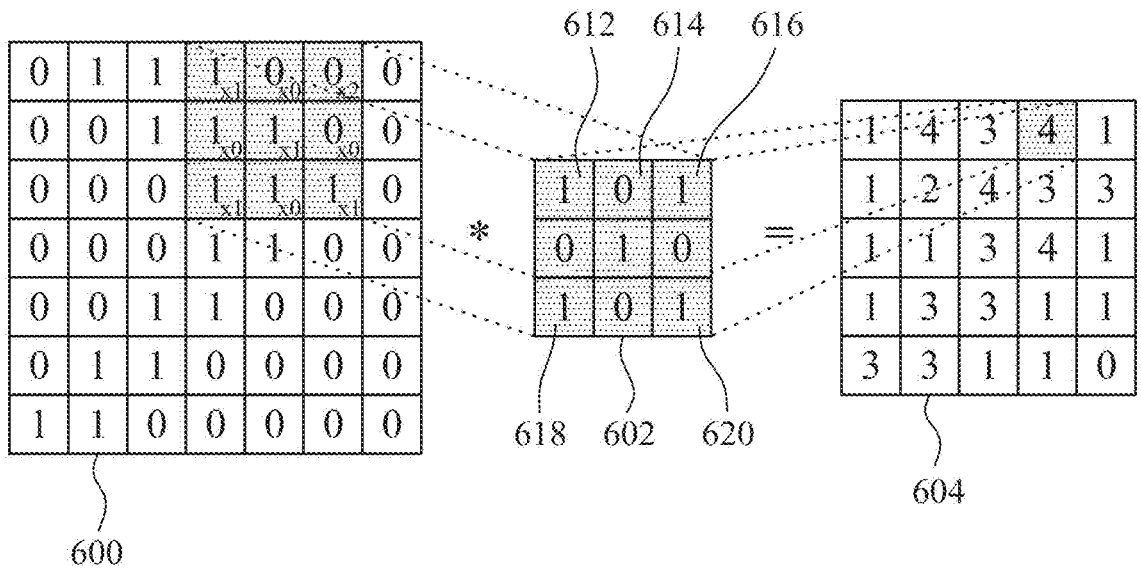
FIG. 5A is illustrative of convolutional and pooling layers within an artificial neural network assigned to mel-spectrum interpretation.
Figure 5A:
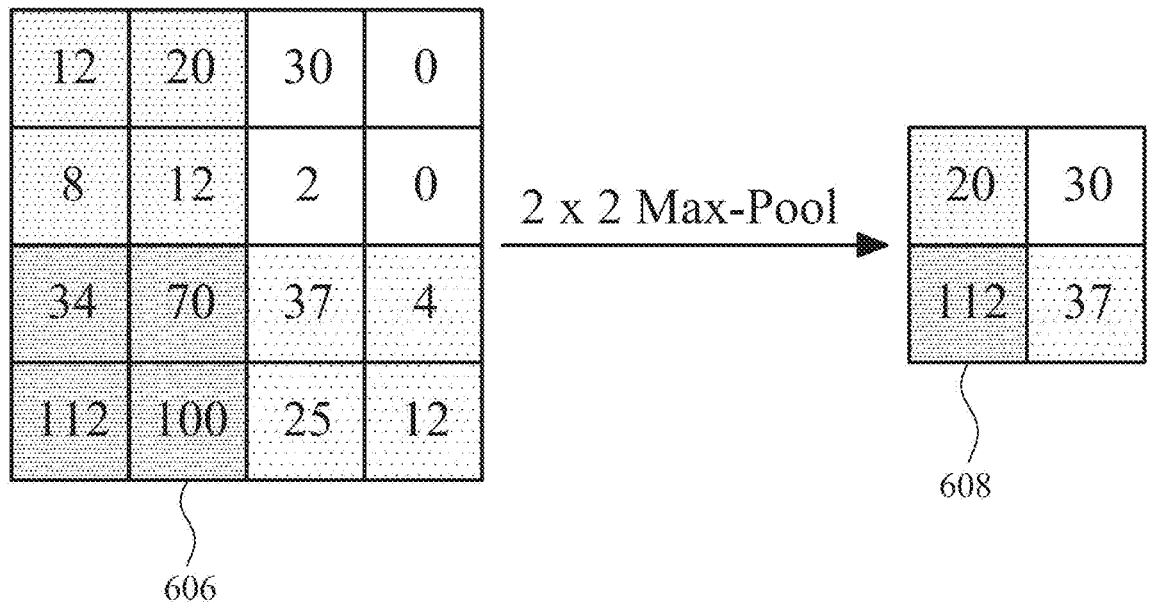

FIG. 5A is illustrative of convolutional and pooling layers within an artificial neural network assigned to mel-spectrum interpretation and, particularly, the deep learning needed to identify important musical patterns and trends in the tracks under assessment. Convolutional processing addresses the two-dimensional nature of the spectral input matrix 600.

As indicated, the mel-spectrum includes time-varying patters that reflect texture that serves as a further component for similarity/dissimilarity assessment of properties in property space. In order to identify these textural trends in a 2-dimensional mel-spectrogram, filters in the convolutional neural network are trained to identify patterns with the mel-spectrogram and, particularly, to identify optimized parameter values within each of these filters that generate filter outputs that reflect a high degree of confidence in the identification of patterns/trends in the input matrix. As such, parameters within each filter will be adjusted, as will be understood by the nature of operation of ANNs, to permit each filter to detect a particular input that is relevant to desirable subjective properties, e.g. rhythmic and/or melodic patterns, contained within the mel-spectrum of the tracks under investigation.

In this regard, the chain of processing in the ANN for texture includes sequential convolutional layers. For example, layers 1, 3 and 5 may be implemented as convolutional layers respectively with 128, 128 and 64 neurons and with each filter having a kernel size [i.e. the size of the filter matrix] of three (3). During training, on a stepwise basis across the spectral input matrix 600, a filter 602 [having an initially untrained and then a revised set of parameters] is advanced. By applying the filter 602 to input data, an output matrix 604 yields positive match results between input values in the overlaid matrix. For example, as a simplistic example:

FIG. 5B shows a sample of 2-D Matrix with a filter (e.g., Filter #1) applied to generate a yield (match).

In an iterative stage, the values of the parameters in the filter (e.g., Filter #1 in FIG. 5B) are then altered and the 2D input re-run to determine whether the new filter coefficients yield a better or inferior result for matches for the same input data. For example, FIG. 5B shows a sample of a 2-D Matrix with a filter (e.g., Filter #2) applied to generate a yield (match).

In progressing through all possible filter positions in the 2D input data, a further results matrix 604 of positive yield results is developed; this is representative of the ANN trying to optimise filter coefficients/parameters to maximize matches. In FIG. 5A, the results matrix of identifies that higher correlation with the filter 602—and therefore a high match and higher likelihood of identification of an interesting pattern in the input data—is experienced with values of four (4) relative to poorer matches indicated by zeros and ones.

As with any CNN, with more filters one can identify more patterns, but this comes at the expense of requiring more parameters and a need for more training data.

Preferably, for reasons of expediency, each convolution is followed by a max pooling layer having a suitable kernel size, such as a 2×2 matrix/kernel. The effect of the max-pooling approach is shown in the lower part of FIG. 5A in which a results matrix 606 is decimated to generate a new smaller input matrix to be processed in the successive convolutional phase. As will be understood, max pooling looks at a block of outputs and then rejects all but the highest value in the analysed block on the presumption that lower values are statistically not relevant in subsequent processing. In FIG. 5A, applying a 2×2 max pooling approach to a 4×4 input matrix from the preceding convolution stage yields four independent blocks, with each of those blocks containing four (yield) values. The max pooling result is then a first 2×2 max-pooled matrix 608 in which only the highest yield values are retained. This first 2×2 max-pooled matrix 608 is then input as into a successive convolutional layer. Consequently, max pooling reduces the operative size of the matrix to reduce dimensionality over different (successive) layers of the ANN.

The use of the max-pooling approach increases computational efficiency since, with each neuron introducing a parameter that requires learning, restriction of the input matrix size reduces the amount of data (that otherwise is required to mitigate inappropriate granularity and inaccuracy in calculating parameters/weights).

The CNN therefore includes several convolutional layers typically interspersed by a max-pooling layer.

An output of the last max-pooled layer is flattened, i.e. all matrix columns are concatenated to form a single vector which acts as the input to the dedicated neural network for texture assessment, i.e. musical texture $NN_{TX}$ 318.

Figure 6:
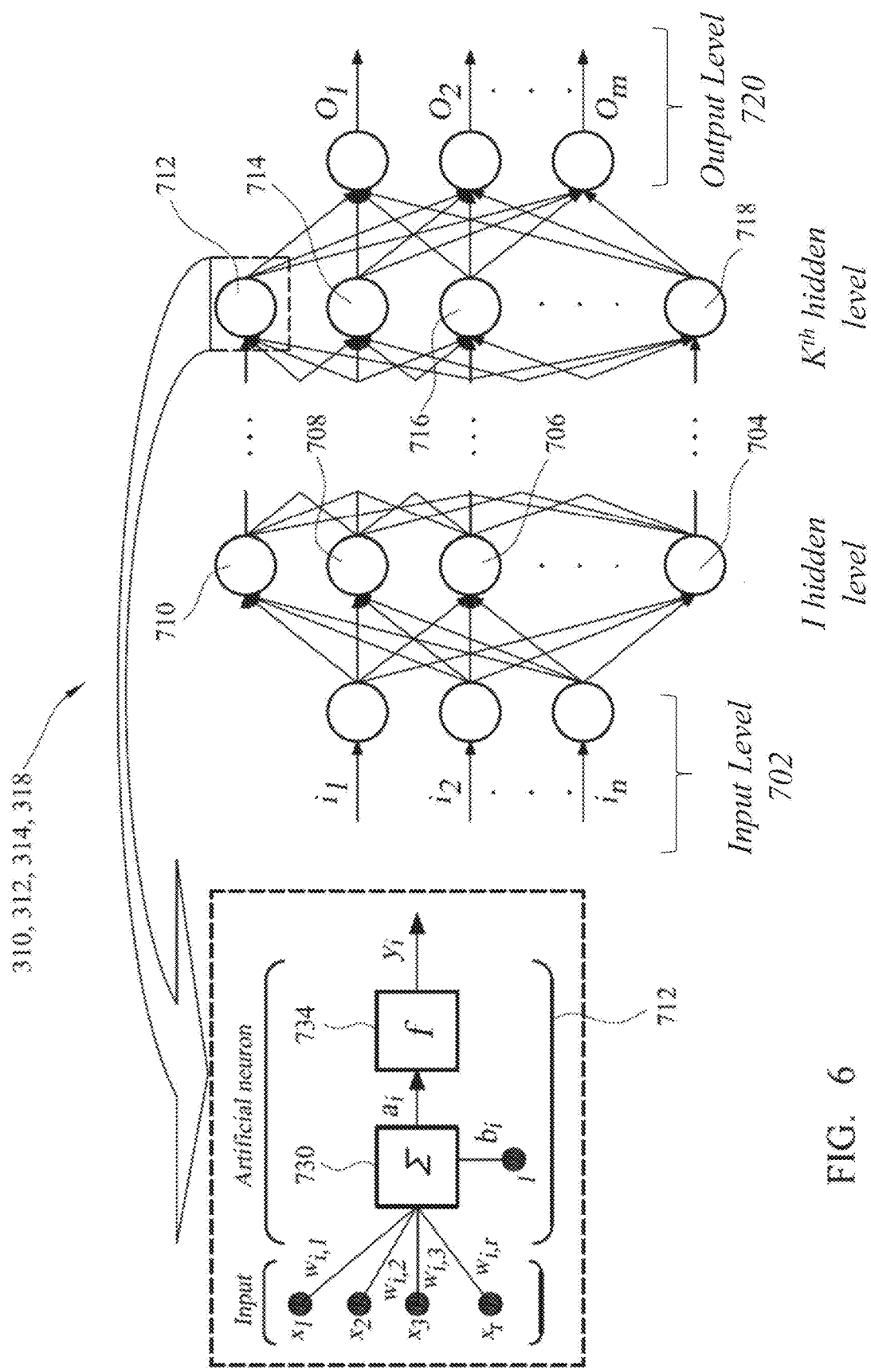
FIG. 6 is a representation of an artificial neural network employed within the various ANN chains of FIG. 2.

Before discussing the general form and operation of the ANNs shown especially in the context of FIG. 6, it is noted that the flattened output from the CNN 230 is applied as (for example) a sixty-four dimensional vector the input to a two-hundred and fifty-six neuron hidden layer of the dedicated texture neural network $NN_{TX}$ 318 preferably with a rectified linear unit ("ReLU") activation function for optimized deep learning. The texture neural network $NN_{TX}$ 318 provides, at its output, a sixty-four-dimensional vector (in the form of an activated linear function) representing each of the mel-spectral component $OTX_1$ $OTX_2$, with these vector $OTX_1$ $OTX_2$ assembled with the other output vectors representing each of file's evaluated properties, i.e. tonality, timbre and rhythm. The resulting 256-dimenional vectors for each of the two pairwise files are then made the subject of the distance evaluation in Euclidean space, as indicated above and represented in FIG. 2.

The initial/upper convolution layers of the CNN function to identify filter weighting to be applied to across neural nodes in order to define useable parametric functions that allow identification of these patterns of interest in the mel-spectrum [that is the input in the CNN]. Values for the parameters 612-620 of the filter matrix are thus learnt by iteration and backpropagation that tests the viability of alternative values to optimize an output, with optimization developed during successive passes across the source input data and varying source inputs of the training set.

FIG. 6 is a representation of an artificial neural network 700 employed within the various ANN property-processing chains of FIG. 2.

Each of the ANNs for rhythm "$NN_R$" 310, tonality $NN_{TO}$ 312, timbre $NN_{TI}$ 314 and musical texture (post convolutional processing)$NN_{TX}$ 318 includes a multi-neuron input layer or level 702 followed by at least one and usually a plurality ($1^{st}$ to $k^{th}$) of hidden neuron layers that contain at least the same number of individual neurons 704-718 as the multi-neuron input layer or level 702. The $k^{th}$ hidden layer provides an output level 720, with the number of neurons in the output generally less than the number of neurons in the preceding $k^{th}$ hidden level.

In terms of basic neuron mapping, an output from each neural (such as in the first input layer) is mapped on a many-to-many basis as inputs into each neural in the immediately following (e.g. $1^{st}$ hidden) layer. The $k^{th}$ hidden layer, i.e. the penultimate later of each ANN, maps multiple inputs to each of its outputs ($O_1$ to $O_m$) on a many-to-one basis such that the output $O_1$ to $O_m$ is a linear function (such as described at https://towardsdatascience.com/activation-functions-neural-networks-1cbd9f8d91d6).

Each quantized signal representation extracted for each identified property (in the case or rhythm, tonality and timbre) or the flattened output from the CNN function (for texture) is provided as an input (ii to in) to one of the neurons of the input layer 702.

Taking neuron 712 as an example, it can be seen in FIG. 6 (left side, boxed representation) that the neuron receives a plurality of weighted inputs $w_{i,1}$, $w_{i,2}$, $w_{i,3}$, $w_{i,r}$ that are summed together in a summing function 730. The summing function, in fact, includes a secondary bias input $b_i$ which is generally just a learned constant for each neuron in each layer. It is the weights $w_i$ and the bias $b_i$ that the processing intelligence estimates and then revises though a backpropagation process that takes the pairwise Euclidean property distance measure 330 as the influencing factor and, particularly, how this assimilates/maps to the corresponding pairwise target distance in semantic space. An output a; from the summing function 730 is subjected to a non-linear activation function f (reference number 734). The output of the neuron $y_i$ is propagated to the next layer.

In the exemplary sense of pairwise audio data signal comparison, the input ii to in may be derived from the Essentia feature set as identified above in relation to timbre, tonality, rhythm, whilst the CNN mel spectrum provides the neuron input for the texture-dedicated artificial neural network $NN_{Tx}$. The final outputs $o_1$ to $o_m$ form the 64-dimensional embedding vector for each particular property, e.g. timbre $OTI_1$ and texture $OTX_2$.

With respect to a preferred implementation for FIG. 6, there are at least two hidden layers. The first hidden layer contains five hundred and twelve (512) neurons. The second hidden layer contains one thousand and twenty-four (1024) neurons. The activation function in both of these hidden layers is, preferably, the ReLU function, such as described at https://en.wikipedia.org/wiki/Rectifier_(neural_networks).

Referring in detail now to FIG. 3, the training process by which the system of FIG. 2 is trained is set out in general terms.

From a universal training set of audio tracks (or a selected subset of pairs), a pair of tracks for semantic and musical property comparison is selected 402. Both tracks are then subjected to feature extraction 404 to identify properties, e.g. multiple sets of measurable descriptors that can be used to define rhythm, etc. Texture, as indicated above, follows a modified process given the nature of the mel spectrum. For each pair, the properties are commonly processed by the system intelligence to train the network and refine the weights and bias values applied 406 in each of the parallel artificial neural networks for rhythm "$NN_R$" 310, tonality $NN_{TO}$ 312, timbre $NN_{TT}$ 314 and musical texture $NN_{TX}$ 318.

Regardless of whether ANN processing involved a CNN or not, each of the multiple parallel neural networks operate to contribute 408 an embedded vectorial output 350, 352 [assembled from contributing vectors $OR_x$, $OTO_x$, $OTI_x$ and $OTX_x$] in (typically Euclidean) property space for each of the pair of files under consideration. An assessment/determination 410 of a Euclidean property distance between the vectorial outputs 350, 352 for each of the files is then undertaken. The determined Euclidean distance, calculated by the neural networks, is then mapped/contrasted with the semantic distance (in semantic space) between the same files (as described in relation to FIG. 1).

If it is assessed 418 that there is general numerical correspondence 416 between the property distance and the quantized semantic distance—which is unlikely for initial weights and bias values at the outset of training with the first few tens/hundreds of pairwise comparisons—then a determination may be made as to whether the weights and biases in the contributing ANNs satisfy an agreeable rule. This may permit the cutting short of ANN training without exhausting all pairwise comparative options, although optimization in each NN will be improved with an ever-increasing number of pairwise assessments and weight and bias revisions.

From a practical perspective, the system is typically arranged to undertake several runs or "epochs" through the entire training set. Training can be halted when (a) the training loss does not improve over several epochs, or (b) the validation loss (on unseen data) does not improve. It is noted, also, that if the training loss improves but the validation loss does not, the this is indicative of overfitting.

At the outset of training, however, there will likely be significant differences and a requirement for refinement of ANN operation in terms of parameter identification using refined filter weights $w_i$ and bias $b_i$ values. This is achieved through use of the entire universe of training data to optimise ANN performance. Consequently, the training process replicates the path of pairwise assessment for all members in the training set. This is represented by decision block 414 and negative or affirmative paths therefrom.

If there is repeated close correspondence (affirmative path between the quantized semantic distance and the (typically-used) property distance obtained from the vectorial outputs 350, 352) for file after file, then optimization of the weights and biases may be assumed to have been achieved (at least to an appreciable and acceptable extent).

Returning to the path (i.e. negative outcome 420) between where significant numeric discrepancies exist between the distance measures in semantic and property spaces, then filter parameters and, particularly, applied weights and bias in one or more of the neural networks need to be adjusted. The objective in this adjustment is to realise a numerical convergence between vectoral distance dissimilarity measures in property space to associated, i.e. corresponding, distance dissimilarity measures in semantic space. It is noted that, in this respect, the values in property space will invariably vary from the hard values of zero and one in semantic distance space because perceptual differences and absolute differences exist between dissimilar pairs of tracks (even if the compared tracks are cover versions of the same song). Checking for loss or overfitting after each epoch is a typical approach.

The processing intelligence in the system therefore adjusts 422 weights and biases through backpropagation to seek convergence between semantic and property (numerically-based) distances. These adjusted weights are then applied to the neurons in the various neural networks, as shown in FIG. 2, in order to improve the alignment for a next pair of files in the training set.

The training of the ANNs yields distance values in property distance space that reflect track dissimilarities on a pairwise comparative basis. Consequently, once trained, any distance in property distance space maps accurately and reliably to actual perceivable differences in semantic space. The changing of weights and biases in the neurons of the ANNs is the transformative function or mechanism by which the property space is mapped into abstract semantic space.

Once the training set has been exhausted, the neural networks are assessed to have been optimised. This is reflected by the affirmative path 424 from decision block 414.

As will be understood, each processing chain for each extracted property is a machine. In the present exemplary case of audio evaluation, there are four machines: one each for rhythm, tonality, timbre and texture. In order to optimise the training process, it has been appreciated that the independent machines each make an independent, de-coupled contribution to the final vectorial representation 350, 352 in property space. Consequently, a preferred approach, on a pairwise assessment basis relative to the semantic evaluation in semantic space, is to adopt a weighting of importance between each of these effectively parallel individual machines. In other words, the training process determines a relative importance between particular audio descriptors (associated with each property) within each input to the respective ANN. This means that each machine learns which of the specific contributing extracted measurable values has the greatest impact in altering a final result that reflects the desired human subjective assessment (in semantic space). To achieve this, the system operates to assess two tracks into each machine. Each machine is then configured to identify similarities or dissimilarities between the set of quantized representations used to define each property being evaluated by the specific machine. The machine, in adjusting its biases and weighting factors in the backpropagation process, operates to downplay, i.e. reduce the relative significance of, the property (e.g. rhythm) if there's dissimilarity (in property distance space) with the corresponding property being, in a preferred embodiment, simultaneously evaluated in the specific pairwise comparison in semantic space. In other words, identified dissimilarity does not contribute to generating a set of biases and weights that brings about better alignment with the semantic assessment and semantic differences between evaluated pairwise audio tracks in semantic space. As such, across each machine, the system intelligence weights implicitly the other properties (in both tracks) in particular machines since these other properties are assessed to have a greater impact on aligning with the semantic assessment, i.e. rhythm vectorial components $OR_x$ may be assessed by the system to have a greater contribution to human perception of the qualities of the audio content relative to the tonality vectorial components $OTO_x$. Indeed, extending this principle to individual quantization representations, machine-identified dissimilarity between individual quantized representations (such as barkbands_crest values that contribute in Essentia to the property timbre) in comparative pairwise tracks means that such individual quantized representations are of less significance in aligning property-based vectors to the semantically-based values.

It will be appreciated that the accuracy of a resulting transformative function of the neural network is dictated by the robustness of the training data and particularly the size of the matrix so whilst ten thousand audio files might be assessed to generate correspondingly ten thousand vectors, it is perceived that significantly fewer or significantly more can be critiqued by NLP to provide the embedding.

To build a comparative library, it is now necessary for each of the files in the training set to simply be processed 426, on a non-comparative basis, through the ANNs to generate a Euclidean vector for that track. This vector can then be stored 430 in a database as value cross-referenced to a file name, e.g. a song title and artist or other form of identifier. Since the vector is comprised from distinct components attributable to particular file properties, the vector can itself be parsed to permit searching for a particular identified property. For example, if commonality in rhythm is an over-riding requirement, then any numerical closeness between source and reference files in this particular contributing (in the preferred but exemplary case) sixty-four-dimensional output $OR_x$ is deterministic of semantic closeness in rhythm.

In other words, when the individual artificial neural networks for rhythm "$NN_R$" 310, tonality $NN_{TO}$ 312, timbre $NN_{TT}$ 314 and musical texture $NN_{TX}$ 318 have been optimised, the measurable properties of an (exemplary) audio track are reliable reflected in a multi-dimensional vector generated by processing a sample (e.g. partial or entire song) of the audio track through the various NN having set optimised weights and biases. Consequently, based on an absolute value scale, actual perceivable dissimilarities or similarities can be assessed for track against track, including new tracks that were not used in the training data set. At this point, the semantic distances used for training can therefore be ignored because semantic space has now been mapped to an absolute scale where close numeric values accurately represent contextual similarity, whereas large numeric distance represent user-discernible dissimilarity.

Figure 7:
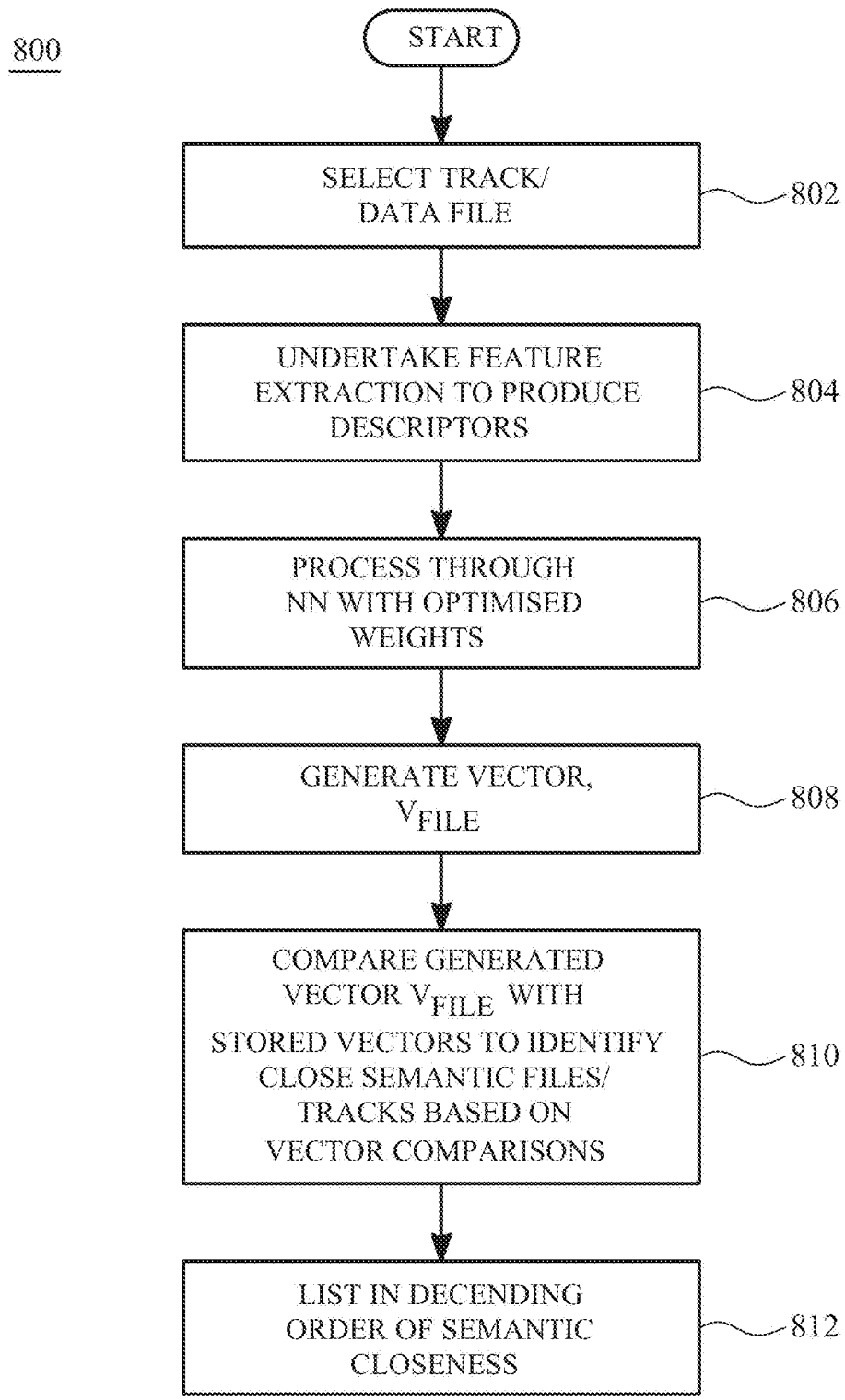
FIG. 7 is a flow process employed by a preferred embodiment to assess a measure of emotionally-perceptive file dissimilarity, especially in the context of an audio file.

FIG. 7 is a flow process 800 employed by a preferred embodiment to assess a measure of emotionally-perceptive file dissimilarity, especially in the context of an audio file.

Once the neural network of FIG. 2 has been trained, an audio track (or the appropriate category of file) is selected 802. The selection is typically by a user, such as an owner of or subscriber to a music library or service. Alternatively, selection may be in the form of an upload of a piece of music or file, including an original composition. The selected or uploaded "first" audio file is then processed to obtain feature extraction 804 of identifiable properties, such as tonality, etc. The neural network of FIG. 2 then processes 806 the extracted features using the optimised weights and biases to generate 808 a first file vector $V_{FILE}$ (in Euclidean property space or some other appropriate property space) representative of a plurality of user-discernible or user-selectable, system measurable properties of that particular file. Referencing 810 the file vector $V_{FILE}$ for the first audio file into a library that is indexed by both file identifiers and associated file vectors (for those other files) permits those library-based files to be listed 812 in a descending order of semantic similarity to the first audio file. This can be achieved with or supplemented by the use of kNN analysis.

Figure 8:
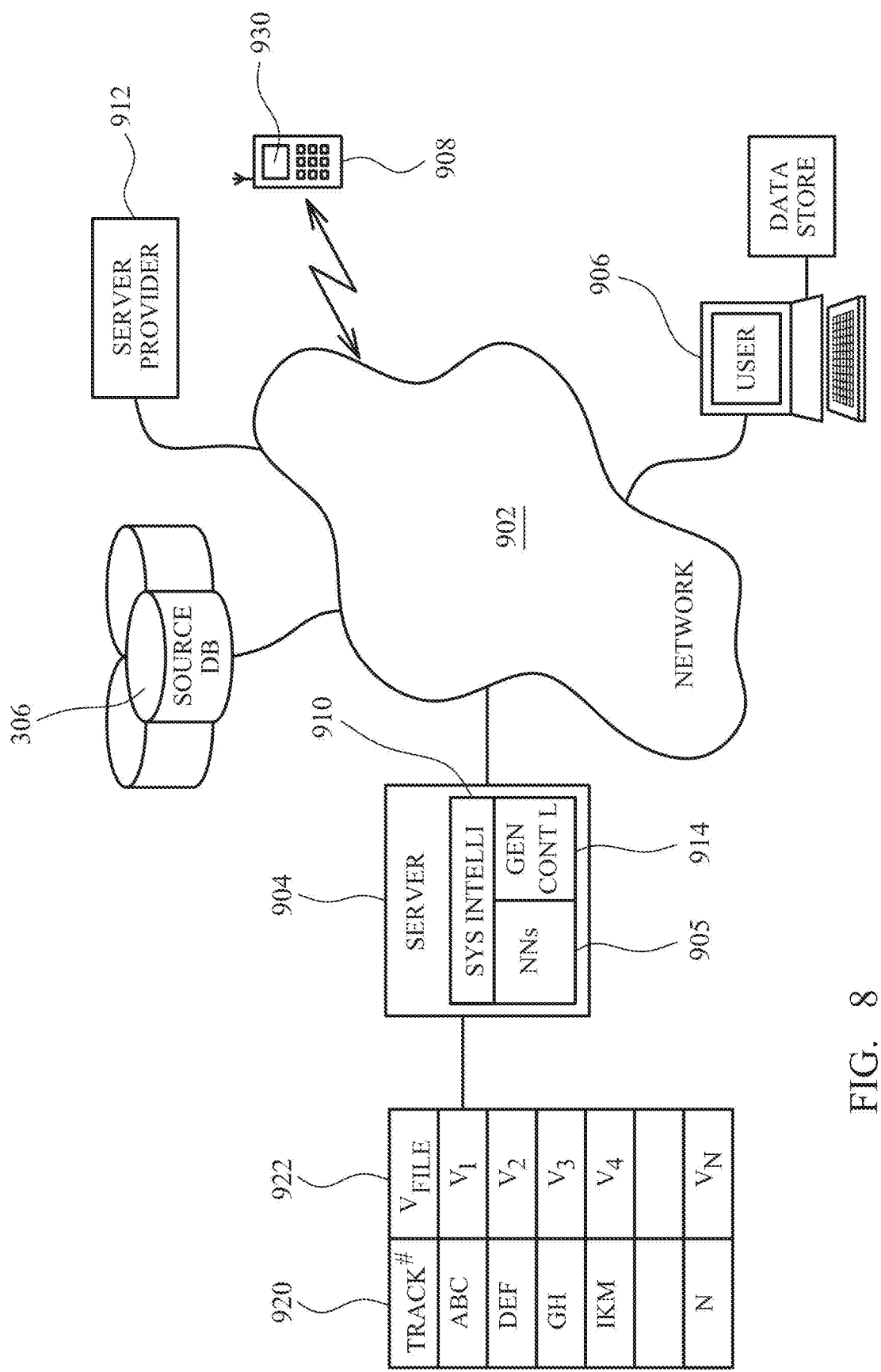
FIG. 8 is a network architecture, including an accessible database containing vector representation according to a preferred embodiment.

FIG. 8 is a system or network architecture 900, including an accessible database 902 containing vector representations reflecting file similarity/dissimilarity measures according to aspects of the present invention.

Typically, a network (such as the internet) 902 permits communications to be passed between devices, such as a server 904, a home computer 906 and a smartphone 908. These three categories of device are not limiting but indicative of both processing intelligence within, and access points of/into, the system 900. The server 904 typically supports the artificial neural network 905 described above especially in relation to FIGS. 2 and 6. The system intelligence may, however, be more distributed, including being cloud-based or distributed between a plurality of interconnected servers. For the sake of clarity only, system intelligence is simply shown as a block within the server, although it will be readily appreciated that computing power is also within the smartphone and computer. The server, as with other interacting units, will include general control firmware and software 914, e.g. to support web-based access and/or to control registration of user's to services administered by the server or other service provider 912 and/or to support communications protocols. The server may regulate access and information loaded into or extracted from a source database 306 coupled to the server, e.g. via a LAN or WAN. This access may be by the computer 906, smartphone 908 or the like.

The source database may, in fact, be an existing library of files, such as a catalogue of audio files. Files in the source database may, therefore, over time be extracted by the server and processed to produce cross-referencing between files identities (such as track name and artist) 920 and generated Euclidean vector measures ($V_{FILE}$) 922 representative of file properties aligned with emotionally-perceived semantic qualities.

The provision of a user interface 930, such as a touchscreen of a graphic user interface "GUI" on, for example, a smartphone provides access to searching tool software application that permits searching for tracks sharing close semantic properties according to the invention. The software may be local or otherwise accessed through a web browser allowing interaction with the server 904, databases 306 or service providers (such as social media companies having access to content). Alternatively, the software may be hosted as a web-based service. Preferably, the GUI 930 offers the user with a number of "soft" slider controls that relate to selectable properties or listening/searching preferences, e.g. a first slider may relate rhythm. The slider positions can therefore be altered, by the user, to reflect search parameters that correlate to individual contributing multi-dimensional vectors $OR_x$, $OTO_x$, $OTI_x$ and $OTX_x$ in the final embedded vectorial output 350, 352. Setting the sliders on the GUI therefore targets specific vectorial aspects in processed tracks 920 stored within the system.

Figure 9:
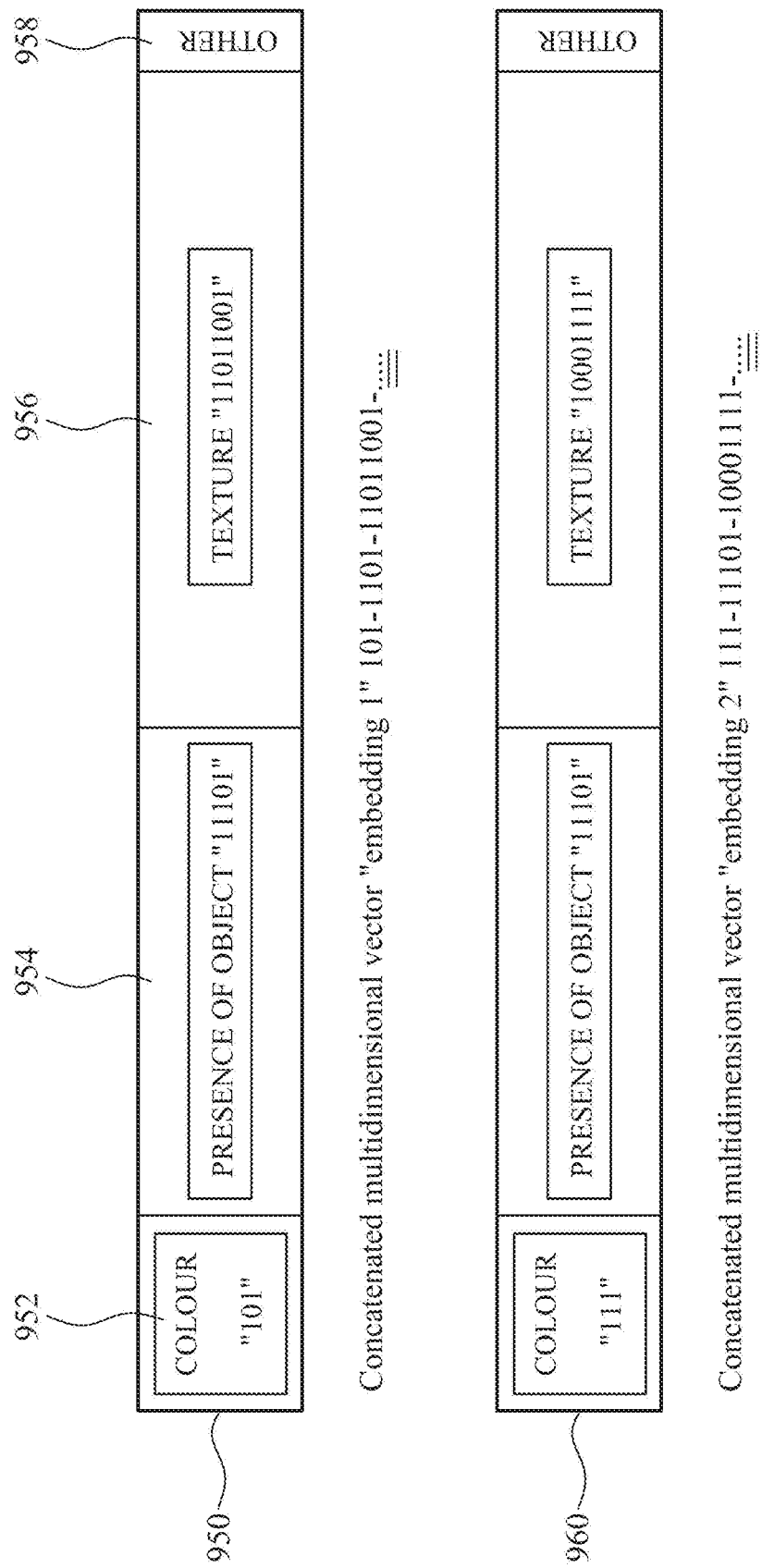
FIG. 9 illustrates two exemplary embeddings in the context of exemplary video file assessment.

Referring now to FIG. 9 which illustrates two exemplary embeddings in the context of exemplary video file assessments based on selected extracted properties that define the file. A first embedding ("embedding 1") 950, shown at the top of the figure, has an exemplary multi-dimensional vector "101-1101-11101101---" assembled from concatenated contributions for measured properties for colour 952, presence of an object 954, texture 956 and OTHER 958 that are extracted from a first data file. The term "OTHER" has been used to indicate that other properties may be measured and the multi-dimensional vector extended in bit length. A second embedding ("embedding 2") 960, shown at the bottom of the figure, has an exemplarily generated multi-dimensional vector "111-11101-10001111---" assembled from concatenated contributions for extracted measured properties that correspond to colour, presence of an object, texture and OTHER properties for a second different data file. Further, as indicated above, individual quantized dimensions may have, in terms of the overall sematic representation, greater or lesser significance relative to other quantized dimensions in categorizing each file for a particular user. For example, the property colour [in the context of an exemplary video scenario] may be less significant to a user's searching objective or user categorization of that file [from the perspective of relative importance] than the property "presence of an object" [which suggests fast moving evolution]. Also, as indicated, there is no reason for the individual vectors to be of a common length.

As will be understood from the foregoing. each file vector is an expression concerning semantic qualities but expressed in multi-dimensional property space. Each file vector $VF_{FILE}$ is thus a semantic representation.

Figure 10:
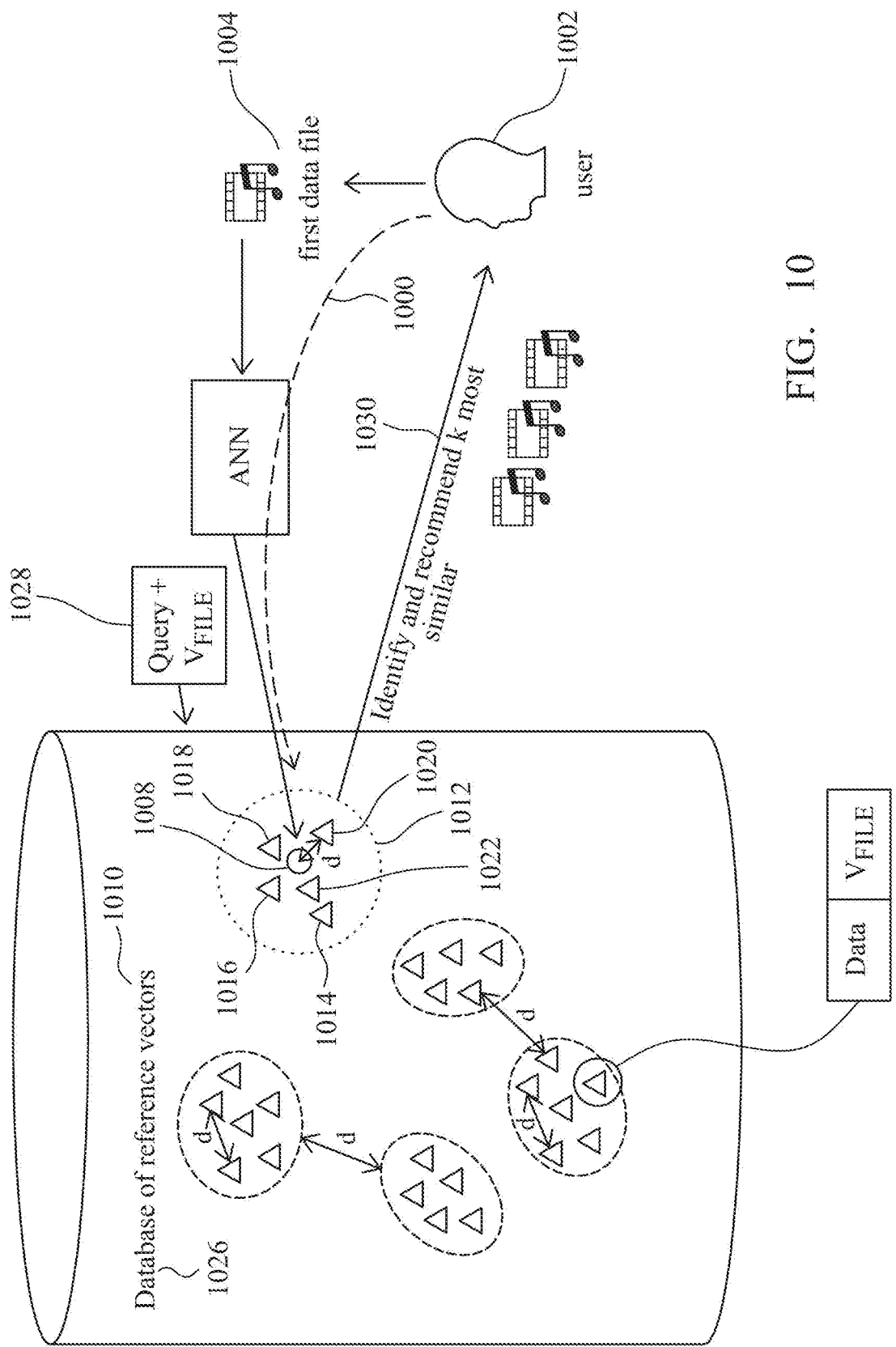
FIG. 10 shows a functional architecture of a recommendation system implementing the preferred method of FIG. 7.

Turning now to FIGS. 10 to 15, these figures illustrate use of embedded vectors (or "embeddings") in terms of system interactions with a user and deliverables by differently arranged systems having different technical objectives. FIG. 10 is, in fact, closely aligned with and representative of the process shown in FIG. 7.

In all cases, each embedding is a file vector $V_{FILE}$ derived by the process of FIGS. 7 and associated with the data file, and thus reflects a numeric evaluation of semantic perception of dissimilarity/similarity measures for that particular data file as obtained from extracted file properties for that particular data file. The multi-dimensional vector that is the embedding is obtained from processing of the supplied file in the trained neural network of FIGS. 1 to 6 and FIG. 8. As indicated herein, the vector $V_{FILE}$ associated with a data file is a semantic representation of a plurality of user-discernible or user-selectable, system measurable properties of that particular file. The association, although preferably captured in file metadata, can be looser and just a suitably accessible cross reference in a table or link into a database. Direct incorporation of the file vector $V_{FILE}$ into the metadata is however preferred.

In certain cases, an initial query from a user need not contain the file vector $V_{FILE}$. Rather, the initial query may take a variety of forms, such as a textual description or more likely a virgin, i.e. unprocessed, raw data file. Of course, the query could also take the form of a file that already contains the file vector $V_{FILE}$ (as generated at step 808 of FIG. 7).

Any virgin file can be either processed locally at a user device (the "client side", such as a smartphone or computer), or remotely on the server side at a server or other intermediate processing entity accessed via the network 902 (of FIG. 8). For local processing, the local device downloads an adapted version of the training process/trained network to permit local evaluation, although the user device could interact with a specific site and make use of javascript or the like. The common thread is that processing of the virgin file generates a file vector $V_{FILE}$ in measurable property space, and that processing intelligence in the system (whether this is at the user device, the server or elsewhere) functions to extract measurable properties from the virgin data file and applies those extracted properties through a trained neural network to generate a realistic semantic assessment in property space for the virgin data file.

For the sake of explanation only for FIG. 10, the query 1000 from a user 1002 is assumed to take the exemplary form of a virgin, i.e. previously non-evaluated, music data file 1004 although the file could equally be a virgin video clip/file, speech or a virgin text file). The virgin data file is processed, somewhere at an appropriate processing point in the system, in an ANN 1006 that has been trained to provide a similarity/dissimilarity file vector $V_{FILE}$. This vector is associated or embedded with the virgin file which can therefore be contextually placed within a database 1026 of reference vectors 1010 (and their associated user-consumable relevant data) and thus surrounded, in a semantically relevant cluster of user consumer data, by of one or more relevant candidate files 1014-1022. By comparing and contrasting the respective reference vectors of pre-stored candidate files in the database relative to the newly created vector for the query 1028, relative numerical ordering of semantic distance d [based on absolute measures between respective vectors] of those candidate get files to the query can be established and the k most similar/closest target files 1030-1034 in the database identified and communicated 1030 to the user 1002. Ordering of the growing number [assuming that the query, associated data and vector is stored in the database by the system] of reference data files in the database according to increasing numerically-evaluated vector distance variations thus reflects user-perceptive similarity/dissimilarity between all files in the database.

The k closest identified candidate files therefore represent an improved recommendation process that is based on a numeric characterization of data in which the evaluation is based on a process that reduces the semantic gap by improving alignment between real-world perception and suggested artificial reality.

The reference files/reference vectors in the database 1026 may be further partitioned or rearranged. The semantic similarities/dissimilarities may be reflected by assessed quantified differences over the entire concatenated lengths between respective file vectors $V_{FILE}$ but may also be assessed over one of more selected portions of the concatenated vectors that are reflective of one or more specific extracted property/properties of higher user-selected relevance, e.g. colour may be more important to a user than the presence of sound, or age of a file may be of importance.

It is noted that, whilst shown remote to the user 1002 and described as accessed via a server, the reference database may be local to the user, e.g. stored in a local hard drive on a user's computer.

In FIG. 10, the application therefore assumes that relevance of recommendations is only determined by semantic similarity relative to a query item, e.g. a media file, provided either by the user or else the media item last consumed by the user. This approach holds in application scenarios where other user and media item information is irrelevant, e.g. in the case where a music industry professional is searching for a royalty-free song to replace a temp track and where information related to the user's demographic or previous searches is/are irrelevant.

Figure 11:
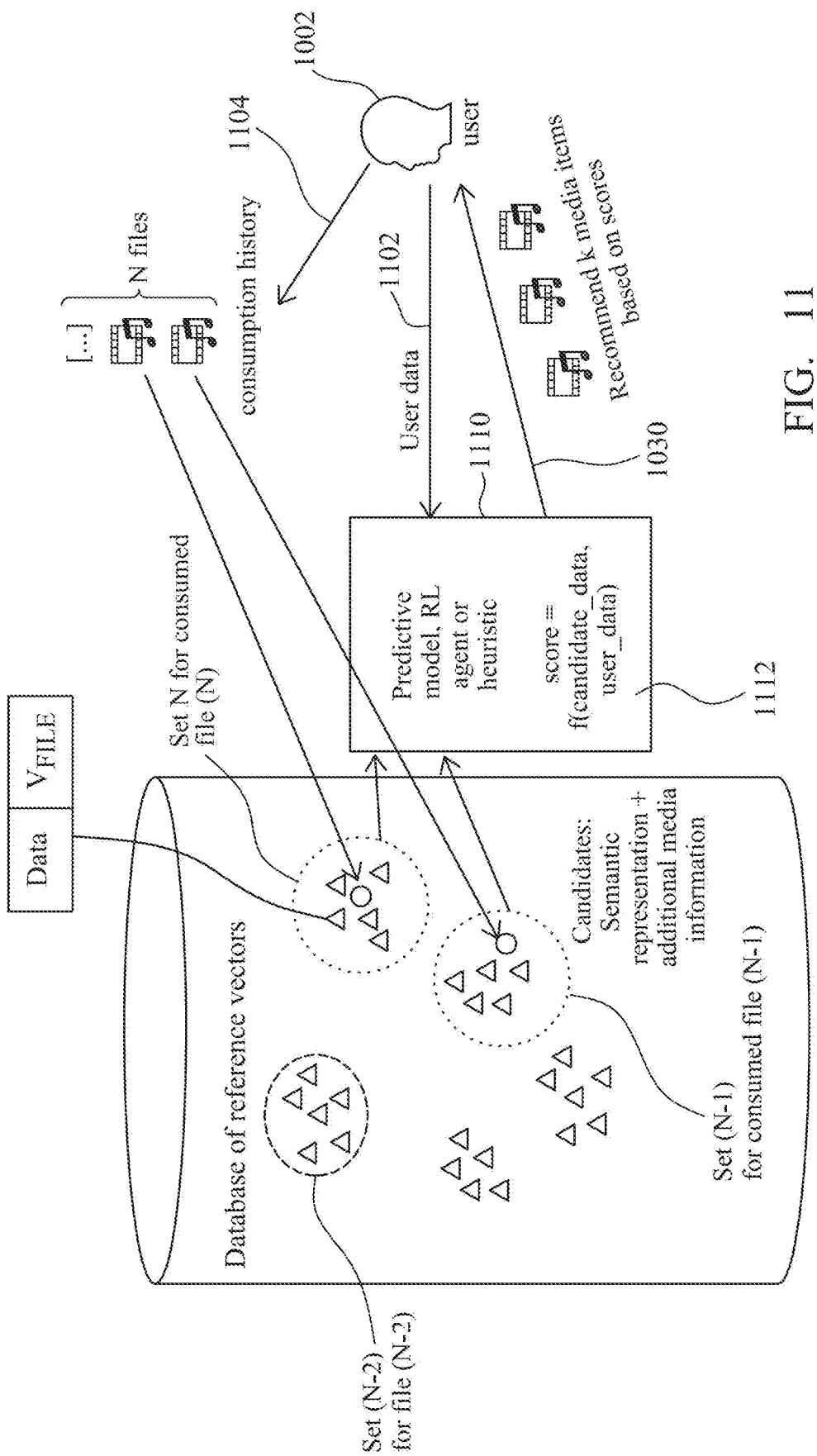
FIG. 11 shows a functional architecture of a hybrid recommendation system including multiple recommendation layers according to an embodiment of the present invention.

In FIG. 11, the system uses a semantic representation (i.e. the embedded file vector $V_{FILE}$) to generate a set of candidates that are then made the subject of a secondary search that refines the results and further improves recommendations made to the user.

In contrast with the approach in FIG. 10, the user 1002 registers with a service, e.g. through a server-supported log-in procedure. During this process, the user 1002 inputs user data relating to independent user attributes that are not related to consumed content. These user attributes may include demographic data, such as age and gender to name a couple of well-known exemplary attributes. These attributes are stored within the system and typically on the server side although they could also be cached locally and uploaded at user log-in for use by system intelligence. The registration process permits the server to identify the frequency of user log-in, as well as geo-location of the user (through the domain) and geo-location of accessed content, watch time of any user-accessed content, historical purchase of viewed content. The registration process thus permits a profile to be established, including a consumption history of types of data files, e.g. genres for films or music, streamed TV programs, downloaded books, etc. Profile acquisition is well-known to the skilled addresses and further explanation not required for the sake of understanding of the invention. User data may be acquired from a third party database of a platform to which the user has already registered.

In this aspect, recommendation can be made proactively by the system intelligence (whether local or disparate to the user) rather than in response to a direct uploaded user query.

The system intelligence again, ultimately, is configured to provide a list of recommended consumable files to the user, albeit in a two-stage selection process. To do this, the system initially identifies a recorded user consumption history 1104 of N consumed files. Each of those N consumed files has an associated/embedded file vector $V_{FILE}$ generated by the trained neural network of FIG. 2 and known (e.g. pre-stored) or calculable by the system intelligence. In other words, each of the N historically consumed files has a semantic representation reflected in its own manipulable property vector. For a set of N consumed files, where N≥1, the system intelligence selects M semantically similar files to each of the N consumed files. The processing intelligence operates a selection that is assessed by the relative quantitative distance measured from each of the file vectors $V_{FILE}$ of each of the consumed files to relative to all other reference file vectors $V_{FILE}$ for deliverable, i.e. recommended, candidate files stored in the database. The system intelligence thus generates a set of M*N candidate files (where 1≤M≤N) as initial pools of candidate files for recommendation to the user. For each of the N sets of M files, ordering relative to each consumed file generates a list of semantically similar files that are preferably ordered from close to distant. Ordering may be based on an ordering of absolute relative distance measures across all M*N files identified in the process, or ordering may be in groups around each of the historically-consumed files (reflecting the fact that semantic closeness may tie to different file qualities, e.g. tonality and timbre in exemplary musical instances).

The process does not need to be triggered by a specific user query (such as the provision of a file to the system intelligence) but generally the process will be triggered by a user interaction.

These M*N candidate files provide a first input to a pretrained predictive model, reinforcement learning "RL" algorithm or heuristic processing function 1110 (collectively referred to as an "predictor").

As a second input to the predictor 1110, the system intelligence applies stored user data acquired from the registration or log-in processes. As a third input to the predictor 1110, media information is applied, which media information relates to explanatory descriptors related and cross-referenced to the content, e.g. composer, author or director detail, production or distribution date, genre (for audio or film files). Other media data will be readily appreciated and can take many forms of descriptor, including hashtags, download rates or absolute download numbers and global feedback from the system's user-base.

The predictor 1110 is arranged to calculate a score 1112 based on interactions with the user over time and, particularly, through varying learned weighting applied across the three inputs with time. The process of learning weighting that is to be applied to the three inputs to the predictor to reflect user preferences are processes known to the skilled addressee, e.g. the contextual bandit algorithm (Li, Lihong, et al. "A contextual-bandit approach to personalized news article recommendation." Proceedings of the 19th international conference on World wide web. 2010). Numeric ordering of the scores for the predictor 1110, having regard to weighting of the three inputs, provides a refined listing of k semantically close and relevant candidate files for output as a recommendation list to the user 1002 (where k<N*M).

The recommendation list 1030 may be data files for direct instantiation or review at the user's device or otherwise a link to the data files. The recommendation list represents a refined and more accurate reflection of relevant materials because the process technically reduces the semantic gap by making use of manipulate file vectors that code information in a fashion that aligns an objectively assessable property-based vector with semantic reality.

In summary of FIG. 11, semantic similarity is assumed to be one of several factors that will determine the relevance of a recommendation to a user. Other factors may include user demographics, geo-location of the media item and the user, media item popularity (i.e. the number of views or user-reported likes), media item meta-data (i.e. hashtags), previous user feedback for media item (i.e. watch time, purchase) among many other options. Semantic representations of the N previously consumed items are used to identify M semantically similar items for each. The resulting N*M items represent candidates. A pre-trained predictive model, reinforcement learning agent or heuristic can then be used to determine a score for each candidate, taking into account all available user and media item information, where the latter may include the semantic representation. Finally, the system intelligence functions to recommend k media items based on the predicted scores, where k<N*M.

Figure 12:
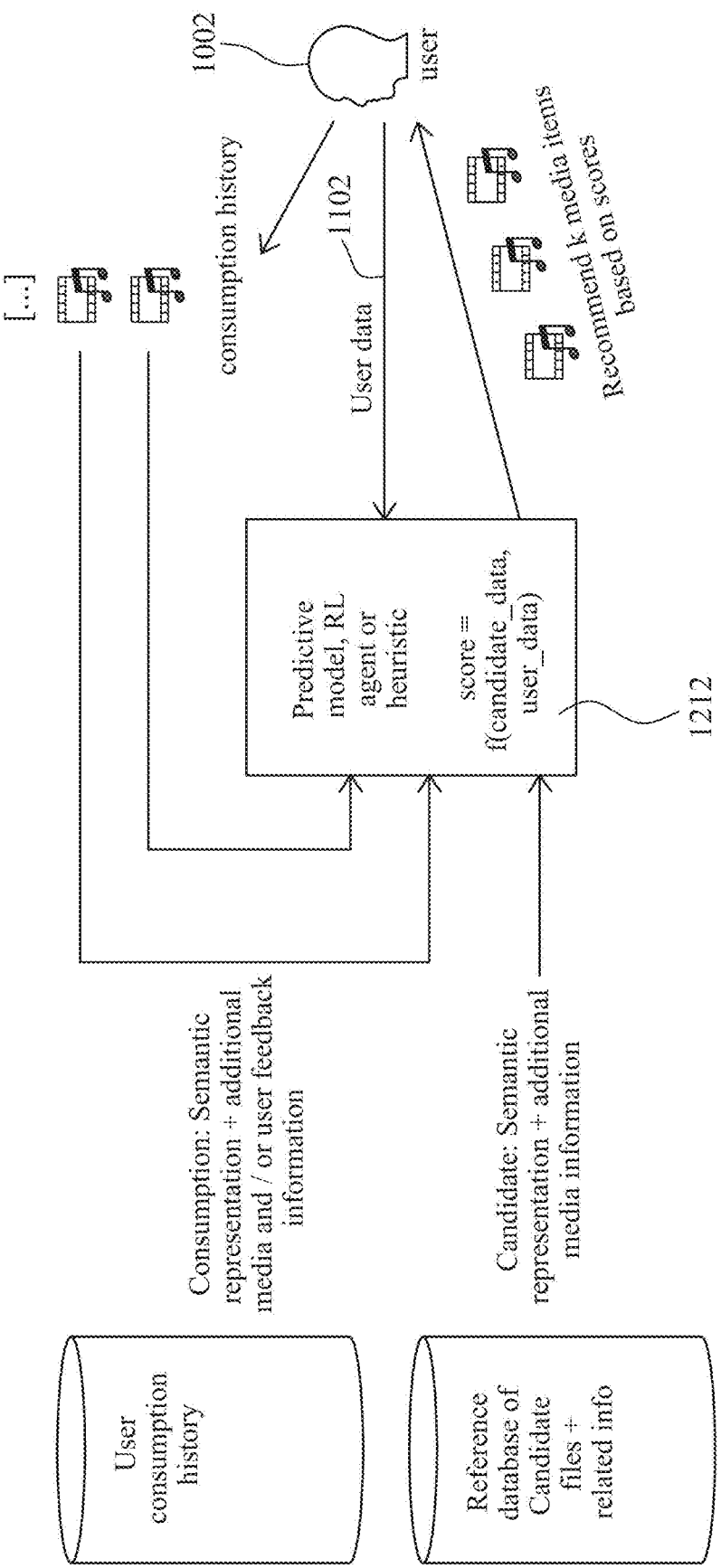
FIG. 12 shows a functional architecture of an alternative hybrid recommendation system including multiple recommendation layers according to an embodiment of the present invention.

User data in the various applications described in the context of FIGS. 11 and 12 and elsewhere herein relates to data not derived from file content.

User queries may take the form of words, video, images, speech or just a request, e.g. 'give me a continuous flow of semantically relevant files for consumption'. Supply of recommendation based on little user direction may be based on observed user interactions with the system, e.g. recorded file download or watching behaviours acquired from the specific user's consumption history.

Referring now to FIG. 12, its approach is not dissimilar to that described above in FIG. 11 because the semantic similarity is treated as one of several factors that will determine the relevance of a recommendation to a user. However, in this solution, the set of candidates is either the entire reference database, or some form of heuristic pre-selection is applied (i.e. based on novelty or a random selection of candidate files). Again, a user profile is established and user data 1102 stored in the system.

In terms of the inputs considered by the predictor 1212, additional media information from the consumption history may include specific user-selected preferences. For example, the additional media information may include:
  in music: genre and tonality, artist, production year and instrumentation, label, etc.
  in video: genre, picture aspects ratios, the nature of the programme (e.g. documentary or film or trailer), director, actor, the original form of broadcast (e.g. TV or other recorded live performance),
  for images: the nature of the photograph (e.g. sports or countryside), the pixel count, colour or black and white, hashtags and the creator identities,
  for text, such as medical records: authors and creation date.

User feedback can include user ratings, user interactions (such as file sharing and messaging) and timed observation by the system of user interaction with a previous file. In the latter respect, if a user skips over a file, then this is indicative that the file is not relevant to the user or the user's mood at that time.

In FIG. 12, the predictor again predicts a score for each candidate by considering available information about the candidate (which includes its semantic representation in the form of the file vector), the user and the user's consumption history (which again includes semantic representations in file vector form). Finally, k media items are recommended to the user 1002 based on predicted scores from the predictor.

Figure 13:
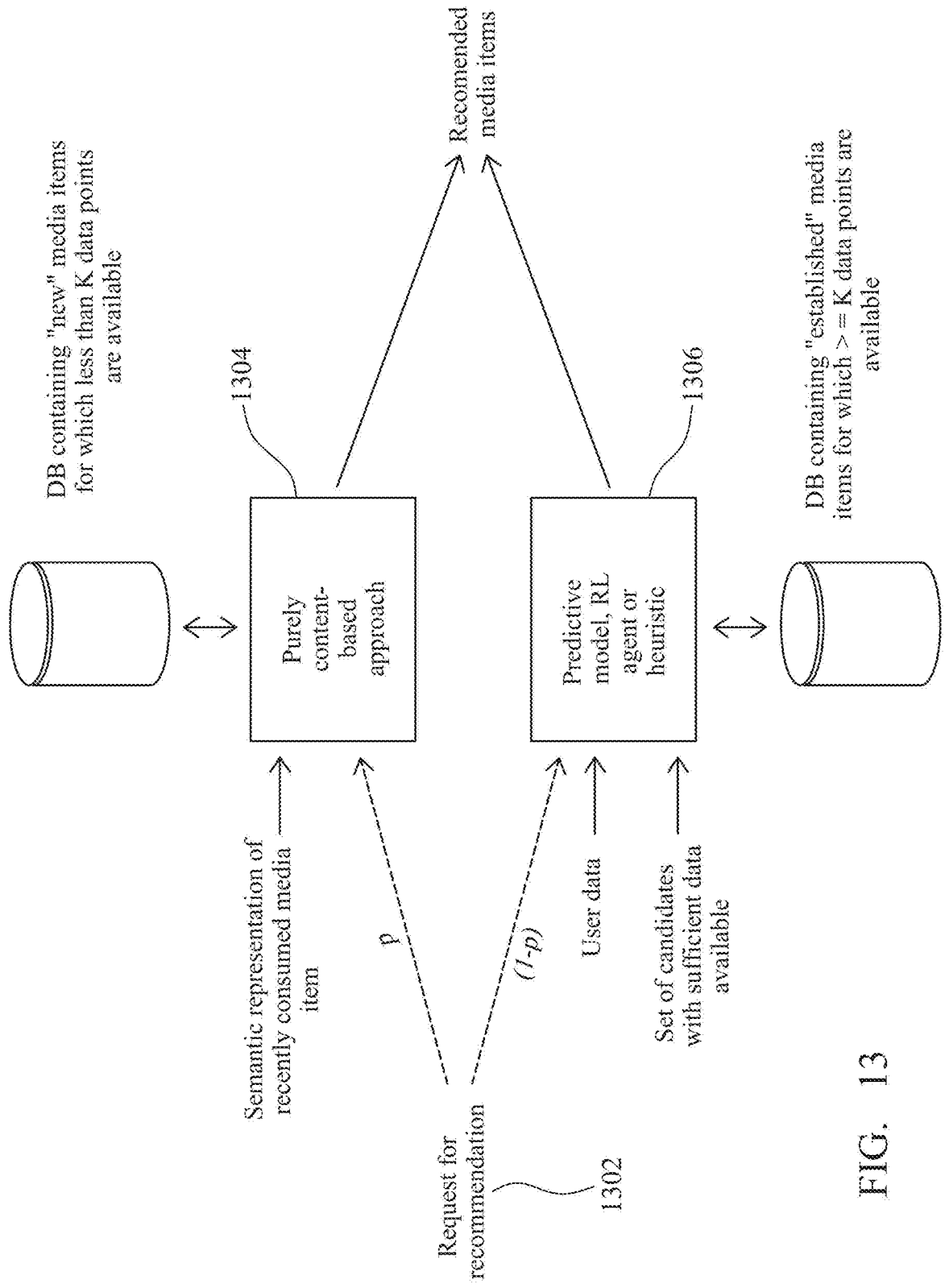
FIGS. 13 and 14 show functional architectures of file-centric and user-centric recommendation systems according to embodiments of the present invention.
Figure 14:
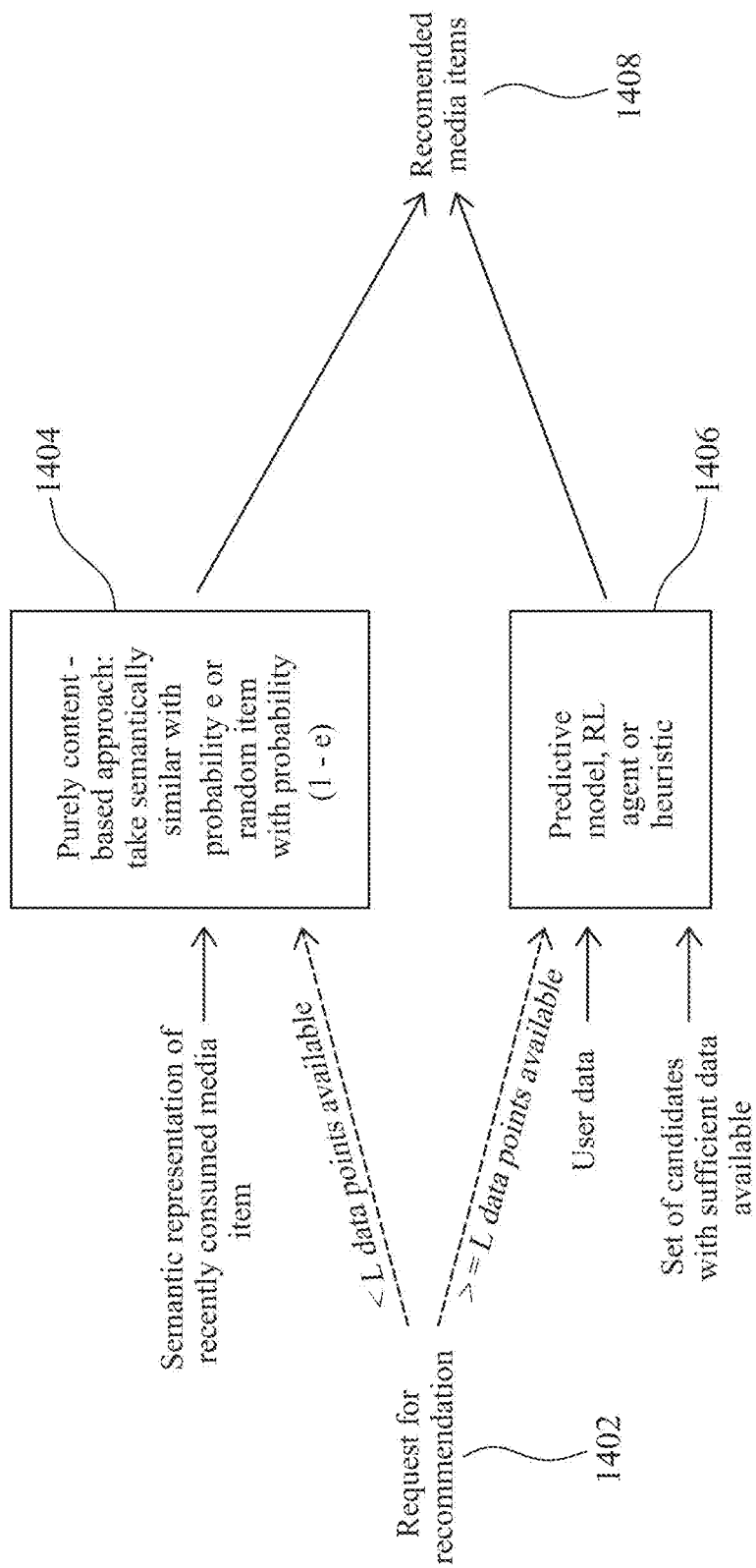

Referring to FIG. 13 and FIG. 14, this approach to recommendation is based on "cold start" where the system intelligence has no or very limited information concerning a new user or new file. In this respect, existing predictive models commonly lack accuracy when there is little or no data available for either a new user who has just subscribed to a new social media platform or a new specific media item, e.g. when a media item has only recently been added to a library and has not yet been consumed and/or rated by a sufficient number of users.

The media item cold start scenario shown in FIG. 13. For the exemplary case of a new video, there is no background knowledge to allow recommendation of the new video using the predictor 1306. Each time the system intelligence is requested to make a recommendation with probability p, the system implements a purely content-based approach that recommends, from a pool of videos for which little user feedback is available, a new video which is semantically similar (assessed using its file vector) to videos previously consumed by the user. For probability (1-p), the predictor generates a recommendation list from a pool of video for which a high amount of user data exists. Each time the content-based approach is probabilistically selected, it will generate a new data point that can be interpreted by the predictor in the next recommendation cycle to improve the predictor's performance.

Referring to FIG. 14 and its applicability to a user cold start, the system intelligence deals with a request, from a user, for a recommendation 1402. The system is arranged to implement a probabilistic approach. The system has available to it, in the reference database, files having related file vectors numerically indicative of semantic qualities of the file. In terms of a start, the system intelligence identifies recently consumed files, e.g. media files that have a high hit rate and play duration from within the universe of users of the system. A recommendation listing is therefore initially provided to the user based on a purely content-driven approach 1404 in which recommendations can flow from semantically similar files to the current "hot" topical files viewed/downloaded by users. The content-driven approach can be terminated at a point when a predetermined threshold of data points has been reached, e.g. the user has been subjected to a set number of data files and has consumed these. The content-driven approach may have an exploration component that injects random files into candidate files in order to generate a response in the predictor and thus to avoid being caught in a limited semantic environment.

With increasing acquired knowledge from specific user data, a predictor 1406 presents an alternative path to effective recommendation. The predictor 1406 is arranged—or increasing is able—to resolve, in response to the request for a recommendation 1402, acquired user data and a set of candidate files that are ordered, again, based on semantic distance as reflected in relative contrasting of multiple file vectors $V_{FILE}$. User data may further include, but it not limited to, geo-location data for the user or the origin of a consumed file.

The system intelligence behind FIG. 14 therefore treats the alternate but potentially complementary contributions through (a) the purely content-based approach 1404 and (b) predictor 1306 as weighted probabilistically differently over time, e.g. after L file items have been consumed by the user.

Initially, the probability p of making a user-sensible recommendation 1408 following a cold start favours a higher reliance, weighting and use of the purely content-based approach 1404. At this point, p may take a value of 1 so that the recommendation is entirely content based at the outset; this leaves the predictor with the ability to further research and evaluate the dataset with a view to influencing the recommendation when sufficient user consumption provides a meaningful and reliable contribution to recommendation. After time and with the acquisition of specific and sufficient user data, processing and recommendation from an output from the predictor [which functions predictively or a collaborative filtering basis] is recognised by the system as more relevant. Thus, the system intelligence is arranged to value the probability (1-p) of the recommendation being influenced by the predictor's assessment as more dominant with time. The value of p can be set to zero in force use of a hard threshold.

In sum, the system intelligence supporting the process shown in FIG. 14 may be arranged, for example, at each new enquiry from a newly established user account to decide whether to recommend a "new" file (e.g. a media item) based on semantic similarity with previously consumed items with a probability of p or to use a predictive or collaborative filtering based mechanism to recommend an item among a set of candidates for which sufficient data is available with probability 1-p (where 0<p<1).

Figure 15:
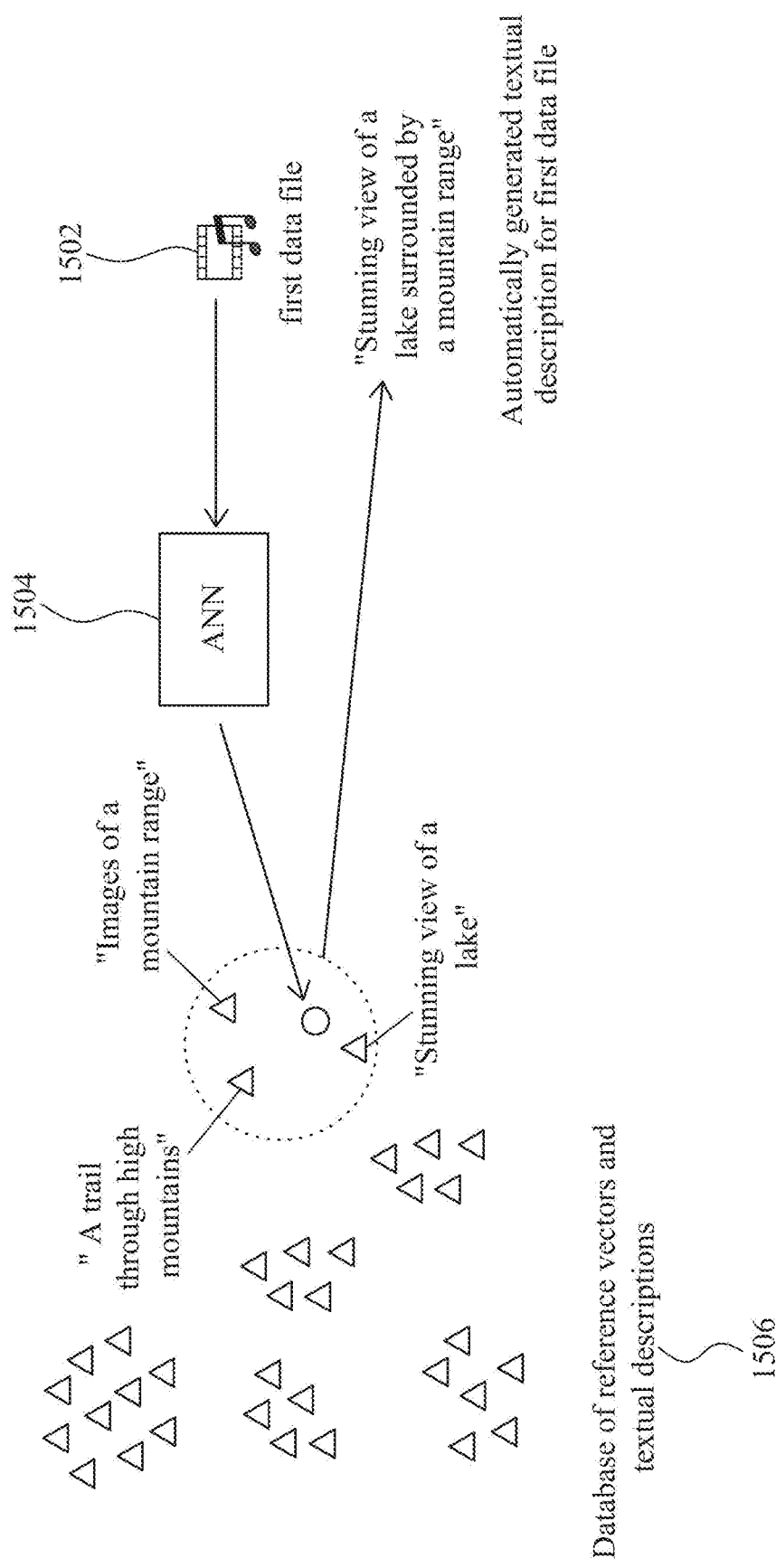
FIG. 15 shows a functional diagram of a tagging system and content filter according to an aspects of the present invention.

Turning now to FIG. 15, the basic architecture resembles that already described in FIG. 10. A query, such as a data file 1502, is communicated from a user device (not shown) through a trained neural network 1504 that extracts properties to generate a vector representation that maintains a semantic descriptor with a corresponding vector expressed in property space. The system includes a database 1506 of reference vectors, although this database also cross references the vectors to textual descriptions. Consistently, the processing intelligence of the system is arranged to identify semantically close candidate files (shown as triangles in FIG. 15) relative to the file vector associated with the query (shown as a circle in FIG. 15). Again, vector comparison leads to an ability to order semantically close files based on identified distances, with greater distances between vectors increasing the level of dissimilarity in the content. The system intelligence then makes a recommendation, although this may now be a single output or a message that is communicated to the user who generated the query and/or to a third party, including a secure computer at a government agency. Textual descriptions, as will be understood, are present within the original training set since these are subject to NLP to generate the semantic vectors in order to assess pairwise distance and have these maintained relative to pairwise distances for extracted properties for the each pair of training files.

FIG. 15 operates on the premise that the ANN is able to code the query presented as a file into a vector that aligns to other semantic representations and particularly textual description in the database.

At a first step, the algorithm of FIG. 7 computes the embedding of the new query in the semantic space and subsequently detects, typically using Euclidean distances, a number of close neighbour candidate files for which the computed Euclidean distance does not exceed a predefined threshold. At a second step, one or more textual descriptions of the candidate files are assembled based on the file vector generated for the query and a cross-referencing in the database. Retrieved textual description for the candidate files, given the vectorial closeness, will generally describe in different and possibly complementary ways the object of the new query.

The processing intelligence, in response to the textual descriptions of near-neighbour candidate files applies natural language processing techniques, such as off-the-shelf summarisation algorithms, to generate one representative composite textual description from all the retrieved descriptions associated with the candidate files within the threshold distance. This composite textual description is communicated from the server-side system intelligence to either the originator of the query or a third-party gatekeeper for a social media platform, including judicial authorities.

An important application context of this setup is the detection of illegal content, i.e. inappropriate images or videos that could be published on social media platforms. Here, a media item would not only be flagged as potentially being illegal based on the annotations of semantically close reference files, but the generated description would provide hints towards the type of violation of user guidelines, e.g. "porn", and/or legal restricted content of a violent or perverse nature. Any generated description and file related to the original query can be handed to authorities if there is a suspicion of the content being illegal. Such a system can catch illegal content early on and avoids content moderators, at the social media site, to be exposed to such illegal content, especially offensive images. The system intelligence, in fact, acts as a filter that immediately stops content from being uploaded and stored based a semantic evaluation of the query and the generation of a file vector that can be assessed against known file vectors. In fact, the generation of the vector for the query and the comparison with other vectors obviates the need to review or even store anywhere the specific content of what would be neighbouring candidate files. It is simply sufficient for the system to have a reference to vectors and a brief textual description or even just a warning code for the system filter to the applied.

Figure 16:
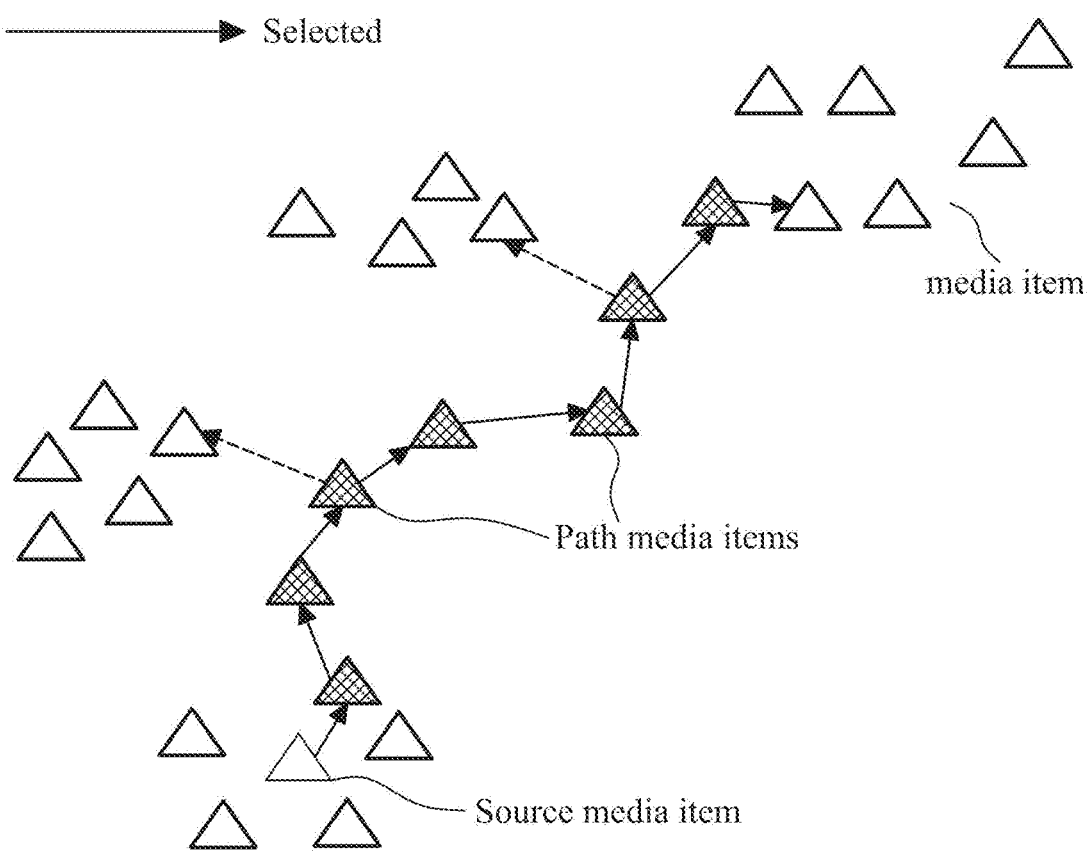
FIG. 16 shows a functional architecture of a source-to-target playlist generation system.

Referring now to FIG. 16. The vector generation scheme described herein permits for a progressive transition in a playlist between a source data file and an end data file along a logical path in which transitions between consecutive files is perceptually acceptable. In this context, as a musical example, a transition from a heavy metal song to a piece of choral music may be achieved is a sensible fashion through intermediate steps that ensure that transitions and semantic distances between adjacent files are within a threshold distance and that, the direction of travel is towards (and not away from) the end data file. In this respect, vector distance relative to the end point are assessed at each step in generating the stepwise plan.

In terms of a further application context, playlisting aims at grouping media items with similar characteristic. However, real-world DJs and VJs often pass through several genres in a single session, while maintaining a "smooth" transition between successive items. Using the arrangement of a set of media items in semantic space, such behaviour can be simulated algorithmically by specifying a succession of source and target files. Standard graph theory methods can be applied to determine a path through from source to target via other media items under a set of pre-specified conditions, including the number of media items in the path or a time for transition between source and end points. If the path finding mechanism of the system intelligence is configured such that the Euclidean distance in semantic space between successive items is minimised under the applied restrictions, improved "smoothness" in automatically determined transitions between media items is achieved.

Figure 17:
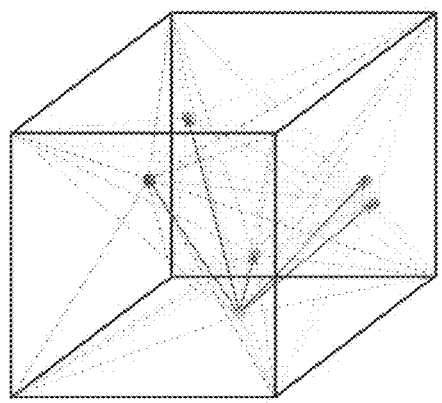
FIG. 17 shows line distances between data files represented as circles and in which diagram only one such relationship is shown to five data points.

The embodiments described in relation, particularly, to FIGS. 10 to 16 (although applicable to the entirety of the embodiments and aspects described herein) address of the problem of closing the semantic gap in a way that permits reliable correlation of semantic perception to output from a trained neural network, and especially to eliminating erroneous recommendation or improving accuracy in recommendation from the outset in presented results over which an end user has no ability to exercise control, to validate or to even appreciate. The system and methodology creates a continuous multi-dimensional space in which there are measurable values attributed to distances in semantic distance but measured in property space, with these distances defined for each individual file and measured from the perspective of each individual file of a multitude of files in an extensive database of files. The resultant vectors for all the files provide a description of the database as a whole irrespective of the point of perspective taken as a start point within the database. As such, irrespective of the size of a set of selected files of the database, the file vectors describe the relationships between files irrespective of perceived closeness or perceived dissimilarity. This is not the same as simply assigning a nominal tag to a file which is the best that a human programmer can hope to accomplish for a collection of data files. The file vectors permit an appreciation of how files having two, three, ten or hundreds of different qualities to be mapped relative to each other and weighted according to their impact of perceived semantic similarity. In visualising the problem addressed by the invention is just three dimensions, it becomes quickly apparent that it is simply impossible to appreciate the relative relationships [represented in the diagram shown in FIG. 17 as line distances between data files represented as circles and in which diagram only one such relationship is shown to five data points] between, say, ten data files (each having multiple qualities) in three dimensional space let alone fifty, one hundred, one thousand or typically millions of files in multi-dimensional space as stored in a database of a social media platform.

Unless specific arrangements are mutually exclusive with one another, the various embodiments described herein can be combined to enhance system functionality and/or to produce complementary functions or system that support the effective identification of user-perceivable similarities and dissimilarities. Such combinations will be readily appreciated by the skilled addressee given the totality of the foregoing description. Likewise, aspects of the preferred embodiments may be implemented in standalone arrangements where more limited functional arrangements are appropriate. Indeed, it will be understood that unless features in the particular preferred embodiments are expressly identified as incompatible with one another or the surrounding context implies that they are mutually exclusive and not readily combinable in a complementary and/or supportive sense, the totality of this disclosure contemplates and envisions that specific features of those complementary embodiments can be selectively combined to provide one or more comprehensive, but slightly different, technical solutions. In terms of the suggested process flows of the accompanying drawings, it may be that these can be varied in terms of the precise points of execution for steps within the process so long as the overall effect or re-ordering achieves the same objective end results or important intermediate results that allow advancement to the next logical step. The flow processes are therefore logical in nature rather than absolute.

The functional architectures of, for example, FIGS. 10 to 16 may be implemented independently on one another, as will be understood.

Aspects of the present invention may be provided in a downloadable form or otherwise on a computer readable medium, such as a CD ROM, that contains program code that, when instantiated, executes the link embedding functionality at a web-server or the like.

It will, of course, be appreciated that the above description has been given by way of example only and that modifications in detail may be made within the scope of the present invention. For example, the principle by which the neural network is trained and how semantically-assessed qualities, indicated by scaled distances, in a sematic vector space can be mapped to an objectively-generated (typically Euclidean) vector in property space can be applied to multiple forms of searchable data, including audio, visual and/or film, literature and scientific reports (such as medical reports requiring cross-referencing for trend analysis).

Qualities that may be extracted for such different source data include brightness, contrast, colour, intensity and shape and relative size as well as relative feature position and rate of change in some or all of these properties. Other measurable qualities exist for such files, including word-frequency (for text analysis) or motion-related measurements (derived from sensors), so the above is provided as a non-limiting example of how a property space can be populated with meaningful vectors [in property space] that can be contrasted with and aligned to those presented in semantic space. For an image or video, the entirety of the pixelated image or a succession of frames could be used to correspond to musical "texture", with all pixels in the sampled image providing a two-dimensional matrix for convolutional processing. Indeed, it will be appreciated that there is a degree of overlap between the properties derivable from static images or video and music modality, as described in detail but exemplary embodiments above.

In terms of the process and particularly the training mechanism, it will be understood that a quality of a signal may be defined by a single property and that, consequently, the corresponding property vector is simplified in terms of its component parts. For example, the ANN may be presented with raw data like a raw waveform or spectrogram. This approach requires greater processing power because there are many more extractable data points to consider in the input. This also has an implication for the architecture of FIG. 2, namely that for each track there is simply a feature extractor (such as element 132) that feeds into only one vector in the connected neural network (such as NN 310) with no cross—linking to parallel neural networks (which are not needed). For the two tracks 302-304, the respective outputs of the neural network would be (taking FIG. 2 as the example and ignoring the quality that is assigned thereto for the exemplary context of music processing), $OR_1$ and $OR_2$. The output generated by the neural network for each path is therefore not a concatenation of different contributing components from different processing branches, but rather just a single multi-dimensional output from a single processing branch tasked with processing the input data.

FIG. 2 shows parallel branches feeding parallel ANNs 310-316, although it is possible to feed the respective different tracks one after the other through a single branch to generate, firstly, $OR_1$ and then, secondly, $OR_2$. This decreases granularity in the number of properties by grouping together related properties to define a more general property, e.g. instead of distinguishing an exemplary musical file into timbre, tonality, texture and rhythm, an alternative embodiment may use a single global property called "musicality" that encompasses all these signal qualities. This approach is particularly relevant in certain contexts, e.g. text, where a quality may simply be the frequency of a key word or the modal value of a key word within a defined length of text. The ANN arrangement of the preferred embodiments (e.g. FIG. 2) therefore processes multiple measurable qualities all assigned to a single property. In this single path arrangement, the single path/branch may be a standard ANN or a convolutional network that processes either raw data or pre-processed data, such as presented in a spectrogram, and irrespective of whether the underlying data is music, video, text, speech or image data. A standard ANN is also known as a feedforward ANN.

The distance comparator function 330 in FIG. 2 thus compares the vectors $OR_1$ and $OR_2$.

Whilst the preferred embodiment makes use of pairwise comparison, an alternate embodiment may use more than two input files and apply an optimization process in which a loss function is based on comparative distance between the two or more inputs to a reference. This means that, in the context of FIG. 2, there would be (for example) a third track input in parallel with inputs 302 and 304, with the track input appropriately linked to the one or more branches of the neural network (depending on the definition of the quality and the number of properties being assessed), with an appropriately concatenated output vector 350, 352 and a third output vector compared in a multi-input (i.e. three or more input) distance comparator 330. For example, for three input files, the distance comparator could be arranged to evaluate a triplet loss function in which the desired objective is that a first item close in semantic space exhibits a small difference/distance to a reference item and, at the same time, a second item exhibits an extreme/larger/largest distance relative to the reference item in the context of semantic space. It will be understood that the triplet loss can be considered as two consecutive pairwise comparisons between data A and data B, and then the pairwise comparison of the assessed distance between A and B then resolved in distance with third data C.

In the context of image processing, as explained above, different properties and qualities are measured and used to train the system. As indicated above, expressing similarity between images (whether in the training sequence or afterwards in an active AI environment) generally relies on properties different to those in music. Tonality and texture—or how each is used in the context of images and music—is an exception and its use different in these media domains.

For image processing, including static pictures and video inputs, embodiments can be based on one or more of the following considerations:

a) For the property "Texture", measurable signal qualities include values for coarseness, presence of spots/dots, regularity, directionality and so on. Common standard descriptors include the Texture Browsing Descriptor, the HTD and the Edge Histogram Descriptor. Each such descriptor is computed by a standard algorithm and may consist of one or more numbers. These descriptors correspond to "measurable signal qualities" as expressed herein. These descriptors may be stacked into a single numerical vector that represents the texture of the image as a whole. Therefore, a subnetwork of the described neural architecture can be devoted to texture processing, much like a respective subnetwork is devoted to processing of timbre (in the sense of the exemplary context of music processing also described above).

b) For the property "Colour", its importance for visual understanding generally warrants a number of colour space descriptors to be extracted, e.g. a colour histogram descriptor, a dominant colour descriptor, and a colour layout descriptor. Other descriptors will be readily understood by those skilled in the image processing arts, such as those described by B. S. Manjunath, Jens-Rainer Ohm, Vinod V. Vasudevan, and Akio Yamada in "Color and Texture Descriptors", IEEE TRANSACTIONS ON CIRCUITS AND SYSTEMS FOR VIDEO TECHNOLOGY, VOL. 11, NO. 6, JUNE 2001. Each such colour descriptor may be realised by one or more numerical value(s) that capture certain image properties, including but not limited to spatial dispersion of particularly image-relevant dominant colours across a portion or totality of an image region. The colour descriptors can therefore form another numerical vector. Therefore, a subnetwork of the described neural architecture of the various embodiments can be devoted to colour processing.

c) For the property "Presence of Objects in an Image", an existing neural network architecture may already exist that identifies objects, such as faces, vehicles, clothing, etc., and is thus already trained for object detection/classification purposes in images. One such network is the Inception architecture described by Christian Szegedy, Sergey Ioffe, Vincent Vanhoucke, Alexander A. Alemi, "Inception-v4, Inception-ResNet and the Impact of Residual Connections on Learning", Thirty-First AAAI Conference on Artificial Intelligence, 2012. Such networks operate to extract "bottleneck" descriptors for an image at hand. These bottleneck descriptors are long numerical vectors that are usually extracted from the penultimate layer of an appropriate neural network architecture when an image is given as input and are considered to capture image properties related to the presence/absence of a large number of object classes. Again, this type of numerical vector can be fed to a subnetwork of the architecture of the embodiments described herein.

Rather than making use of data from existing trained networks or making use of predefined hand-crafted features [in the context of image interpretation], raw pixel values may be used as direct input into convolutional ANN (in a similar fashion to texture in the exemplary music application described above), or the data can be flattened (i.e. an unfolded numerical vector, i.e. a vector resulting from unfolding multiple dimensions to one) and applied to a standard ANN. The raw pixel values may have a 2D structure in the case of grey-scale images, or a 3D structured input in the case of RGB images. Use of raw pixel data can supplement the properties of image texture, colour and object presence.

With video processing, data may further include temporal considerations where a feature evolves with time. This may affect the choice of the ANN and require the use of temporal models/recurrent architectures, such as long-short term memory "LSTM". Rather than a conventional convolutional branch, convolutional layers may be time-distributed using widely-known techniques. Any modality that has a time component, including music, may also make use of this property contribution in the context of a user-definable quality feature. The user-definable quality feature may be any form of time-series data, including waveforms and sensor-generated data.

A further application of the embodiments of the present invention is in the field of speech processing.

Speech pathology detection refers to the problem of classifying a given audio recording to a set of classes of speech pathology, like dysphonia, phonotrauma, laryngeal neoplasm and vocal paralysis, or deciding in favour of the absence of pathological symptoms.

To that end, a further practical application of the embodiments of the invention can be based, for example, on a database of speech recordings for which medical descriptions are available in textual form and where such textual descriptions might describe the presence or absence of specific speech pathologies in recorded speech. A textual description can emphasize the difficulty of a person to pronounce certain consonants or that their speech contains an unusual number of short pauses. In addition, cross-referenced medical records can include categorical data related to a person's gender, age, education, profession and so on.

From the speech signals, this embodiment extracts measurable qualities from the speech recordings and, as appropriate or desired, group these measurements together to define one or more property for the speech recording(s). For example, speech qualities include (as will be understood and amongst other measurable qualities) pitch frequency [sometimes referred to as the "fundamental frequency"] and formant frequencies of the speaker. Furthermore, data from medical records, if available, can be used as another source of data qualities, as suggested by Chitralekha Bhat and Sunil Kumar Kopparapu, "FEMH Voice Data Challenge: Voice disorder Detection and Classification using Acoustic Descriptors", 2018 IEEE International Conference on Big Data, to be processed in property space. As will be appreciated, there are many other user-definable properties that can be assembled from measurable qualities of an input signal, so pitch and formant frequencies are just exemplary of possible qualities.

Some or all the aforementioned speech qualities (or other speech qualities) can be used as input to a single neural network or they can feed separate branches (sometimes interchangeably referred to as sub-networks) depending on a user-adopted definition of properties selected from—and defined by—one or more of the measurable qualities. For example, all measurable parameters, i.e. measurable qualities, stemming from a patients' medical records can be grouped together as a first property and processed by one branch, whereas audio features measuring qualities of the recorded speech can be grouped and processed appropriately by one or more branches of the ANN.

The semantic space for the speech file is obtained, again, from a subjectively prepared description of the pathology. For example, a written description of this pathology would then be subject to NLP to generate a corresponding vector in semantic space.

With property input and semantic input now assembled from the above data acquisition processes, training of the network is again undertaken using the described backpropagation processes that values semantic perception reflected in quantified semantic dissimilarity distance measures over property assessment reflected by the distance measure between the first multi-dimensional property vector and the second multi-dimensional property vector and such that the ANN maps pairwise similarity/dissimilarity in property space towards corresponding pairwise semantic similarity/dissimilarity in semantic space.

The embodiments thus create a space of embeddings by training the neural network architecture with the proposed backpropagation method. Given a new recording for which a decision is required as to whether a predefined pathology is present or absent, the approach described above produces the embedding of the recording via the trained network and a decision on the nature of the recording can be based on k nearest neighbours in the embedding space.

The exemplary four-property architecture described in FIG. 2 can thus be directly adapted to processing images using image texture, colour, object presence and raw pixel input. Of course, the number of processing paths is not limited to four and, in the limit, could range from one to many hundreds or more (dependent upon computing power, the complexity of the media domain and the size of the training set).

It is envisioned that processing of data may be multi-modal in that the input is not purely music, or speech or video or text but a combination of two or more of these media. In this instance, the semantic description may not change to any appreciable extent. However, the qualities and properties could extend across—and be assessed across—different domains. For example, in a micro-video (i.e. a user-generated video such as uploaded to YouTube® or presented on Triller®) may have its qualities partitioned along the lines of: i) the presence of objects along video frames; ii) the spectrogram obtained from the audio signal, and iii) the textual data associated with hashtags. Of course, there are many other combinations of qualities represented by subsets of signal qualities or raw data, and many qualities might overlap and make use of different subsets of derivable properties.

The invention claimed is:

1. A neural-network-based method of evaluating semantic closeness of a source data file relative to at least some of a plurality of candidate data files and, in response to the evaluation, generating a list identifying at least one semantically close candidate data file, the method comprising:

processing the source file to extract properties therefrom;

calculating, with a trained artificial neural network (ANN), a file vector in property space from said extracted properties, wherein the file vector both preserves and is representative of semantic properties of content of the source data file;

comparing the file vector to a plurality of property vectors, wherein each of said at least some of the plurality of candidate data files has an associated property vector of said plurality of property vectors, wherein:

the file vector and each property vector is an output from the trained ANN in which training the ANN compares a subjectively-derived semantic vector against a property space vector, the subjectively-derived semantic vector being generated independently of the property space vector, the ANN is arranged to correlate quantified semantic dissimilarity measures for the subjectively-derived semantic vector, which describes content in semantic space for each of a first data file and also a different second data file, with related property separation distances for the property space vector, which is provided in property space and which describes measurable signal quality extracted for respective content of both the first data file and the different second data file, to provide an output that is adapted, over time, to align a result in property space to a result in semantic space, the ANN is configured, during adaptation of weighting factors in the ANN, to value semantic dissimilarity measures over measurable properties and such that the ANN is configured to map pairwise similarity/dissimilarity in property space for the first data file and the second data file towards corresponding pairwise semantic similarity/dissimilarity in semantic space for the first data file and the second data file thereby to configure a system, in identifying and quantifying similarity or dissimilarity in audio or image-based content, to output a measure of similarity between said content of said first data file relative to content in said second data file, and the subjectively-derived semantic vector is derived using natural language processing (NLP) of a text description of content for each of the first data file and the different second data file;

determining a measured separation in continuous multi-dimensional property space between the file vector of the source file relative to respective property vectors of the at least some of the plurality of candidate data files;

generating said list based on said measured separation and semantic closeness of content of the source data file; and providing the list as a recommendation.

2. The method of claim 1, wherein the source data file is compared against all candidate data files in a database containing candidate data files.

3. The method of claim 2, wherein the database includes property vectors for candidate files cross-referenced to a descriptor or code identifying the content of each candidate file.

4. The method of claim 3, further comprising preventing upload of the source data file when the descriptor or code indicates content in the source data file is inappropriate for at least one of access or publication.

5. The method of claim 4, further comprising:
generating a report identifying a point of origin or user identity for the source file.

6. The method of claim 1, further comprising:
supplying candidate files on the list to a predictor arranged to refine the recommendation;
inputting at least one of user data and media information relating to content into the predictor; and
generating a revised list of candidate data files having regard to the list and the user data and/or media information.

7. The method of claim 6, wherein the predictor operates on the basis of one of
a predictive model;
a reinforcement learning "RL" algorithm; and
a heuristic processing function.

8. The method of claim 1, further comprising:
supplying candidate files on the list to a predictor arranged to refine the recommendation;
inputting at least one of user data and media information relating to content into the predictor; and
generating a revised list of candidate data files having regard to the list and the user data and/or media information.

9. The method of claim 1, further comprising:
computing a file vector as an embedding for the source data file;
detecting a number of close neighbor candidate files for which determined distance measures relative to the file vector do not exceed a predefined threshold;
assembling one or more textual descriptions for the candidate files reflective of respective property vectors therefor;
generating a representative composite textual description from descriptions associated with candidate files within the threshold distance; and
making the representative composite textual description available.

10. The method of claim 1, further comprising:
computing a file vector as an embedding for the source data file;
detecting a number of close neighbor candidate files for which determined distance measures relative to the file vector do not exceed a predefined threshold;
assembling one or more textual descriptions for the candidate files reflective of respective property vectors therefor;
generating a representative composite textual description from descriptions associated with candidate files within the threshold distance; and
making the representative composite textual description available.

11. The method of claim 1, wherein the data files contain content in the form of at least one of:
music,
video,
images data,
speech, and
text files.

12. A trained artificial neural network (ANN) based system of evaluating semantic closeness of a source data file relative to at least some of a plurality of candidate data files stored in a database, the system comprising processing intelligence arranged to:
process the source file to extract properties therefrom;
calculate a file vector in property space from said extracted properties, wherein the file vector both preserves and is representative of semantic properties of content of the source data file;
compare the file vector to a plurality of property vectors, wherein each property vector of the plurality of property vectors is associated with a particular candidate data file of the plurality of stored candidate data files, wherein:
the file vector and each property vector is an output from the trained ANN in which training the ANN compares a subjectively-derived semantic vector against a property space vector, the subjectively-derived semantic vector being generated independently of the property space vector,
the ANN is arranged to correlate quantified semantic dissimilarity measures for the subjectively-derived semantic vector, which describes content in semantic space for each of a first data file and also a different second data file, with related property separation distances for the property space vector, which is provided in property space and which describes measurable signal quality extracted for respective content of both the first data file and the different second data file, to provide an output that is adapted, over time, to align a result in property space to a result in semantic space,
the ANN is configured, during adaptation of weighting factors in the ANN, to value semantic dissimilarity measures over measurable properties and such that the ANN is configured to map pairwise similarity/dissimilarity in property space for the first data file and the second data file towards corresponding pairwise semantic similarity/dissimilarity in semantic space for the first data file and the second data file thereby to configure a system, in identifying and quantifying similarity or dissimilarity in audio or image-based content, to output a measure of similarity between said content of said first data file relative to content in said second data file, and the subjectively-derived semantic vector is derived using natural language processing (NLP) of a text description of content for each of the first data file and the different second data file;

determine a measured separation in continuous multi-dimensional property space between the file vector of the source file relative to respective property vectors of at least some of the plurality of candidate data files;

generate a list based on said measured separation and semantic closeness of content of the source data file, wherein the list identifies, relative to the source data file, at least one semantically close candidate data file from the database; and provide the list as a recommendation.

13. The system according to claim 12, wherein the system intelligence is arranged to compare the source data file against all possible candidate data files in the database.

14. The system according to claim 12, wherein the database includes property vectors for candidate files cross-referenced to at least one of a descriptor and a code, said descriptor and said code identifying the content of each candidate file.

15. The system according to claim 12, wherein the database includes property vectors for candidate files cross-referenced to a descriptor or code identifying the content of each candidate file.

16. The system according to claim 12, wherein the system intelligence is arranged to prevent upload of the source data file when the descriptor or code indicates content in the source file is inappropriate for circulation or publication.

17. The system according to claim 12, wherein the system intelligence is arranged to generate a report identifying at least one of:
a point of origin of the source file, and
a user identify for the source file.

18. The system according to claim 12, wherein the database is remote to a user device arranged to upload the source data file.

19. The system according to claim 12, further comprising a predictor arranged to refine the recommendation, wherein the predictor has:
a first input responsive to candidate data files on the list; and
at least a second input responsive to at least one of user data and media information relating to content; and
wherein the predictor is arranged to generate a revised list of candidate data files having regard to the list and the user data and/or media information.

20. The system according to claim 19, wherein the predictor operates on the basis of one of:
a predictive model;
a reinforcement learning "RL" algorithm; and
a heuristic processing function.

21. The system according to claim 12, wherein the system intelligence is arranged to:

compute a file vector as an embedding for the source data file;

detect a number of close neighbor candidate files for which determined distance measures relative to the file vector do not exceed a predefined threshold;

assemble one or more textual descriptions for the candidate files reflective of respective property vectors therefor;

generate a representative composite textual description from descriptions associated with candidate files within the threshold distance; and make the representative composite textual description available.

22. The system according to claim 12, wherein data files contain content in the form of at least one of:
music,
video,
images data,
speech, and
text files.

23. The system according to claim 12, wherein the system intelligence is a server-side component remotely and selectively connected to a user device over a network.

24. The system according to claim 12, further comprising a predictor arranged to refine the recommendation, wherein the predictor has:
a first input responsive to candidate data files on the list; and
at least a second input responsive to at least one of user data and media information relating to content; and wherein
the predictor is arranged to generate a revised list of candidate data files having regard to the list and the user data and/or media information.

25. The system according to claim 12, wherein the system intelligence is arranged to:
compute a file vector as an embedding for the source data file;

detect a number of close neighbor candidate files for which determined distance measures relative to the file vector do not exceed a predefined threshold;

assemble one or more textual descriptions for the candidate files reflective of respective property vectors therefor;

generate a representative composite textual description from descriptions associated with candidate files within the threshold distance; and make the representative composite textual description available.

26. The system according to claim 12, wherein candidate files are within a distributed database accessed over a network.

* * * * *